United States Patent [19]
Azuma et al.

[11] Patent Number: 5,416,686
[45] Date of Patent: May 16, 1995

[54] POWER INVERTER APPARATUS FOR COPING WITH AN ABRUPT CHANGE IN PHASE OF INPUT VOLTAGE

[75] Inventors: Satoshi Azuma, Amagasaki; Kazunori Sanada, Kobe, both of Japan

[73] Assignee: Mitsubishi Denki Kabushiki Kaisha, Tokyo, Japan

[21] Appl. No.: 219,274

[22] Filed: Mar. 29, 1994

[30] Foreign Application Priority Data

Apr. 2, 1993 [JP] Japan .................................. 5-076846
Oct. 29, 1993 [JP] Japan .................................. 5-272719

[51] Int. Cl.⁶ .......................................... H02M 5/458
[52] U.S. Cl. .......................................... 363/37
[58] Field of Search .................... 363/34, 36, 37, 40, 363/41, 44, 46, 52, 55, 78, 84, 95, 124, 125, 131, 135

[56] References Cited

U.S. PATENT DOCUMENTS

| | | | |
|---|---|---|---|
| 4,409,647 | 10/1983 | Terkanian | 363/37 |
| 5,063,490 | 11/1991 | Maehara et al. | 363/37 |
| 5,274,540 | 12/1993 | Maehara | 363/37 |

FOREIGN PATENT DOCUMENTS

| | | | |
|---|---|---|---|
| 0172254 | 2/1985 | European Pat. Off. | H02M 7/24 |
| 0360156 | 9/1989 | European Pat. Off. | H05B 41/29 |
| 0420628 | 9/1990 | European Pat. Off. | H02M 5/454 |
| 2231965 | 9/1990 | Japan | H02M 7/48 |

*Primary Examiner*—Steven L. Stephan
*Assistant Examiner*—Matthew V. Nguyen
*Attorney, Agent, or Firm*—Leydig, Voit & Mayer

[57] ABSTRACT

The present invention provides a power inverting apparatus capable of coping with an abrupt change in phase of input voltage within a certain range and operating in a stable manner continuously. According to a first aspect of the present invention, a power inverting apparatus comprises a converter unit for changing ac voltage supplied by an ac voltage source into dc voltage, an inverter unit for changing dc voltage supplied by converter unit into ac voltage, and an input voltage control unit that when the polarity of ac voltage supplied by the ac voltage source inconsistent with the one of ac voltage supplied by the inverter unit, cuts off ac voltage to be supplied to the converter unit.

35 Claims, 64 Drawing Sheets

|  | $\vec{A}$ | $\vec{B}$ | $\vec{C}$ | $\vec{D}$ | $\vec{E}$ | $\vec{F}$ | $\vec{G+}$ | $\vec{G-}$ |
|---|---|---|---|---|---|---|---|---|
| S1 | 0 | 1 | 1 | 1 | 0 | 0 | 1 | 0 |
| S3 | 0 | 0 | 0 | 1 | 1 | 1 | 1 | 0 |
| S5 | 1 | 1 | 0 | 0 | 0 | 1 | 1 | 0 |

FIG. 16

| POLARITY OF Vc | POLARITY OF Vi | \|Vc\| > \|Vi\| | DOMAIN | COMBINATION OF VOLTAGE VECTORS |
|---|---|---|---|---|
| + | + | × | [1] | $Tc \cdot \vec{B} + (Ti - Tc) \cdot \vec{A} + (\Delta T - Ti) \cdot \vec{G}$ |
| + | + | ○ | [2] | $Ti \cdot \vec{B} + (Tc - Ti) \cdot \vec{C} + (\Delta T - Tc) \cdot \vec{G}$ |
| + | − | × | [3] | $Tc \cdot \vec{C} + Ti \cdot \vec{D} + (\Delta T - Tc - Ti) \cdot \vec{G}$ |
| + | − | ○ | [3] | ↶ |
| − | + | × | [4] | $Tc \cdot \vec{F} + Ti \cdot \vec{A} + (\Delta T - Tc - Ti) \cdot \vec{G}$ |
| − | + | ○ | [4] | ↶ |
| − | − | × | [5] | $Tc \cdot \vec{E} + (Ti - Tc) \cdot \vec{D} + (\Delta T - Ti) \cdot \vec{G}$ |
| − | − | ○ | [6] | $Ti \cdot \vec{E} + (Tc - Ti) \cdot \vec{F} + (\Delta T - Tc) \cdot \vec{G}$ |

PRIOR ART
FIG. 64a
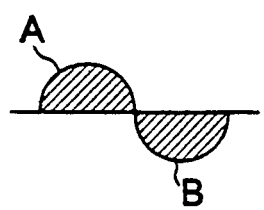
FIG. 64b  FIG. 64c
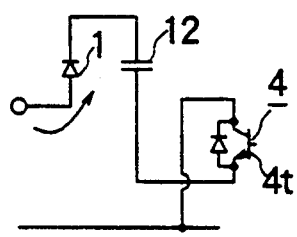 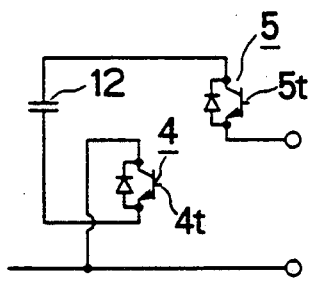
FIG. 64d  FIG. 64e
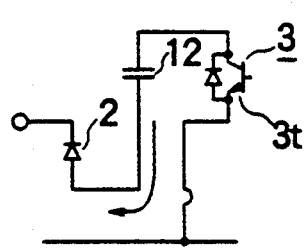 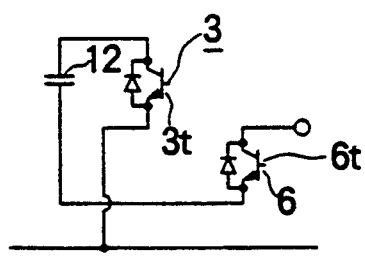

POWER INVERTER APPARATUS FOR COPING WITH AN ABRUPT CHANGE IN PHASE OF INPUT VOLTAGE

BACKGROUND OF THE INVENTION

1. Field of the Invention

The present invention relates to a power inverting apparatus for changing ac voltage into dc voltage and back into ac voltage.

2. Description of the Related Art

To begin with, a basic configuration and operation of major circuits of a power inverting apparatus will be described in conjunction with the first prior art shown in FIGS. 63 and 64. FIG. 63 is a block diagram showing a constant-voltage/constant-frequency power supply disclosed in, for example, Japanese Patent Laid-Open No. 2-231965. FIG. 64 is an explanatory diagram showing the operation of the power supply. In FIG. 63, A denotes a converter made by connecting diodes 1 and 2 serving as rectifying elements in series with each other. A dc output terminal of the converter A is connected to a smoothing capacitor 12.

Reference alphabet B denotes a selector. C denotes an inverter. The selector B or inverter C consists of two switching circuits 3 and 4 or 5 and 6. The switching circuit 3 is composed of a switching element 3t that is, for example, a transistor or a field-effect transistor (hereinafter, FET), and a flywheel diode 3d connected in parallel with but in the opposite direction of the switching element 3t. The same applies to the switching circuits 4, 5, and 6.

The input and output terminals of the converter A, smoothing capacitor 12, selector B, and inverter C are connected in parallel with one another over connection lines 10 and 11.

Reference numeral 7 denotes an ac voltage source for supplying an input voltage Vs. One of the terminals of the ac voltage source 7 is connected to a middle point of the converter A via a connection line 8. The other terminal thereof is linked with the connection line 9. 14 denotes a loading circuit, one of whose terminals is connected to a middle point of the inverter circuit C; that is, one ac output terminal via the connection line 13. The other terminal of the loading circuit 14 is connected to a middle point of the selector B; that is, the other ac output terminal via the connection line 9.

Next, the operation of the foregoing conventional power supply will be described. FIGS. 64a to 64e show various states of switching elements and current flows. First, when the converter operates, current flows as indicated in FIG. 64b within a range defined with a wave A of voltage shown in FIG. 64a or during a positive half cycle thereof. Within a range defined with a wave B of the voltage shown in FIG. 64a or during a negative half cycle thereof, current flows as indicated in FIG. 64d. Thus, the smoothing capacitor 12 is charged with the peak-to-peak value of the input voltage. A dc voltage $V_D$ shown in FIG. 65 is provided as a product of the square root of 2 multiplied by Vs.

The inverter circuit C operates as described below. For outputting the positive voltage (range A) shown in FIG. 64a, the switching elements 4t and 5t shown in FIG. 64c are turned on. For outputting the negative voltage (range B) shown in FIG. 64a, the switching elements 3t and 6t are turned on. Thus, both the positive and negative voltages can be supplied. If pulse-width modulation (PWM) is controlled at either of the switching elements in each of FIGS. 64c and 64e, voltage having a sine wave is made available.

To provide the positive voltage within a hatched range in FIG. 65, the switching element 4t in the selector B must be conducting and the switching element 5t in the inverter C must control pulse-width modulation according to a sine-wave command. To provide the negative voltage within a hatched range in FIG. 65, the switching element 3t in the selector B must be conducting and the switching element 6t in the inverter C must control pulse-width modulation according to a sine-wave command.

Under the foregoing switching control, when an inverter output voltage $V_{INV}$, which is not shown, is passed through a filter circuit, a sine-wave voltage like a negative voltage $V_L$ shown in FIG. 65 is made available. Herein, the input voltage Vs and output voltage $V_L$ may be different in waveform from each other but must be in phase with each other (their zero points must coincide with one another).

Next, a constant-voltage/constant-frequency power supply of the second prior art will be described concerning mainly a control relationship using FIG. 66.

The second prior art adopts a converter D instead of the converter A in FIG. 63.

The converter D is made by connecting switching circuits 1 and 2 in series with each other. The switching circuit 1 or 2 consists of a switching element 1t or 2t that is a transistor or an FET, and a diode 1d or 2d.

Reference numeral 15 denotes an ac reactor. One terminal of the ac reactor 15 is connected to a middle point of the converter D via a connection line 8, and the other terminal thereof is connected to the ac voltage source 7 via a connection line 16.

Reference numeral 30 denotes a control circuit for controlling switching elements it to 6t included in the converter D, selector B, and inverter C. 100 denotes a converter voltage command generator for actuating the converter with a high power factor. 101 denotes a carrier generator. 102 denotes an inverter voltage command generator for use in reshaping load voltage in the form of a sine wave. 103 denotes a comparator For comparing an output $V_{CMD1}$ of the converter voltage command generator 100 with an output CAR of the carrier generator 101. 104 denotes a comparator for comparing an output $V_{CMD2}$ of the inverter voltage command generator 102 with an output CAR of the carrier generator 101. 105 denotes a zero-crossing detector for detecting a zero crossing by analyzing an output of the inverter voltage command generator 102. 106 denotes a switching pattern generator for generating switching signals $T_1$ to $T_6$ using the outputs of the comparators 103 and 104 and the zero-crossing detector 105. FIG. 67 shows a circuitry of the switching pattern generator 106. 107 to 109 denote reversing circuits. 110, 111, 113, and 114 denote AND circuits. 112 and 115 denote OR circuits. 116 and 117 denote reversing circuits.

Other circuit elements except the foregoing ones are identical to those in the first prior art described previously.

Next, the operation of the second conventional power supply will be described with reference to the timing chart of FIG. 68. The comparator 103 compares the converter voltage command $V_{CMD1}$ provided by the converter voltage command generator 100 with the carrier CAR provided by the carrier generator 101.

When the carrier CAR is smaller, the comparator 103 outputs a converter PWM signal Ta having a high logic level. Likewise, the comparator 104 compares the inverter voltage command $V_{CMD2}$ provided by the inverter voltage command generator 102 with the carrier CAR, and then outputs an Inverter PWM signal Tb. When the inverter voltage command $V_{CMD2}$ is positive, the zero-crossing detector 105 outputs a polarity signal Tc having a high logic level.

In FIG. 67, the polarity signal Tc is used as a switching signal T4, and a signal that is the polarity signal Tc reversed in polarity by the reversing circuit 107 is used as a switching signal T3. The AND circuits 110 and 111 and the OR circuit 112 constitute a selector. When the polarity signal Tc is high, the OR circuit 112 serving as the output terminal of the selector outputs the converter PWM signal Ta. When the polarity signal Tc is low, a signal that is the converter PWM signal Ta reversed polarity by the reversing circuit 108 is output. The output signal is used as a switching signal T1, and a signal that is opposite in polarity to the switching signal T1 and provided by the reversing circuit 116 is used as a switching signal T2. Likewise, the AND circuits 113 and 114 and the OR circuit 115 constitute a selector. When the polarity signal Tc is high, the OR circuit 115 serving as the output terminal of the selector outputs the Inverter PWM signal Tb. When the polarity signal Tc is low, the OR circuit 115 outputs a signal that is opposite in polarity to the inverter PWM signal Tb and provided by the reversing circuit 109. The output signal is used as a switching signal T5, and a signal that is opposite in polarity to the switching signal T5 and provided by the reversing circuit 117 is used as a switching signal T6.

When two circuits of the converter D and selector B are discussed together, it will be understood that the circuits acts as a typical converter for changing ac voltage supplied by the ac voltage source 7 into dc voltage to charge the smoothing capacitor 12. The switching pattern of the converter D is consistent with the waveform of the converter PWM signal such as the one indicated as T1 or T2 in FIG. 68.

Assuming that the converter voltage command is substantially in phase with the inverter voltage command, the switching pattern of the selector B becomes consistent with the waveform of the converter command $V_{CMD1}$. Consequently, the converter output voltage $V_{CNV}$ shown in FIG. 68 is provided.

When two circuits of the inverter C and selector B are discussed together, it will be understood that the circuits act as a typical inverter for changing dc voltage existent at the smoothing capacitor 12 into ac voltage and then outputting the ac voltage. At this time, the switching pattern of the inverter C is consistent with the waveform of the Inverter PWM signal such as the one indicated as T5 or T6 in FIG. 68. The switching pattern of the selector B is consistent with the waveform of the polarity signal Tc For the inverter voltage command $V_{CMD2}$. Consequently, the inverter output voltage $V_{INV}$ shown in FIG. 68 is provided.

The conventional constant-voltage/constant-frequency power supplies are configured as mentioned above. That is to say, the selector B is shared between a converter and an inverter. The selector B can therefore operate only under the condition that both the converter D and inverter C operate with the same polarity. For supplying stable voltage to a load, since the switching pattern of the inverter C cannot be altered, the selector B cannot help adopting a switching pattern dedicated to an inverter. If input voltage is abruptly reversed in polarity, the converter D Fails to operate correctly.

For example, when an uninterruptible power supply (CVCF) is concerned, a generator may be included in an input system. In this case, an abrupt phase change may occur due to switching between the power supply and generator. When the inverter C outputs positive voltage, if the input voltage is reversed 180° to be negative, since the selector B shown in FIG. 66 turns on the switching element 4t in order to provide inverter output voltage of positive polarity, the reactor 15 alone is connected from the ac voltage source 7 to the selector B via the switching element 4t and the diode 2d of the switching circuit 2 in the converter D. If this state continues for more than several milliseconds, overcurrent flows internally. The switching element 4t is therefore turned off forcibly. A desired inverter voltage cannot be output.

SUMMARY OF THE INVENTION

An object of the present invention is to solve the aforesaid problems and to provide a power inverting apparatus capable of coping with an abrupt change in phase of input voltage within a certain range and of operating in a stable manner continuously.

According to the first aspect of the present invention, a power inverting apparatus comprises a converter means for changing ac voltage supplied by an ac voltage source into dc voltage, an inverter means for changing dc voltage supplied by the converter means into ac voltage, and an input voltage control means that when the polarity of ac voltage supplied by the ac voltage source is inconsistent with the one of ac voltage supplied by the inverter means, cuts off ac voltage to be supplied to the converter means.

According to the second aspect of the present invention, a power inverting apparatus comprises a converter means for changing ac voltage supplied by an ac voltage source into dc voltage, an inverter means for changing dc voltage supplied by the converter means into ac voltage, an inverter voltage command generator for generating an inverter voltage command, a carrier generator for generating first and second carriers that are 180° out of phase each other, and a control means for controlling the converter means and inverter means so as to control pulse-width modulation (PWM) of the converter means according to the converter voltage command and first carrier and to control pulse-width modulation of the inverter means according to the inverter voltage command and second carrier.

According to the third aspect of the present invention, a power inverting apparatus comprises a converter including a first switch that is a pair of switching circuits connected in series with each other and having a middle point of the first switch connected to one terminal of an ac voltage source, a smoothing capacitor connected in parallel with the converter, a selector being connected in parallel with the converter, including a second switch that is a pair of switching circuits connected in series with each other, and having a middle point of the second switch connected to the other terminal of the ac voltage source, an inverter being connected to the converter and including a third switch that is a pair of switching circuits connected in series with each other, a converter voltage command generator for generating a converter voltage command, an inverter voltage command generator for generating an inverter voltage command, and a switching control means for representing combinations of logical states of the first to third switches in the form of voltage vectors, converting the converter voltage command and inverter voltage command into voltage vector commands, calculating a required combination of logical states and a valid time interval of the combination according to the voltage vector commands, and generating switching signals for the switching circuits in the first to third switches.

BRIEF DESCRIPTION OF THE DRAWINGS

FIG. 16 is a table showing combinations of voltage vectors domain by domain;

FIGS. 64a to 64e are explanatory diagrams showing the operation of the first prior art;

DESCRIPTION OF THE PREFERRED EMBODIMENTS

First Embodiment

Figure 1:
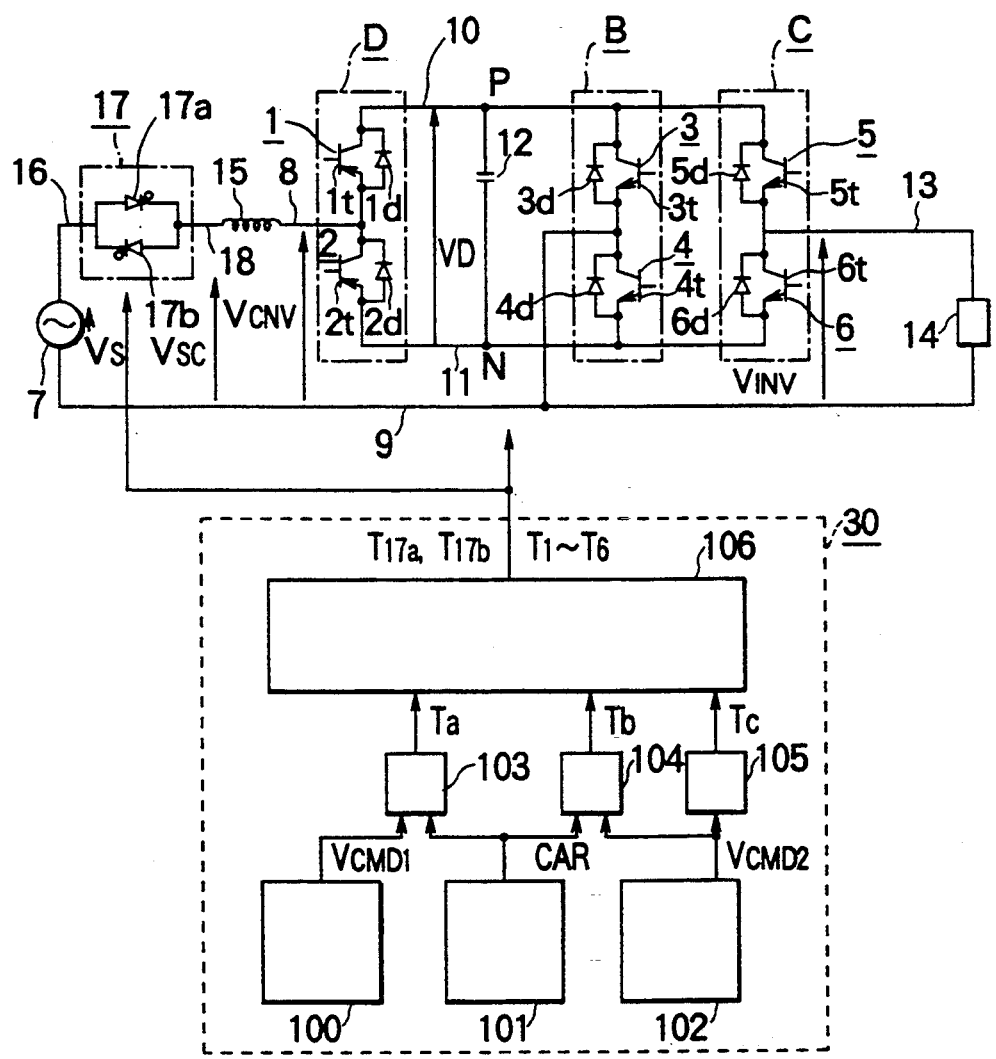
FIG. 1 is a block diagram showing a power inverting apparatus of the first embodiment of the present invention.
Figure 2:
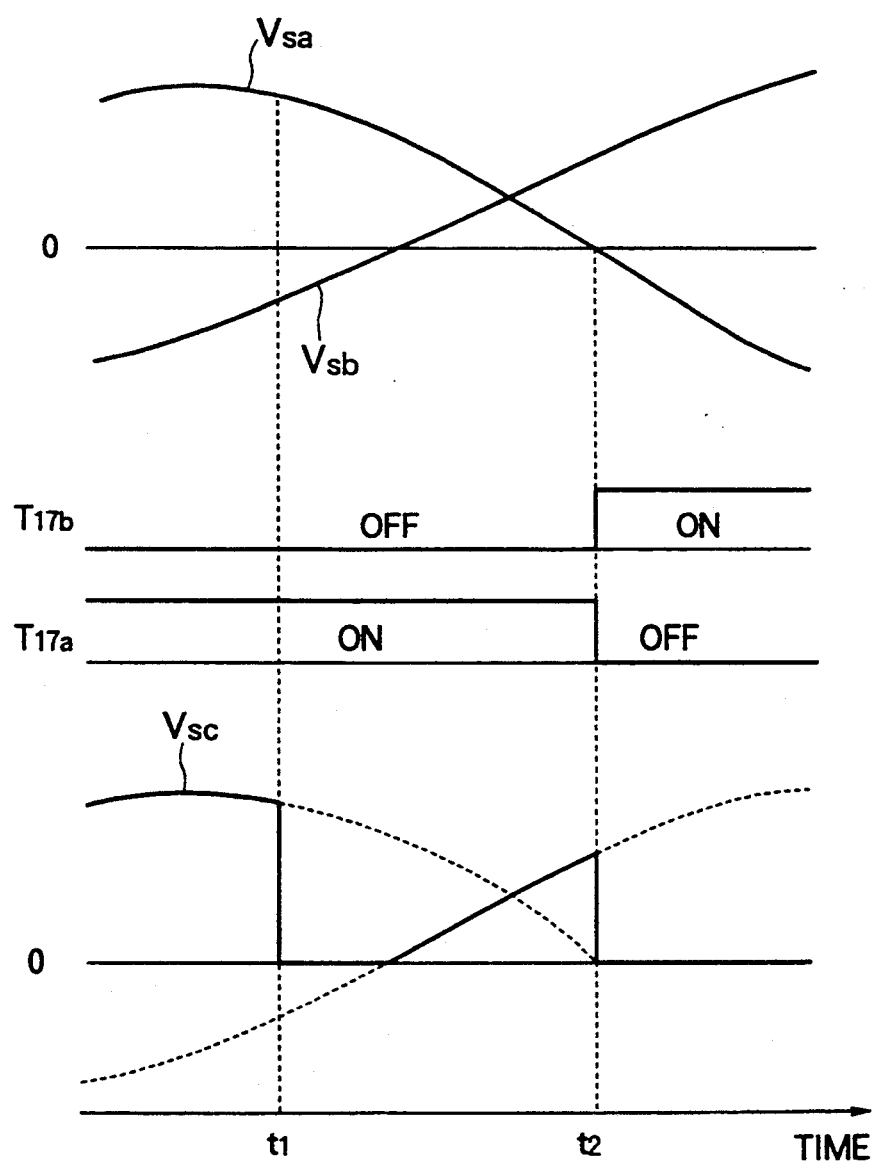
FIG. 2 shows waveforms representing the operation of the first embodiment.

The first embodiment of the present invention will be described in conjunction with the drawings. FIGS. 1 and 2 show the first embodiment of the present invention. FIG. 1 shows the configuration. In FIG. 1, 17 denotes an input voltage control circuit serving as a bidirectional switching circuit made by connecting switching elements 17a and 17b for controlling unidirectional switching; such as, thyristors in parallel with each other but in the opposite directions. One terminal of the input voltage control circuit is connected to an ac voltage source 7 via a connection line 16, and the other terminal thereof is connected to a reactor 15 via a connection line 18. 1 to 16, and 30 denote the same circuit elements as those in a prior art, of which description will be omitted.

FIG. 2 shows waveforms representing the operation of the input voltage control circuit 17. Vsa and Vsb denote waves of voltages supplied by the ac voltage source 7. As described later, the voltage Vsa indicated with a bold line Fluctuates abruptly at a time instant t1 and assumes the waveform of the voltage Vsa indicated with another bold line. A switching signal T17a is equivalent to the switching signal T4 serving as a polarity signal for an inverter output voltage $V_{INV}$. A switching signal T17b is equivalent to the switching signal T3. Vsc denotes an output voltage of the input voltage control circuit 17.

Next, the operation of the input voltage control circuit 17 playing a pivotal role in the present invention will be described with reference to FIG. 2. Assume that the output voltage supplied by the ac voltage source 7 assumes the same waveform as the voltage Vsa until the time instant t1 and changes the waveform into that of the voltage Vsb instantaneously. At this time, the switching element 17a in the input voltage control circuit 17 is turned on with the switching signal T17a synchronous with the polarity signal for inverter output voltage and the switching element 17b therein is turned off with the switching signal T17b. The output voltage Vsc of the input voltage control circuit 17 assumes the same waveform as the voltage Vsa until the time instant t1. After the time instant t1, when the voltage Vsb is negative, the output voltage Vsc is zero voltage. At a time instant t2, the logical states. of the switching elements 17a and 17b are changed over. When the output voltage Vsb of the ac voltage source 7 is positive, the voltage Vsc is zero voltage. Due to the foregoing operation of the input voltage control circuit 17, a voltage that is opposite in polarity to the inverter output voltage is fed to the converter D serving as the first switch.

This solves a problem lying in prior arts or avoids a phenomenon that a switching element is turned off due to continuous overcurrent and thus an inverter stops outputting voltage.

If an output of a phase-locked loop, which is not shown, in the inverter C serving as the third switch tracks in phase the output voltage Vsb of the ac voltage source 7 at a slow pace acceptable to a load, the output voltage Vsc of the input voltage control circuit 17 would have a perfect sine wave. Furthermore, the input voltage of the converter D is controllable, making it possible to control dc voltage within a range defined with values smaller than a wave height of the voltage Vs supplied by the ac voltage source 7.

Second Embodiment

Figure 3:
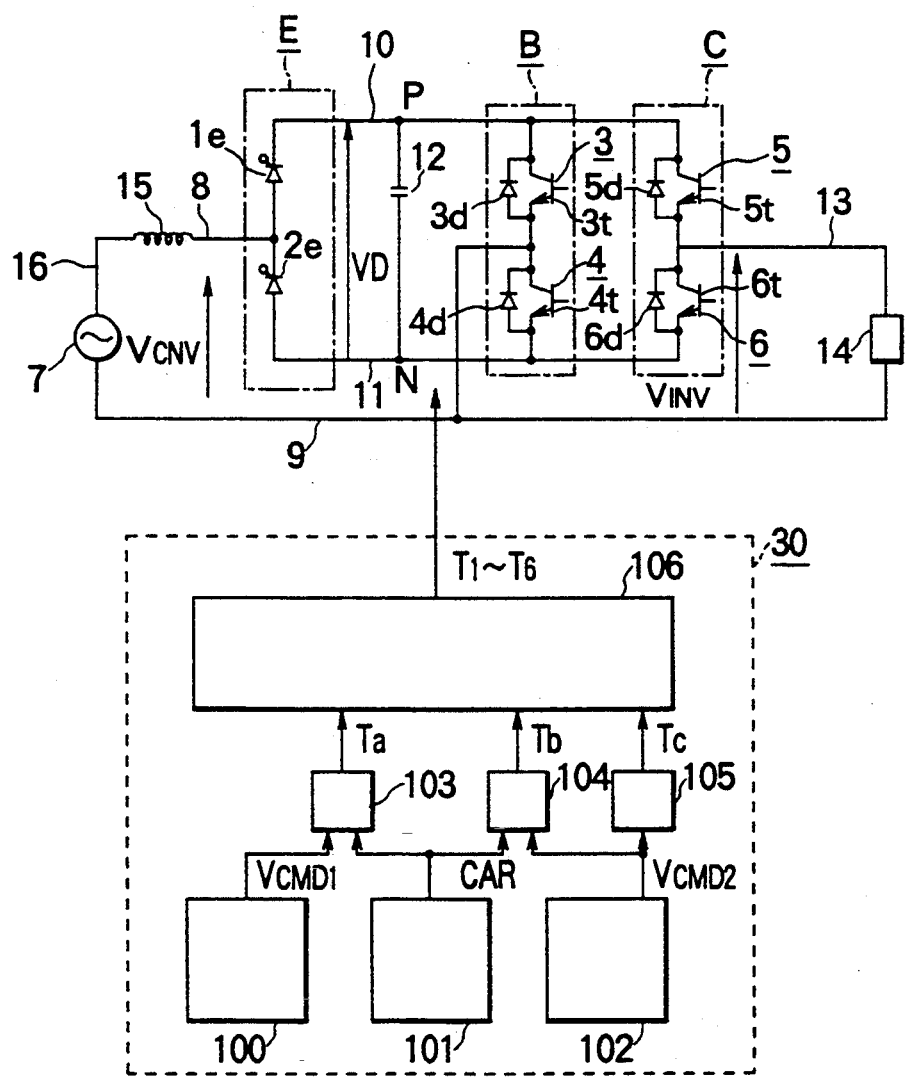
FIG. 3 is a block diagram showing a power inverting apparatus of the second embodiment.

Next, the second embodiment of the present invention will be described in conjunction with the drawings. In FIG. 3, E denotes a converter serving as the first switch. The converter E is made by connecting switching elements 1e and 2e for controlling unidirectional switching; such as, thyristors in series with each other. When the inverter output voltage $V_{INV}$ is positive, the switching element 1e is on. When the inverter output voltage $V_{INV}$ is negative, the switching element 1e is off. The switching element 2e acts in contrast with the switching element 1e. 3 to 16 and 30 denote the same circuit elements as those in prior arts.

Figure 4A:
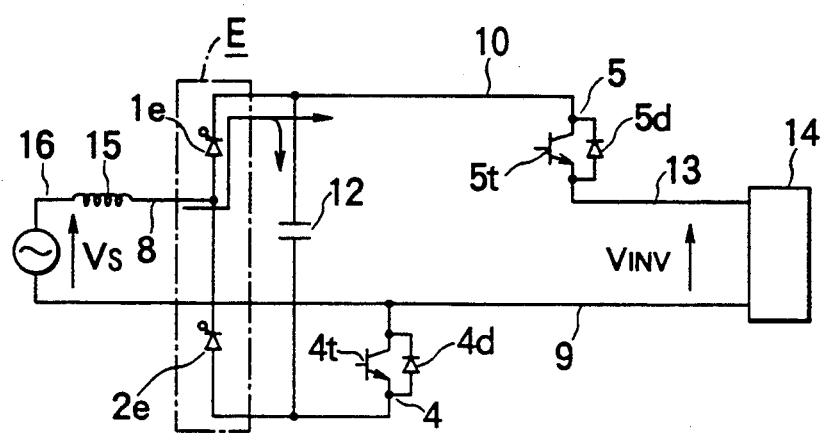
FIGS. 4a and 4b are explanatory diagrams showing the operation of the second embodiment.
Figure 4B:
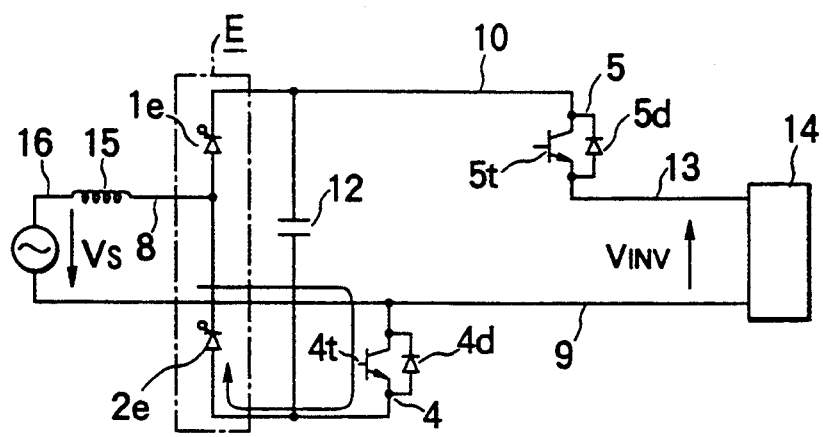

FIGS. 4a and 4b are explanatory diagrams for the second embodiment, showing the operation performed when the output voltage of the ac voltage source 7 abruptly fluctuates in phase to have the opposite polarity. FIG. 4a shows current flowing through the converter E when the output voltage of the ac voltage source 7 and inverter output voltage $ViN_V$ are phased positively. The switching elements 1e, 4t, and 5t are on, whereby current flows into the loading circuit 14 through the capacitor 12 or switching element 5t via the reactor 15 in the converter E. Immediately after the converter E is placed in the state shown in FIG. 4a, if the voltage supplied by the ac voltage source 7 is reversed in polarity, the converter E enters the state shown in FIG. 4b. In FIG. 4b, the same switching elements as those in FIG. are on. In the converter E, current therefore flows through the switching element 4t and attempts to flow into the switching element 2e. However, since the switching element 2e is off, the current does not flow through the switching element 2e. When the voltage Vs supplied by the ac voltage source 7 and the inverter output voltage $V_{INV}$ are not mutually consistent in polarity, no converter current flows. Therefore, even if the input voltage Vs fluctuates in phase, no problem occurs. The capacitor 12 is no longer charged with the peak-to-peak value of the output voltage of the ac voltage source 7, whereby dc voltage can be controlled to be any value starting with zero.

Third Embodiment

Figure 5:
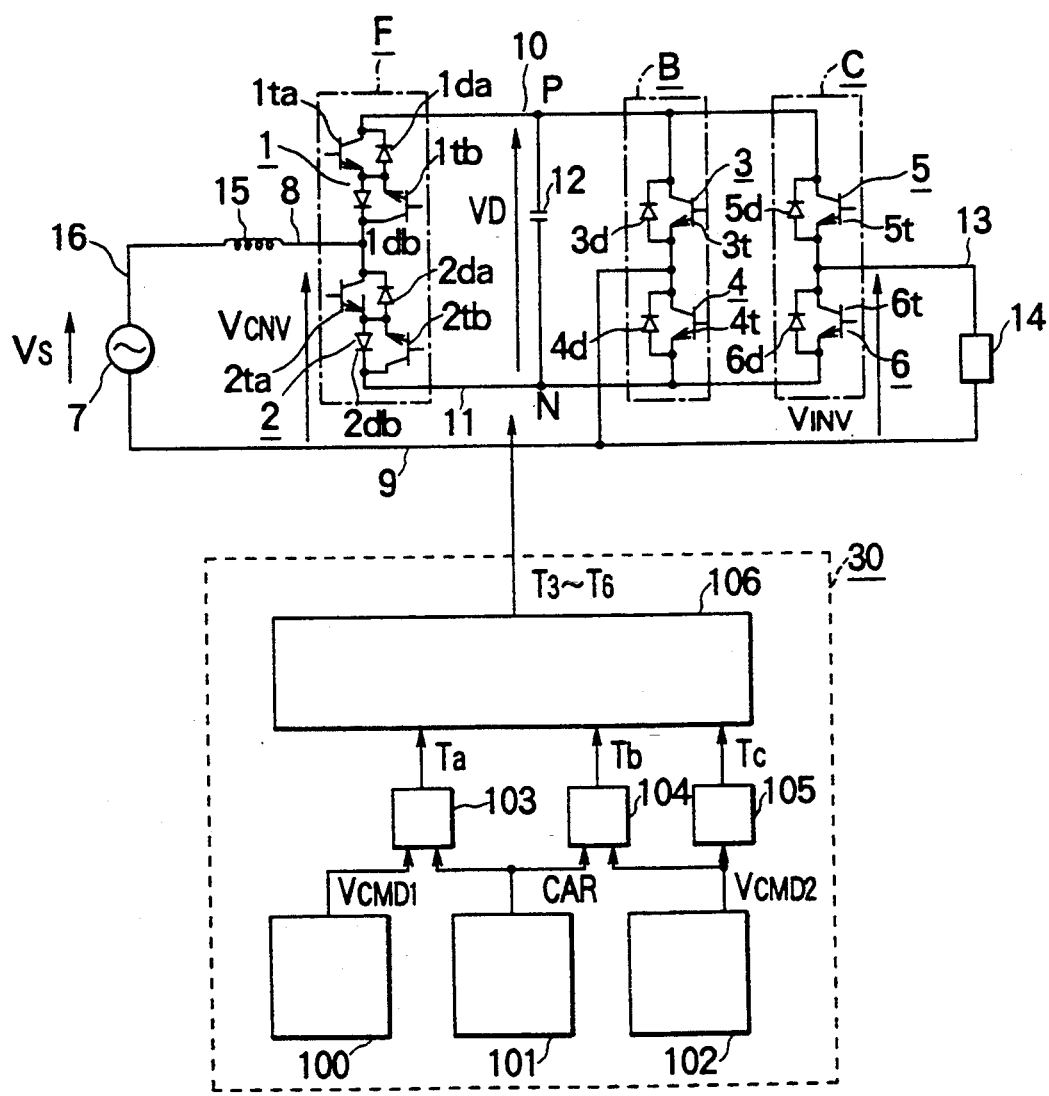
FIG. 5 is a block diagram showing a power inverting apparatus of the third embodiment.

Next, the third embodiment of the present invention will be described in conjunction with the drawings. In FIG. 5, F denotes a converter serving as the first switch. The converter F consists of bidirectional control circuits 1 and 2. The bidirectional control circuit 1 is made by connecting a switching circuit composed of a switching element 1ta that is a transistor, an IGBT, or an FET, and a flywheel diode 1da, and a switching circuit composed of a switching element 1tb that is a transistor, an IGBT, or an FET, and a flywheel diode 1db, in series with each other but in the opposite directions. Similarly to the switching circuit 1, the bidirectional control circuit 2 is made by connecting switching elements 2ta and 2tb and flywheel diodes 2da and 2db. The other circuit elements and connections are identical to those in prior arts.

Figure 6A:
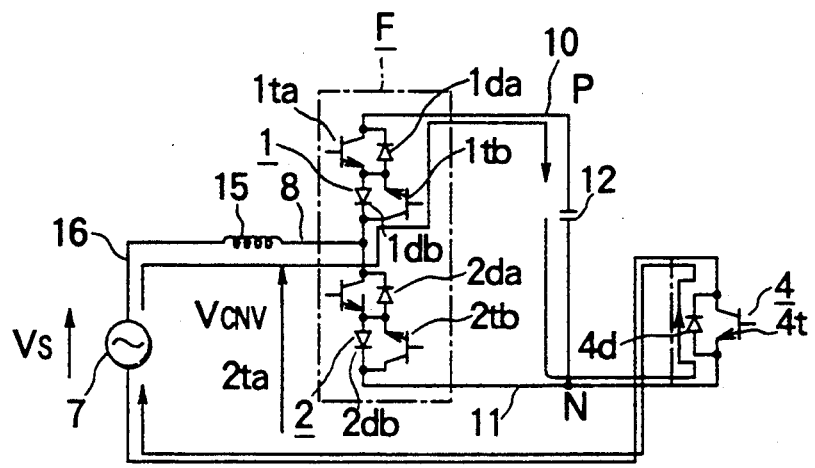
FIGS. 6a and 6b are explanatory diagrams showing the operation of the third embodiment.
Figure 6B:
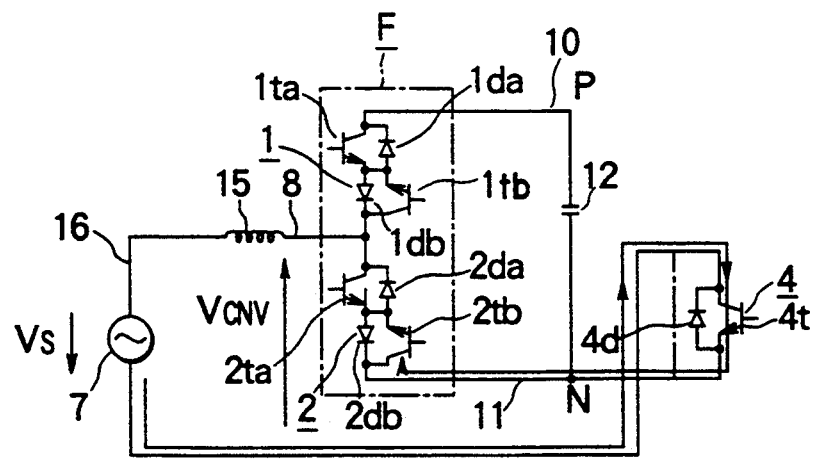

The operation will be described in conjunction with FIGS. 6a and 6b. FIG. 6a shows current flowing through the converter F when the output voltage of the ac voltage source 7 and the inverter output voltage $V_{INV}$ are phased positively. In FIG. 6a, two switching elements in each of the bidirectional control circuits 1 and 2 in the converter F always operates according to the same switching pattern. The switching pattern is identical to that in the second prior art. That is to say, current flows through the switching element 1tb and diode 1da in the switching circuit 1 and through the diode 4d in the switching circuit 4, and then charges the capacitor 12. At this time, as shown in FIG. 6b, if the voltage supplied by the ac voltage source 7 is reversed in polarity, since the switching element 4t is on, current attempts to flow through the switching element 4t and diode 2da. However, since the converter F controls bidirectional switching, when the switching element 2tb is off, the current is cut off. Even when the output voltage of the ac voltage source 7 fluctuates, a short circuit shunting the reactor 15 will not occur. Furthermore, since bidirectional switching can be controlled, power for producing dc voltage can be regenerated by the ac voltage source in a normal control mode. Even for a load that regenerates energy of a motor or the like, dc voltage can be held constant.

Fourth Embodiment

The aforesaid embodiments 1 to 3 utilize the actions and characteristics of switching elements in order to prevent abrupt reverse in polarity of input voltage, thus solving problems caused by the abrupt change in phase of voltage supplied by the ac voltage source 7.

By comparison, a power inverting apparatus of the fourth embodiment to be described below adopts a technology enabling independent control of a converter and inverter within a certain range of voltage values in order to solve the aforesaid problems.

Specifically, in a single-phase high power-factor converter or single-phase inverter which is a typical full bridge circuit, one arm controls pulse-width modulation and the other arm performs switching by synchronizing in polarity with intended output voltage. In an ac-dc-ac power inverting apparatus, when the output voltages of a converter and an inverter are mutually consistent in frequency and phase, switching elements synchronous with the output voltages of the converter and inverter operate exactly the same. The converter and inverter can therefore be united as conventionally. This idea would work supposing the output voltages of the converter and inverter were mutually consistent in frequency and phase. When they are inconsistent, the conventional circuits described in this specification do not operate.

The present inventor has noted that the aforesaid restriction is attributable to the fact that pulse-width modulation performed in the converter and inverter is controlled on the basis of a single carrier. The inventor has discussed a technology for controlling pulse-width modulation independently between the converter and inverter using different carriers that are 180° out of phase. Prior to practical embodiments, the carriers will be described in conjunction with FIGS. 7a and 7b.

Figure 7A:
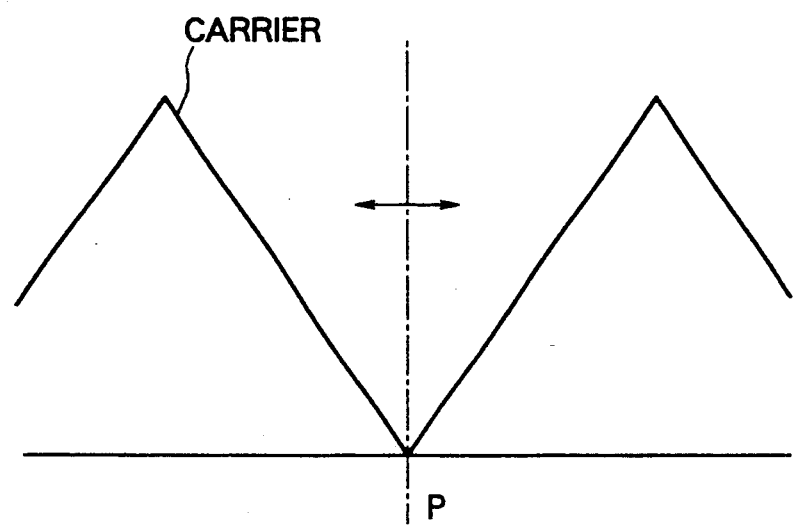
FIGS. 7a and 7b are explanatory diagrams showing carriers applicable to the fourth embodiment and thereafter.
Figure 7B:
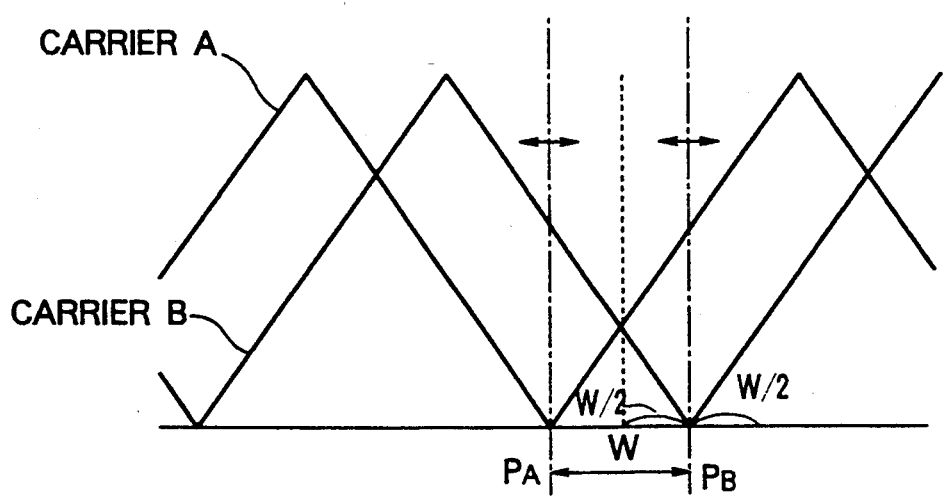

FIG. 7a shows a single carrier. When pulse-width modulation is controlled using a triangle wave as shown in FIG. 7a, a pulsed signal resulting from comparison between the carrier and a voltage command fluctuates at every center point P of a pulse duration. When pulse-width modulation applied to two voltage command signals is controlled using a common carrier, the pulse durations of the two pulsed signals share the same period. With this in mind, pulse-width modulation using two carriers that have a phase difference between them will be described in conjunction with FIG. 7b.

When two carriers are out of phase by a duration W, the center points PA and PB of the pulse durations of the two carriers A and B are mutually inconsistent by the duration W. Two pulsed signals resulting from pulse-width modulation travel without joining their pulses for a period $(W/2) \times 2 = W$. This means that the pulse duration W attributable to the phase difference between the carriers is proportional to a period during which the two pulsed signals do not join. For maximizing the latter (the period during which the two pulsed signals do not join), the phase difference between the carriers should be set to a maximum; that is, 180°.

Figure 8:
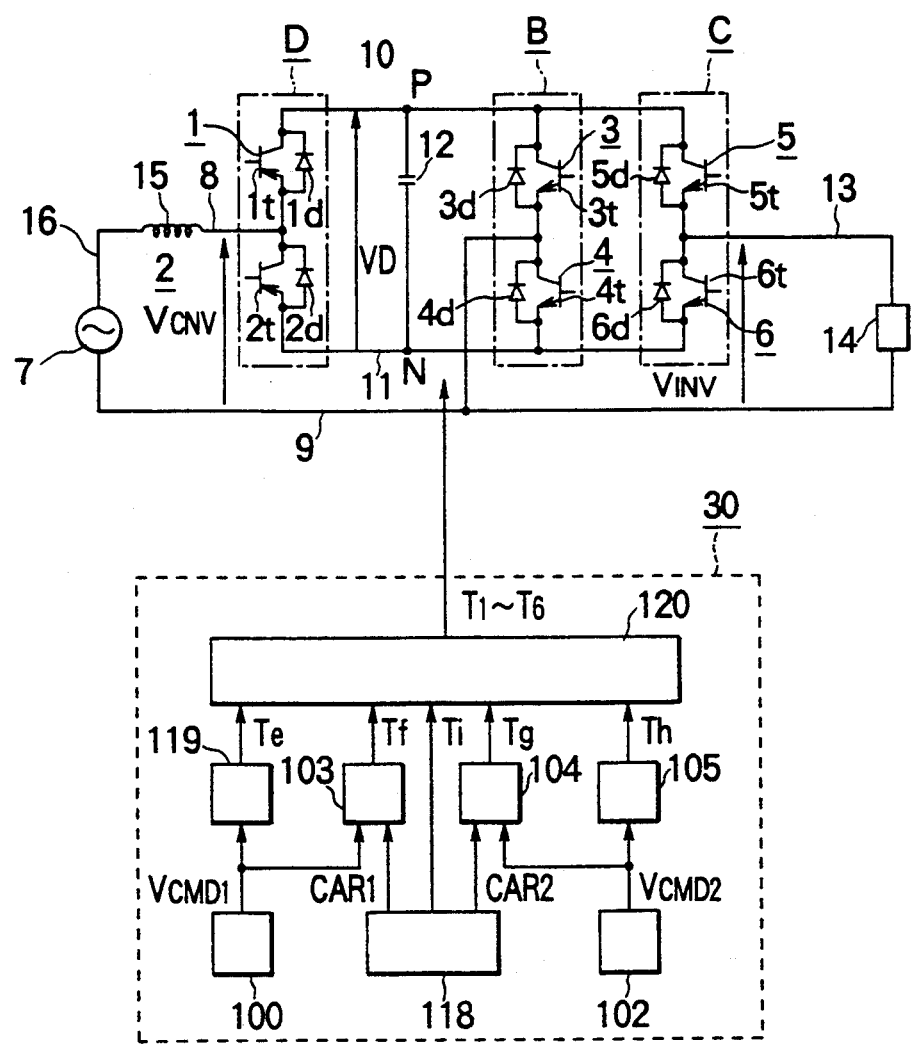
FIG. 8 is a block diagram showing a power inverting apparatus of the fourth embodiment.

Next, the fourth embodiment of the present invention will be described in conjunction with the drawings. In FIG. 8, main circuits 1 to 16 have the same circuit elements as those in prior arts. 30 denotes a control circuit having circuit elements described below. 118 denotes a carrier generator for generating carriers CAR1 and CAR2 having triangle waves and being 180° out of phase, and a carrier state signal Ti that is reversed in polarity every time the carriers CAR1 and CAR2 have a crossing. 119 denotes a zero-crossing detector for detecting a zero crossing by analyzing an output of the converter voltage command signal generator 100. 120 denotes a switching pattern generator for generating switching signals T1 to T6 using outputs of the comparators 103 and 104 and the zero-crossing detectors 105 and 1119. 100 and 102 to 105 denote the same circuit elements as those in prior arts.

Figure 9:
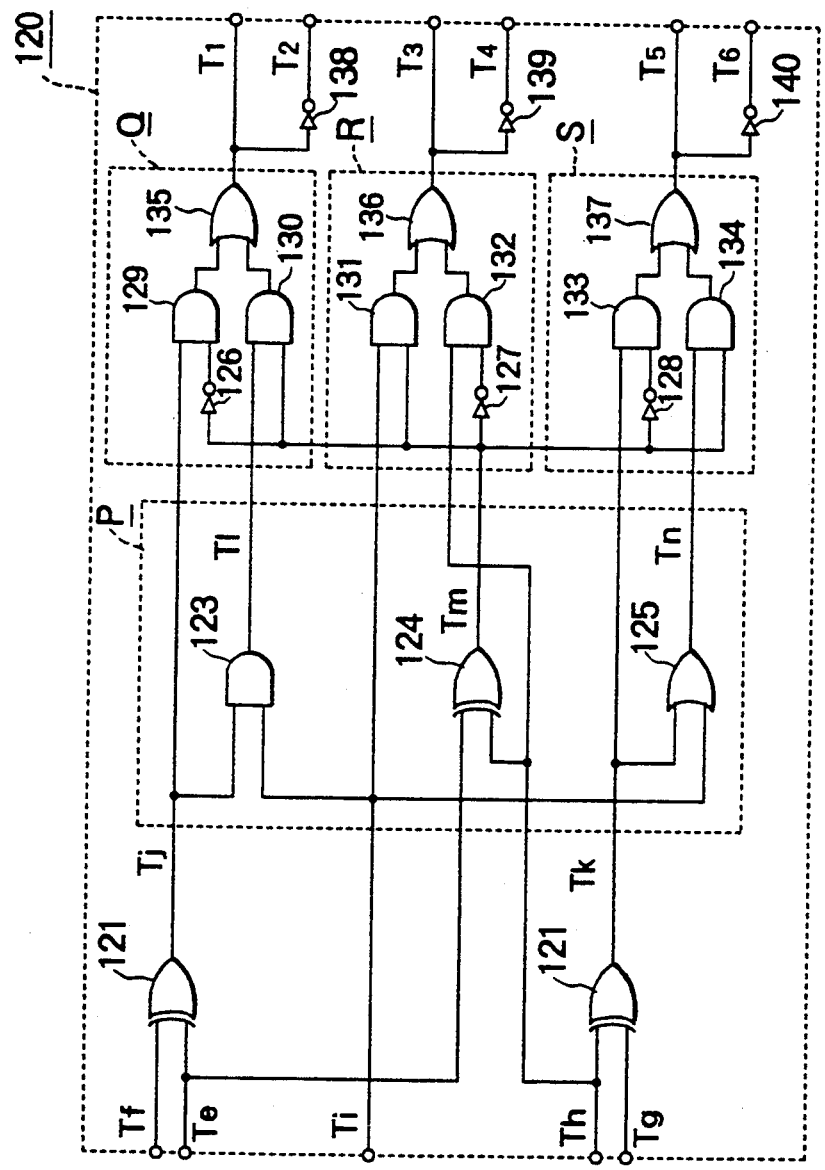
FIG. 9 is a circuit diagram showing a switching pattern generator in the fourth embodiment.

FIG. 9 shows a circuitry of the switching pattern generator 120. 121, 122, and 124 denote exclusive-OR circuits. 123 and 129 to 134 denote AND circuits. 125 and 135 to 137 denote OR circuits. 126 to 128 and 138 to denote reversing circuits. The AND circuit 123, exclusive-OR circuit 124, and OR circuit 125 constitute a counter-inconsistent polarity signal generator P. The reversing circuit 126, AND circuits 129 and 130, and OR circuit 135 constitute a first selector Q. The reversing circuit 127, AND circuits 131 and 132, and OR circuit 136 constitute a second selector R. The reversing circuit 128, AND circuits 33 and 134, and OR circuit 137 constitute a third selector S.

Figure 10:
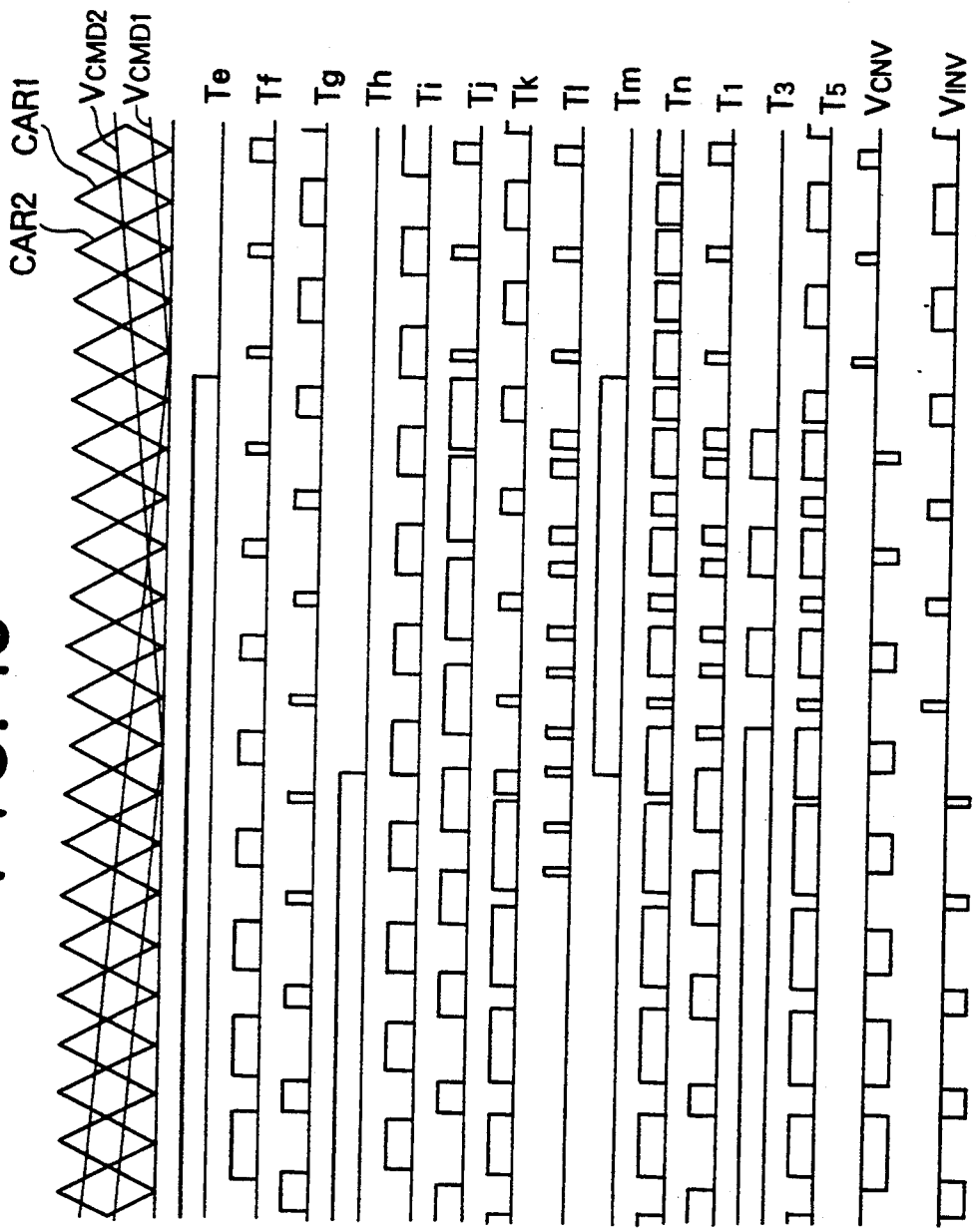
FIG. 10 shows waveforms representing the operation of the fourth embodiment.

Referring to FIG. 10, the operation will be described. The comparator 103 compares the converter voltage command $V_{CMD1}$ with the carrier CAR1, and outputs a Converter Compared signal Tf. The comparator 104 compares the inverter voltage command $V_{CMD2}$ with the carrier CAR2 that is 180° out of phase with the carrier CAR1, and outputs an Inverter Compared signal Tg. In addition, the comparator 104 outputs the carrier state signal Ti that is reversed in polarity every time the carrier has a zero crossing. The signal Ti allows the converter D and inverter C to operate independently only when their PWM signals do not temporally join.

The signal Ti is high when the converter can operate freely.

The switching pattern generator 120 inputs the Converter Compared signal Tf, converter polarity signal Te, carrier state signal Ti, Inverter Compared signal Tg, and inverter polarity signal Th. The exclusive-OR circuit 121 computes the signals Tf and Te and outputs a converter PWM signal Tj. The AND circuit 123 calculates the AND of the signals Tj and Ti, and outputs a Converter Operable signal Tl indicating that the converter can operate freely. The exclusive-OR circuit 124 inputs the signals Te and Th, and outputs a Polarity Inconsistent signal Tm. The Polarity Inconsistent signal Tm is high when the signals Te and Th are mutually inconsistent in polarity, but low when the signals Te and Th are mutually consistent in polarity. These signals Tl and Tj are fed to the selector Q. When the signals Te and Th are mutually consistent in polarity (the signal Tm is low), the signal Tj is selected. When the signals Te and Th are mutually inconsistent in polarity (the signal Tm is high), the signal T1 is selected. The selected signal is supplied as a switching signal T1 to the switching circuit 1.

The signals Ti and Th are fed to the selector R. When the signals Te and Th are mutually inconsistent in polarity (the signal Tm is high), the signal Ti is selected. When the signals Te and Th are mutually consistent in polarity (the signal Tm is low), the signal Th is selected. The selected signal is supplied as a switching signal T3 to the switching circuit 3.

The exclusive-OR circuit 122 computes the signals Th and Tg, and outputs an inverter PWM signal Tk having information concerning the polarity of output voltage of the inverter. The OR circuit 125 calculates the OR of the signals Tk and Ti, and outputs an Inverter Operable signal Tn indicating that the inverter can operate freely. These signals Tk and Tn are fed to the selector S. When the signals Te and Th are mutually consistent in polarity (the signal Tm is low), the signal Tk is selected. When the signals Te and Th are mutually inconsistent in polarity (the signal Tm is high), the signal Tn is selected. The selected signal is then supplied as a switching signal T5 to the switching circuit 5. The switching signals T2, T4, and T6 are opposite in polarity to the switching signals T1, T3, and T5, and supplied to the switching circuits 2, 4, and 6. These switching signals are used to produce the converter output voltage $V_{CNV}$ and inverter output voltage $V_{INV}$ shown in the lower part of FIG. 10.

As described above, two carrier signals are dephased by 180°. This allows the converter and inverter to operate independently. The independence is determined by a period during which two PWM signals do not temporally join. Now, the limit of a phase difference between outputs of the inverter and converter will be discussed.

Assuming that the wave height of converter output voltage is $V_C$, the wave height of inverter output voltage is $V_I$, and the dc voltage at the capacitor 12 is $V_D$, a conditional expression (1) below is established.

$$V_C \sin\theta - V_I \sin(\theta - \alpha) \leq V_D \quad (1)$$

where, $\alpha$ denotes a phase difference between the converter and inverter. A relationship of $0 \leq \theta \leq \alpha$ is established. When the left side of the expression (1) becomes maximum, $\theta$ is equal to $\alpha/2$. By assigning $\theta = \alpha/2$ to the expression (1), an expression (2) is obtained:

$$(V_C + V_I)\cdot\sin(\alpha/2) \leq V_D \quad (2)$$

When the expression (2) is modified with respect to the limit phase difference a, an expression (3) is obtained:

$$\alpha = 2\cdot\sin^{-1}\{V_D/(V_C + V_I)\} \quad (3)$$

Conclusively, the converter and inverter can operate mutually independently within the phase difference $\alpha$.

Fifth Embodiment

In the foregoing fourth embodiment, when the output voltages of a converter and an inverter are mutually inconsistent in polarity, the switching patterns of their switching elements are changed. As a result, the frequencies of the outputs of the switching elements increase multiplicatively temporarily. This results in increased power dissipation. Assuming that the values VD, $V_C$, and $V_I$ are equal to one another, a converter and an inverter can be designed to operate normally until a phase difference between their outputs becomes a maximum of 60° calculated using the expression (3). In this case, since the converter operates with a high power factor, the frequencies of outputs of switching elements in the converter increase when the phase difference between the outputs of the inverter and converter is within a range of ±30° relative to zero current. This results in a small current value. An increase in frequency therefore hardly affects the power dissipation in the converter.

On the other hand, in the inverter, current is reversed in phase due to a loading circuit. At worst, the frequencies of outputs of switching elements in the inverter increase when the phase difference between the outputs of the inverter and converter is within a range of ±30° relative to peak current. This results in a large current value. An increase in frequency therefore drastically affects the power dissipation in the inverter.

The fifth embodiment has overcome the foregoing drawback. When outputs of a converter and an inverter are mutually inconsistent in polarity, the switching patterns of the converter and inverter or switches B and C are exchanged. The converter and inverter are then actuated according to the exchanged switching patterns. The fifth embodiment will be described in conjunction with the drawings.

Figure 11:
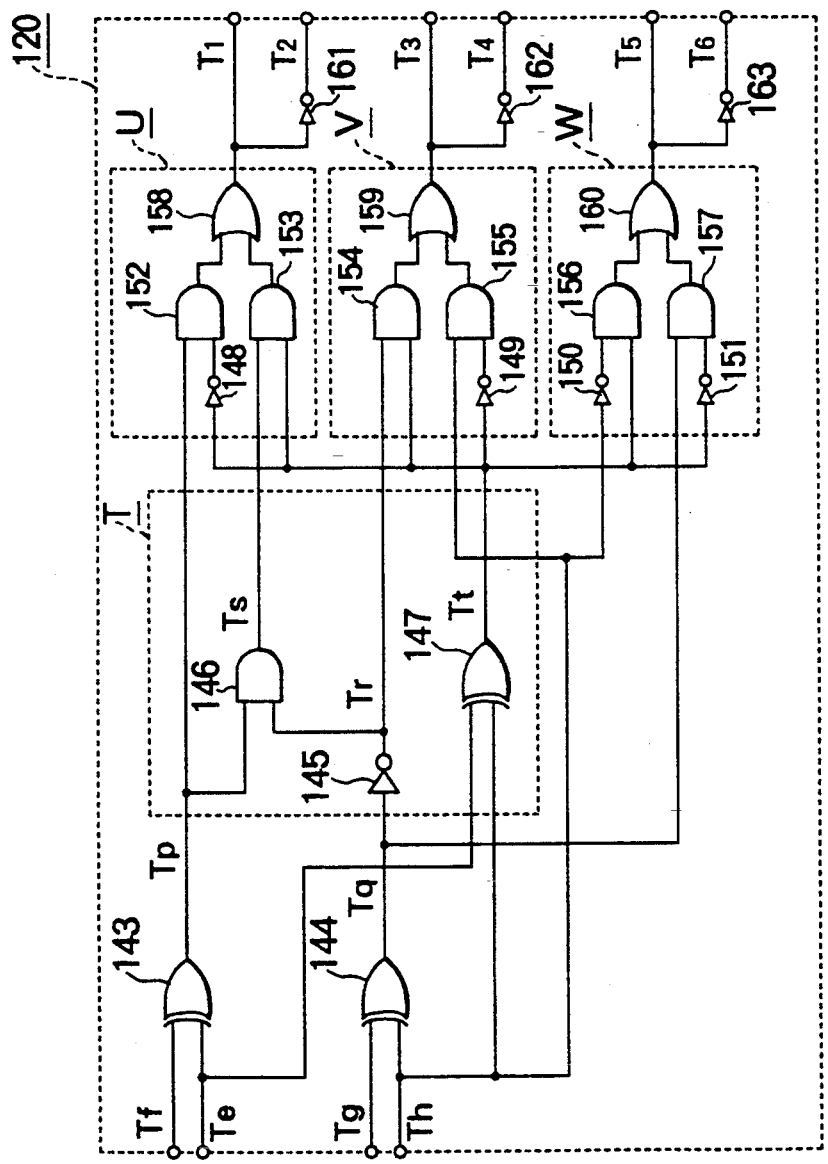
FIG. 11 is a circuit diagram showing a switching pattern generator in the fifth embodiment.

The circuit elements in the fifth embodiment are identical to those in the fourth embodiment except the switching pattern generator 120 in the control circuit 30. FIG. 11 shows the switching pattern generator 120. 143, 144, and 147 denote exclusive-OR circuits. 146 and 152 to 157 denote AND circuits. 145, 148 to 151, and 161 to 163 denote reversing circuits. 158 to 160 denote OR circuits. The reversing circuit 145, AND circuit 146, and exclusive-OR circuit 147 constitute an inverter priority signal generator T. The reversing circuit 148, AND circuits 152 and 153, and OR circuit 158 constitute a selector U. The reversing circuit 149, AND circuits 154 and 155, and OR circuit 159 constitute a selector V. The reversing circuits 150 and 151, AND circuits 156 and 157, and OR circuit 160 constitute a selector W.

Figure 12:
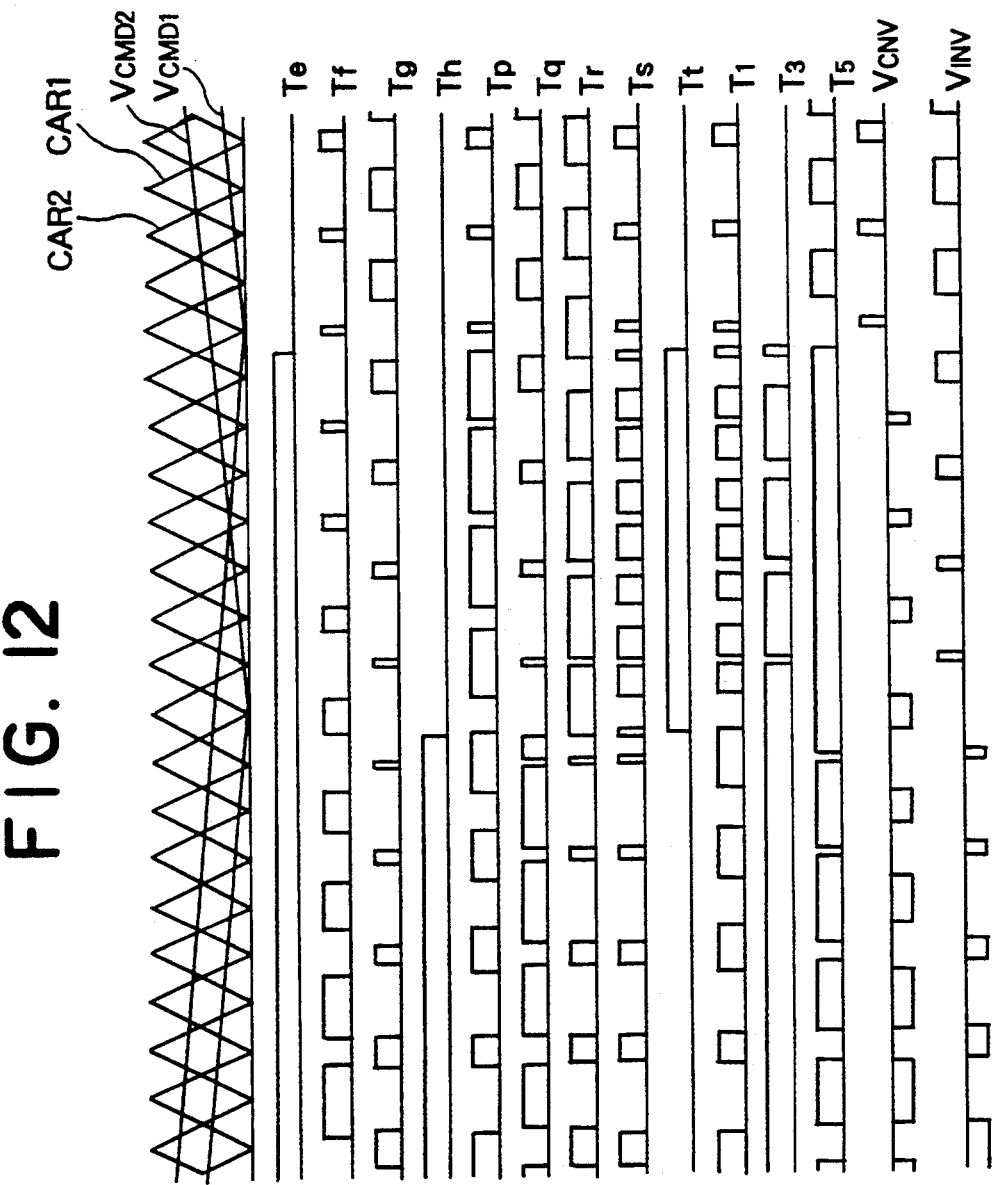
FIG. 12 shows waveforms representing the operation of the fifth embodiment.

Referring to FIG. 12, the operation will be described. The switching pattern generator 120 inputs a Converter Compared signal Tf, a converter polarity signal Te, an Inverter Compared signal Tg, and an inverter polarity signal Th. The exclusive-OR circuit 143 computes the signals Tf and The, and outputs a converter PWM signal Tp having information concerning the polarity of voltage supplied by the converter. The exclusive-OR circuit 144 computes the signals Tg and Th, and outputs a PWM signal Tq having information concerning the polarity of voltage supplied by the inverter. The reversing circuit 145 outputs a PWM reverse signal Tr that is opposite in polarity to the signal Tq (the signal Tr is output when the inverter does not perform pulse-width modulation). The AND circuit 146 calculates the AND of the signals Tp and Tr, and outputs a Converter Operable signal Ts that when the outputs of the converter and inverter are mutually inconsistent in polarity, serves as a switching signal for the converter. The exclusive-OR circuit 147 computes the signals Te and Th, and outputs a Polarity Inconsistent signal Tt. The Polarity Inconsistent signal Tt is high when the signals Te and Th are mutually inconsistent in polarity, and low when the signals Te and Th are mutually consistent in polarity. These signals Te and Th are fed to the selector U. When the signals Te and Th are mutually consistent in polarity (the signal Tt is low), the signal Tp is selected. When the signals Te and Th are mutually inconsistent in polarity (the signal Tt is high), the signal Ts is selected. The selected signal is supplied as a switching signal T1 to the switching circuit 1.

The signals Tr and Th are fed to the selector V. When the signals Te and Th are mutually inconsistent in polarity (the signal Tr is high), the signal Tr is selected. When the signals Te and Th are mutually consistent in polarity (the signal Tt is low), the signal Th is selected. The selected signal is supplied as a switching signal T3 to the switching circuit 3.

The signals Th and Tq are fed to the selector W. When the signals Th and Te are mutually consistent in polarity (the signal Tt is low), the signal Tq is selected. When the signals Th and Te are mutually inconsistent in polarity (the signal Tt is high), a signal that is opposite in polarity to the signal Th and provided by the reversing circuit 150 is selected. The selected signal is then supplied as a switching signal T5 to the switching circuit 5. The switching signals T2, T4, and T6 are opposite in polarity to the switching signals T1, T3, and T5, and supplied to the switching circuits 2, 4, and 6. These switching signals are used to produce the converter output voltage $V_{CNV}$ and inverter output voltage $V_{INV}$.

In FIG. 11, the PWM reverse signal Tr is also sent to the selector V that produces a switching signal for the selector B. As apparent from this circuitry, the fifth embodiment partly exchanges switching patterns of the inverter C and selector B. When the output voltages of the converter and inverter are mutually inconsistent in polarity, the signal T5 shown in FIG. 12 provides no pulse. The frequency of the signal T3 provided by the selector B is identical to that of the carrier. The Frequency of the signal T1 provided by the converter D is double the Frequency of the carrier.

Thus, the adoption of the technology using two kinds of carriers is advantageous in minimizing the increase in power dissipation resulting from switching.

Sixth Embodiment

Next, a power inverting apparatus of the sixth embodiment of the present invention will be described. This embodiment introduces a concept of voltage vectors which will be described later. Logical states of switching elements in the apparatus are handled as a whole using the voltage vectors, whereby switching control is effected. Similarly to the aforesaid fourth and fifth embodiments, an inverter and a converter can be operated mutually independently within a certain range. The sixth embodiment not only solves the problems lying in prior arts but also has another effect, which will be described later, by utilizing software-based control.

Figure 13:
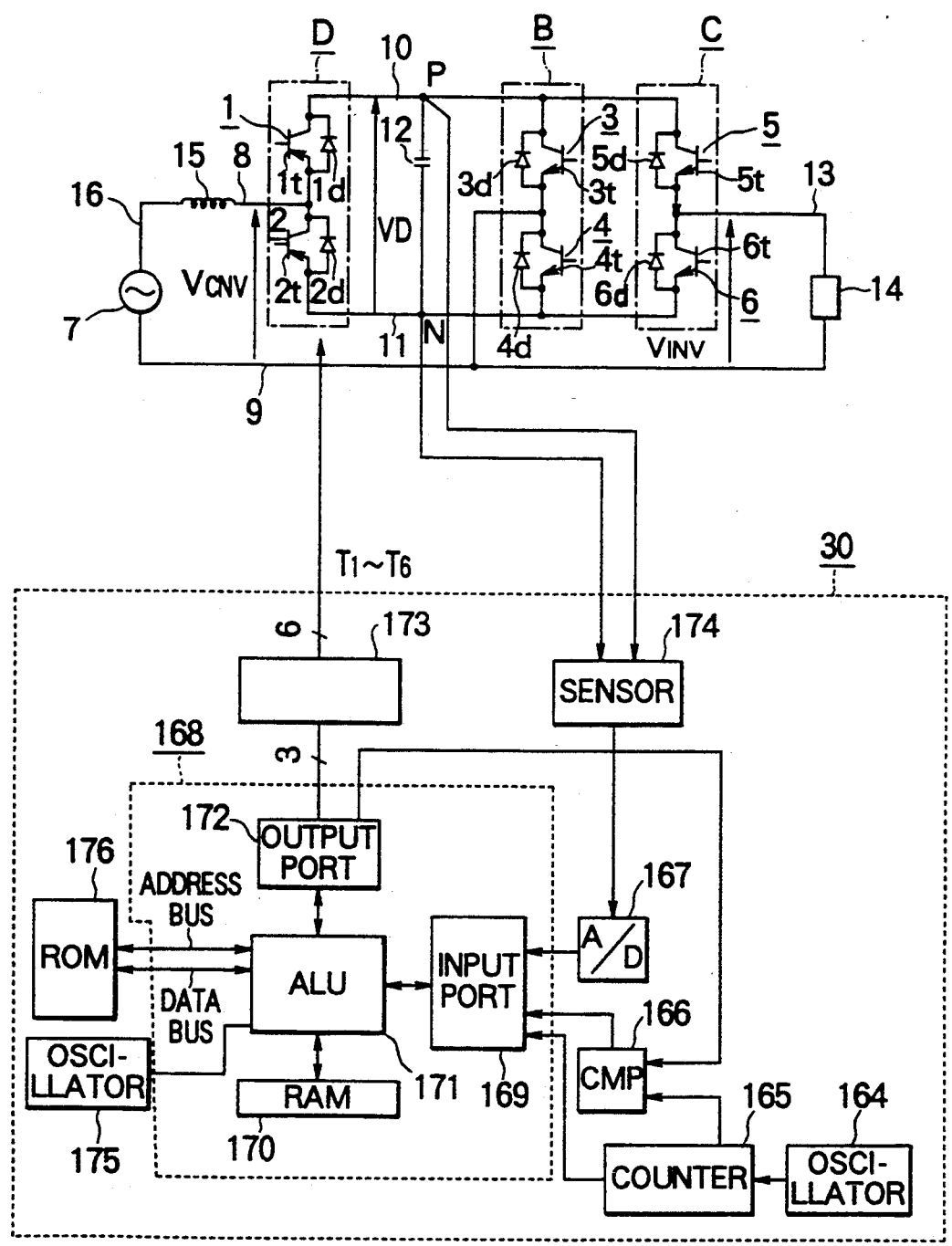
FIG. 13 is a block diagram showing a power inverting apparatus of the sixth embodiment.

The sixth embodiment of the present invention will be described in conjunction with the drawings. In FIG. 13, 30 denotes a control circuit. 164 denotes a crystal oscillator. 165 denotes a counter for counting pulses of an output signal of the crystal oscillator 164 and resetting the count at intervals of a time instant $\Delta T$. The counter 65 outputs an interrupt signal and a count at intervals of a time instant $\Delta T$. 166 denotes a comparator for comparing an output of the counter 165 with a set value provided by an arithmetic logic circuit 168 which will be described later. Depending on the result of the comparison, the comparator 66 produces an interrupt signal. 167 denotes an A/D converter. 168 denotes an arithmetic logic circuit for calculating a switching signal; such as, a microcomputer. 69 denotes an interface for inputting an external signal. 70 denotes a RAM. 171 denotes an arithmetic logic unit. 72 denotes an interface for outputting a signal to an external unit. 175 denotes a crystal oscillator for outputting a reference clock for use in operating the arithmetic logic circuit 168. 176 denotes a memory circuit containing programs for operating the arithmetic logic circuit 168; such as, a ROM. 173 denotes a switching signal generator. 174 denotes a dc voltage detector.

Figures 14, 15:
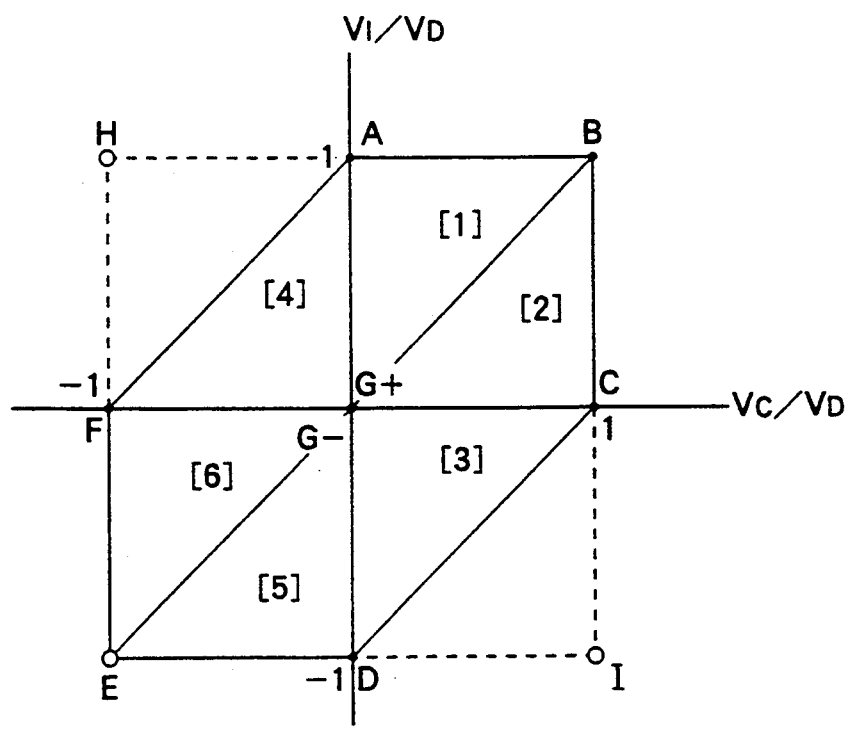
FIG. 14 is a table showing a relationship between logical states and voltage vectors.
FIG. 15 shows voltage vectors and operating domains.

Prior to the operation, voltage vectors to be introduced for the first time will be described. FIG. 14 is a table listing all logical states of switching elements. In FIG. 14, S1, S3, and S5 denote switching elements 1, 3, and 5. A logical 1 represents an on state, while a logical 0 represents an off state. The switching states of switching elements 2, 4, and 6 are opposite to those of the switching elements 1, 3, and 5, which are therefore not illustrated. As apparent from the table, a total of eight switching states A, B, C, D, E, F, G+, and G− are conceivable.

FIG. 15 shows the eight switching states in the form of voltage vectors. Assuming that a certain switching state, for example, a state A in FIG. 14 is set up, the switching element S1 is off, the switching element S3 is off, and the switching element S5 is on (the switching elements S2 and S4 are on and the switching element S6 is off). The wave height $V_C$ of converter output voltage and the wave height $V_I$ of inverter output voltage are specified relative to the dc voltage $V_D$ at the capacitor 12. In this case, $V_C=0$ and $V_I=V_D$ are established. When an orthogonal coordinate plane whose abscissa represents the quotient of $V_C/V_D$ and whose ordinate represents the quotient of $V_I/V_D$ is provided as shown in FIG. 15, the switching-state A can be represented as a vector extending from an origin to coordinates (0, 1). The switching state A is handled as a voltage vector A. That is why a letter A in FIG. 14 has an arrow crowned.

FIG. 15 shows voltage vectors representing the states A to G in FIG. 14. The voltage vector G is a zero vector. The voltage vector G is signed with a plus when the switching elements S1, S3, and S5 are all on, and signed with a minus when the switching elements S1, S3, and S5 are all off.

The operable range of a power inverting apparatus will be discussed in conjunction with the vector chart of FIG. 15. As for a typical ac-dc-ac power inverting apparatus in which a converter and an inverter operate mutually independently, the operable range is defined as $0 \leq |V_I/V_D| \leq 1$ or $0 \leq |V_C/V_D| \leq 1$. The power inverting apparatus is therefore operable within a range defined with a square BIEH. By comparison, when it comes to a conventional power inverting apparatus conditioned that converter output voltage must be in phase with inverter output voltage, since the output voltages must be mutually consistent in polarity, the inverting apparatus is operable within a range defined with squares ABCG and DEFG.

In the present invention, as mentioned above, two carriers that are 180° out of phase are used to allow a converter control and an inverter control to operate independently on a time-sharing basis at intervals of a half cycle of a carrier. When both output voltages of the converter and inverter are mutually inconsistent in polarity, the expression (4) is established.

$$|V_C| + |V_I| \leq V_D \quad (4)$$

When the converter output voltage is positive and the inverter output voltage is negative, the expression (4) is rewritten as $V_C - V_I \leq V_D$. Consequently, an expression (5) is established.

$$(V_I/V_D) \geq (V_C/V_D) - 1 \quad (5)$$

The expression (5) means that the power inverting apparatus operates in a range defined with a triangle CDG in FIG. 15.

When the converter output voltage is negative and the inverter output voltage is positive, the expression (4) is rewritten as $-V_C + V_I \leq V_D$. An expression (6) is then established.

$$(V_I/V_D) \leq (V_C/V_D) + 1 \quad (6)$$

The expression (6) means that the power inverting apparatus operates in a range defined with a triangle FAG in FIG. 15.

According to the present invention, the power inverting apparatus operates in a range ABCDEF drawn with a solid line in FIG. 15. When the range ABCDEF is divided into domains [1] to [6] as shown in FIG. 15, if voltage vector commands are issued on the basis of a converter voltage command and an inverter voltage command, voltage vectors leading to three apices of a domain defined with the converter and inverter voltage commands are combined to produce a voltage vector. For example, when the domain [1] is defined, the voltage vectors A, B, and G are combined. The voltage vectors are allocated according to the valid time intervals thereof within a unit processing time interval ΔT.

FIG. 16 shows combinations of voltage vectors domain by domain.

In FIG. 16, $T_C$ denotes a time interval calculated on the basis of a use rate of a converter output for a dc voltage, which is provided as an equation (7).

$$T_C = (|V_C|/V_D) \cdot \Delta T, \quad T_C \leq \Delta T \quad (7)$$

$T_I$ denotes a time interval calculated on the basis of a use rate of an inverter output for a dc voltage, which is provided as an equation (8).

$$T_I = (|V_I|/V_D) \cdot \Delta T, \quad T_I \leq \Delta T \quad (8)$$

In FIG. 16, o means that the condition $|V_C| > |V_I|$ is satisfied, and x means that the condition is unsatisfied.

Next, the operation of the sixth embodiment of the present invention will be described.

Figure 17:
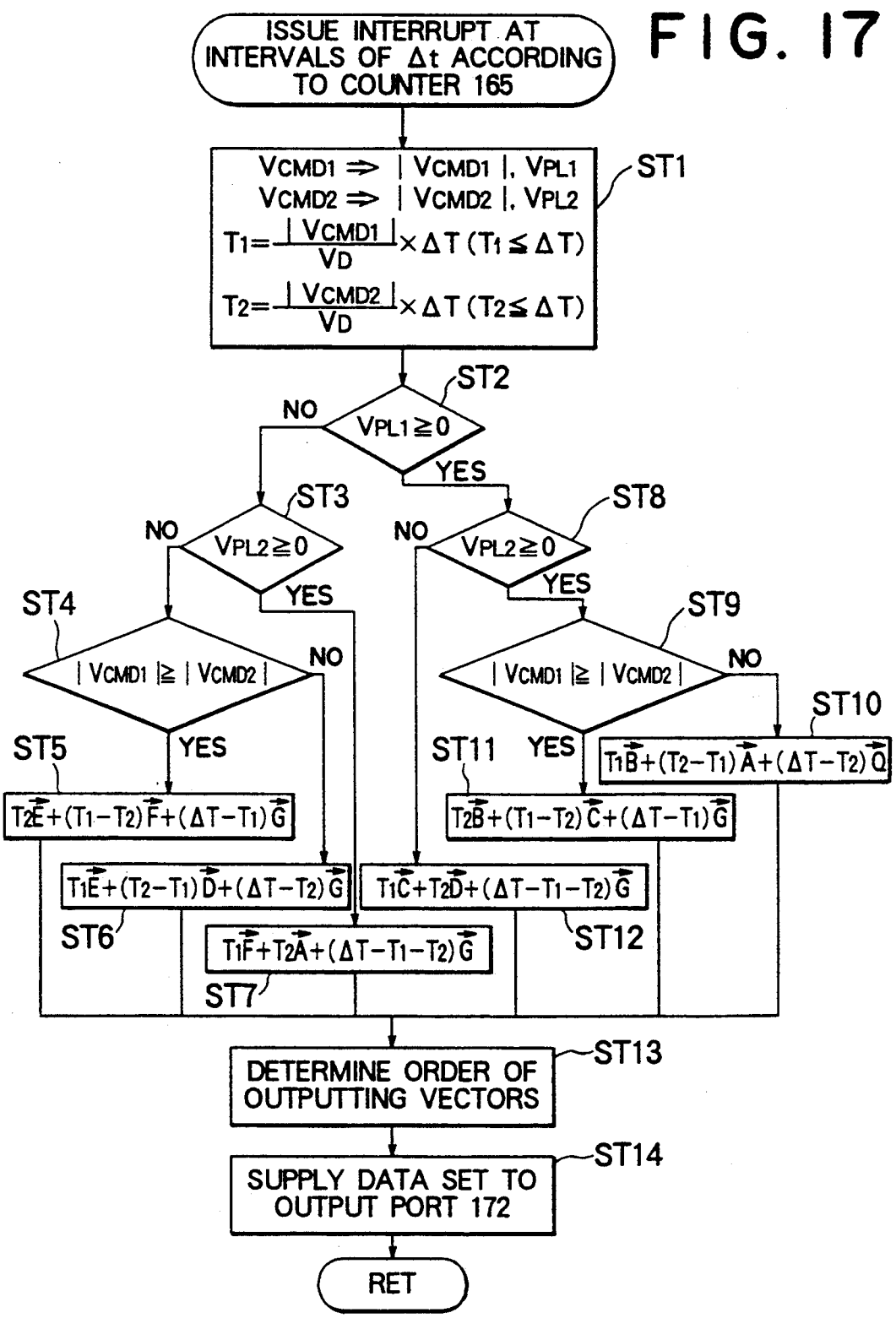
FIG. 17 to 19 are flowcharts showing the operation of the sixth embodiment.

FIG. 17 is a flowchart showing a procedure in this embodiment. An interrupt with which a unit processing time interval or cycle T starts is issued when the counter 165 is reset. First, an absolute value $|V_{CMD1}|$ of a converter voltage command $V_{CMD1}$ is calculated and a polarity signal $V_{PL1}$ concerning the signal $V_{CMD1}$ is produced. An absolute value $|V_{CMD2}|$ of a inverter voltage command signal $V_{CMD2}$ is calculated and a polarity signal $V_{PL2}$ concerning the signal $V_{CMD2}$ is produced. A dc voltage detected by the dc voltage detector 174 is converted into a digital value by the A/D converter 167, and then fed to the arithmetic logic circuit 168. The digital value $V_D$ of the dc voltage is assigned to the aforesaid equations (7) and (8).

Next, the polarities of output voltages of the converter and inverter are specified by following steps ST2, ST3, and ST8. At steps ST4 and ST9, the absolute value $|V_{CMD1}|$ of the converter voltage command $V_{CMD1}$ is compared with the absolute value $|V_{CMD2}|$ of the inverter voltage command $V_{CMD2}$. A domain shown in FIG. 16 is then specified. At steps ST5 to ST7 and ST10 to ST12, an equation associated with the domain is computed to specify a switching pattern. Depending on the result of the computation, an order of outputting three vectors Z(1), Z(2), and Z(3) which are derived from reasoning (which will be described later) is determined at step ST13. First, the vector Z(1) and the output time interval T(1) are output at step ST14. The vectors Z(2) and Z(3), the output time intervals T(2) and T(3), and a count i (which is 1 in this case) within the program are placed in the RAM 170. Data is set in the output interface 172 at step ST14. The interrupt processing then terminates. The output interface 172 outputs the set data Z(i) to the switching signal generator 173, and data T(i), which includes a count and a time instant at which the data Z(i) should be output, to the comparator 166. The switching signal generator 173 reverses in polarity the input signals S1, S3, and S5 to produce signals S2, S4, and S6, and outputs the produced signals as switching signals for the switching elements 1 to 6. The comparator 166 compares the output of the arithmetic logic circuit 168 with the output of the counter 165. If the output of the counter 165 has a larger value, the output signal of the comparator 166 goes from high to low. In response to the output signal, the input interface 169 of the arithmetic logic circuit 168 generates an interrupt in synchronization with the trailing edge of the output signal. The processing shown in the flowchart of FIG. 18 is then executed.

Figure 18:
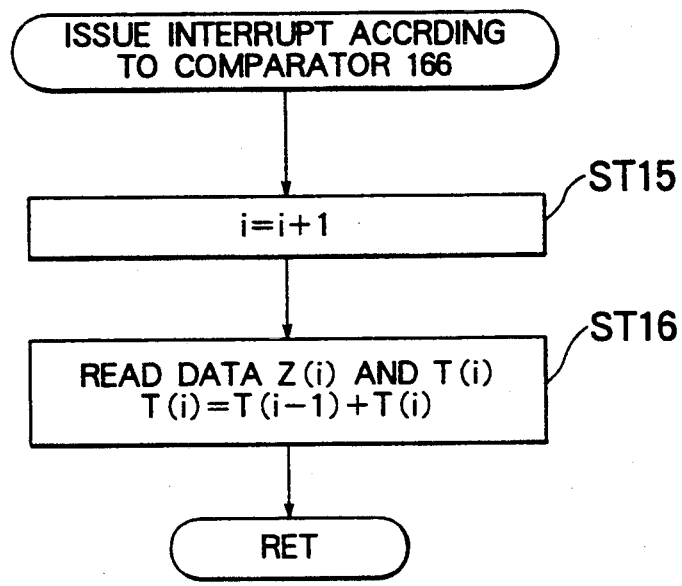

In FIG. 18, the count i within the program is read from the RAM 170 at step ST15, and incremented by one. The new value is then specified as a i count. The data Z(i) and T(i) are read from the RAM 170 at, step ST16. A value resulting from T(i)+T(i−1) is then specified as new data T(i). The new data T(i) is then supplied to the output interface 172. The output interface 172 repeats the above operation, whereby the three vectors are output within the cycle T.

Thus, a converter voltage command and an inverter voltage command are substantially converted into a voltage vector command. A domain in FIG. 16 is specified according to the voltage vector command. Switching signals are controlled according to a combined vector derived from the domain.

The calculated switching pattern is defined by three vectors. Depending on the order of outputting the vectors, a switching frequency increases to vary power dissipation. This results in varying power inverting efficiency. The transient fluctuation in voltage command or dc voltage affects the efficiency in controlling an output waveform. The order of outputting three vectors that define a switching pattern should therefore be determined carefully.

Figure 19:
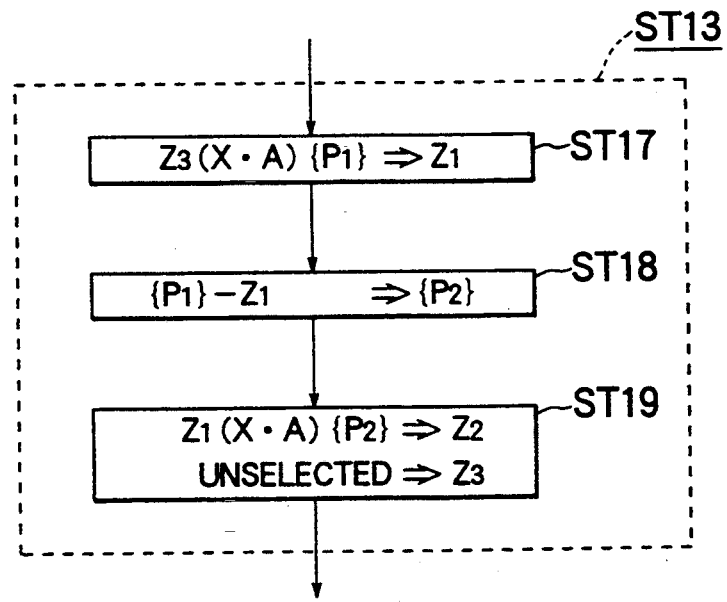

The sixth embodiment therefore includes a processing means for determining an output order that minimizes power dissipation. FIG. 19 is a flowchart showing processing for determining the output order of vectors; that is, an example of processing performed at step ST13 in FIG. 17. At step ST17, a computation (X·A) is calculated by computing a vector Z3 that has been calculated in response to the previous interrupt issued according to the counter and provided last, and a set {P1} of three vectors that are calculated in response to the current interrupt. This results in a vector Z1 to be output first.

The operation (X·A) will be briefed below. Assuming that a set {P} includes a vector A (a1, a2, a3), a vector X (x1, x2, x3), and a vector Y (y1, y2, y3), a result AX of computation involving the vectors A and X is provided as follows:

$$AX = [a1(\text{exclusive-OR})x1] + [a2(\text{exclusive-OR})x2] + [a3(\text{exclusive-OR})x3] \quad (9)$$

A result AY of computation involving the vectors A and Y is provided as follows:

$$AY = [a1(\text{exclusive-OR})y1] + [a2(\text{exclusive-OR})y2] + [a3(\text{exclusive-OR})y3] \quad (10)$$

The vectors are defined so that either the value AX or AY, whichever is smaller, will be equal to the result of a computation $A(X-A)\{P\}$.

For example, the vector A is defined as (1, 1, 0), the vector X is defined as (0, 0, 1), and the vector Y is defined as (1, 0, 1).

$$AX = 1 + 1 + 1 = 3$$

$$AY = 0 + 1 + 1 = 2$$

Thus, the value AY is smaller than the value AX. The vector Y is selected as a vector to be output next.

Next, the vector Z1 calculated at step ST17 is removed from the set {P1} to produce a set {P2} at step ST18. At step ST19, the vector Z1 and set {P2} are computed to calculate the (X·A) operation. As a result, a vector Z2 is selected and a vector Z3 is unselected. When the vector G is subjected to an (A·X) operation, both the vectors G+(1, 1, 1) and G−(0, 0, 0) are assigned to the equations for the (X·A) operation. Either of the vector G+ or G−, whichever provides a smaller result, is selected. This sequence of operations determines an output order for minimizing power dissipation resulting from switching.

Seventh Embodiment

Figure 20:
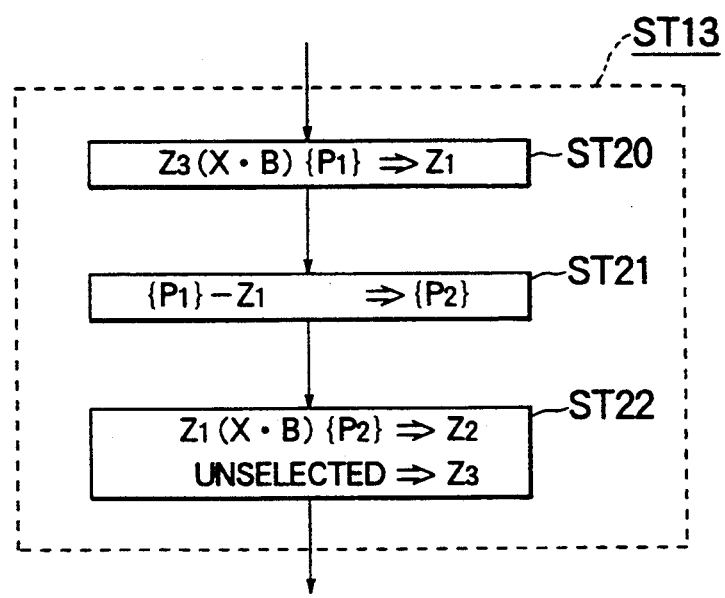
FIG. 20 is a flowchart showing the operation of the seventh embodiment.

Next, the seventh embodiment includes a processing means for determining an output order that optimizes control of inverter output voltage. FIG. 20 is a flowchart showing processing performed at step ST13 in FIG. 17 at which an output order of vectors is determined. At step ST20, an (X·B) operation is calculated by computing a vector Z3 that has been calculated in response to a previous interrupt issued according to the counter and provided last, and a set {P1} of three vectors that are calculated in response to a current interrupt. This results in a vector Z1 to be output first this time.

The (X·B) operation will be briefed below. Assuming that a set {P} includes a vector A (a1, a2, a3), a vector X (x1, x2, x3), and a vector Y (y1, y2, y3), a result AX of computation involving the vectors A and X is provided as follows, $$AX = [a1(\text{exclusive-OR})x1] + 10x [a2 (\text{exclusive-OR})x2] + 100x [a3 (\text{exclusive-OR})x3] \quad (11)$$

and a result AY of computation involving the vectors A and Y is provided as follows, $$AY = [a1 (\text{exclusive-OR})y1] + 10 x [a2 (\text{exclusive-OR})y2] + 100 x [a3 (\text{exclusive-OR})y3] \quad (12)$$

The vectors concerned are defined so that either the value AX or AY, whichever is larger, will be equal to a result of an operation $A(X \cdot B) \{P\}$. In the above equations, 10 and 100 are weighting factors.

For example, the vector A is defined as (1, 1, 0), the vector X is defined as (1, 0, 1), and the vector Y is defined as (1, 0, 0).

$$AX = 0 + 10 \cdot 1 + 100 \cdot 1 = 110$$

$$AY = 0 + 10 \cdot 1 + 100 \cdot 0 = 10$$

The AX value is larger than the AY value. The vector X is therefore selected as a vector to be output next.

Next, the vector Z1 calculated at step ST20 is removed from the set {P1} to produce a set {P2} at step ST21. At step ST22, the vector Z1 and set {P2} are computed to calculate an (X·B) operation. Based on the results of the operation, a vector Z2 is selected and a vector Z3 is unselected. When the vector G is subjected to the (X·B) operation, both the vector G+(1, 1, 1) and vector G−(0, 0, 0) are assigned to the equations for the (X·B) operation. Either the vector G+ or G−, whichever provides a smaller result, is selected. Weighting is effected by multiplying the logical state value of the switching element S5 of the inverter C by 100, and the logical state value of the switching element S3 of the selector B by 10. Due to the weighting, a switching signal for the inverter is output precedently. As a result, even if dc voltage fluctuates due to a the fluctuations in voltage at the ac voltage source 7 and loading circuit 14, the output voltage of the inverter can remain stable until it comes to a threshold voltage of the power inverting apparatus.

When the dc voltage $V_D$ drops abruptly in a normal control mode, if the control system reacts to increase the pulse duration of the dc voltage $V_D$, the above three voltage vectors may not be able to be output during the unit processing time interval $\Delta T$. Even in this case, when the procedure shown in FIG. 20 is adopted, switching in the inverter is effected with precedence, the fluctuation in inverter output voltage is suppressed to an extent comparable to the precedence.

As mentioned above, even when one of three vectors cannot be output, the last vector for a cycle $\Delta T$ is a vector selected as a vector to be output last on the basis of the result of the operation in FIG. 20. The last vector is defined as the vector Z3 serving as a reference in calculating an output order of vectors for the next cycle ΔT.

The circuitry and sequence of operations for the sixth or seventh embodiment is not limited to those shown in FIGS. 13, and 17 to 20.

Eighth Embodiment

Next, the eighth embodiment will be described in conjunction with the drawings.

Figure 21:
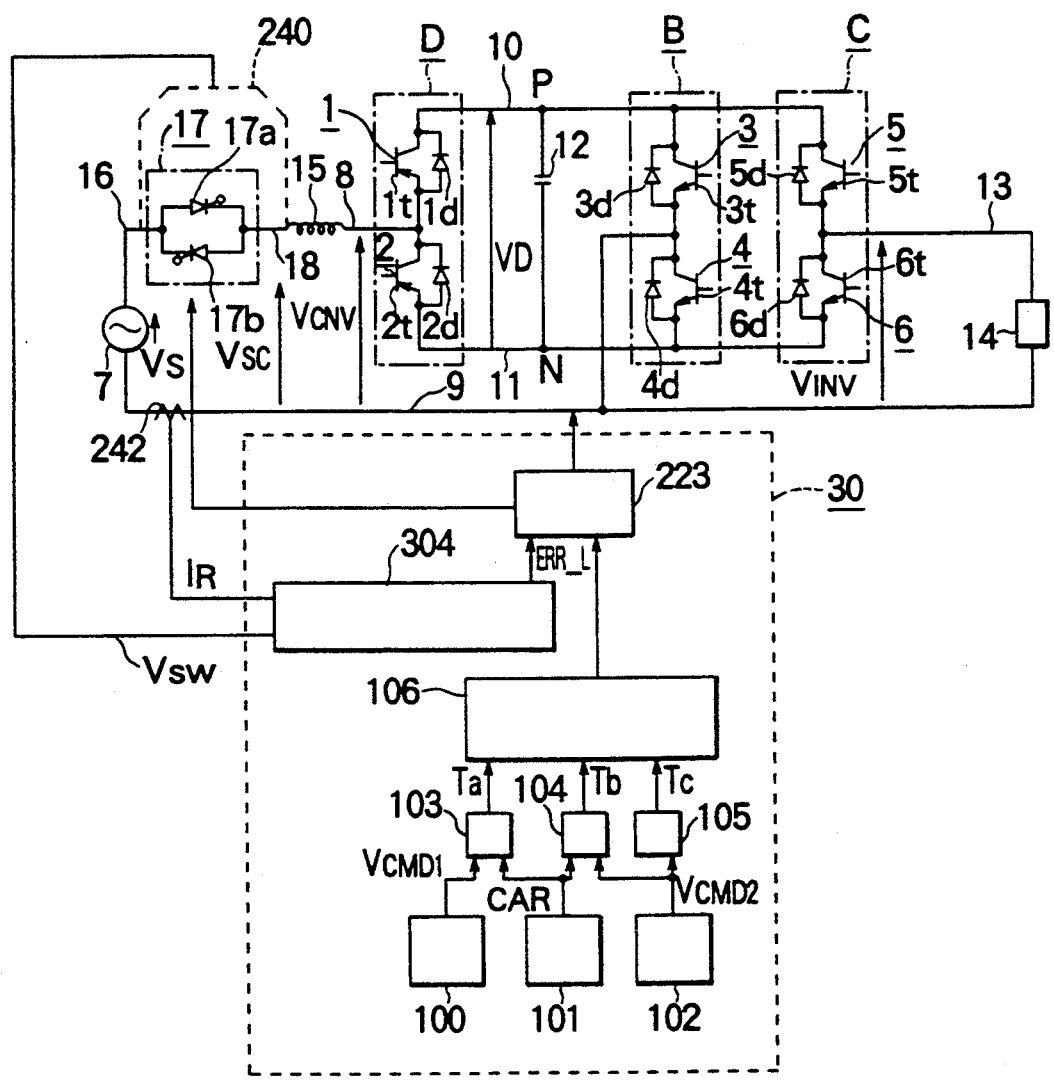
FIG. 21 shows a configuration of a power inverting apparatus of the eighth embodiment.

FIG. 21 is a block diagram showing a configuration of a power inverting apparatus of the eighth embodiment.

In FIG. 21, the reference numerals identical to those in FIG. 1 denote the same circuit elements as those in the first embodiment. The description of the circuit elements will be omitted. 240 denotes a voltage detecting means for detecting a voltage $V_{SW}$ across the input voltage control circuit 17 serving as a bidirectional switching circuit. 242 denotes a current detecting means for detecting an input current $I_R$ to be fed from the ac voltage source 7 to the converter D. 304 denotes an error detector for detecting that the input current has grown to be overcurrent. After the inverter and converter are suspended, the error detector 304 analyzes the voltage $V_{SW}$ across the input voltage control circuit 17 detected by the voltage detecting means 240 and then determines conditions under which the inverter and converter can be restarted. 223 denotes a gate circuit.

Figure 22:
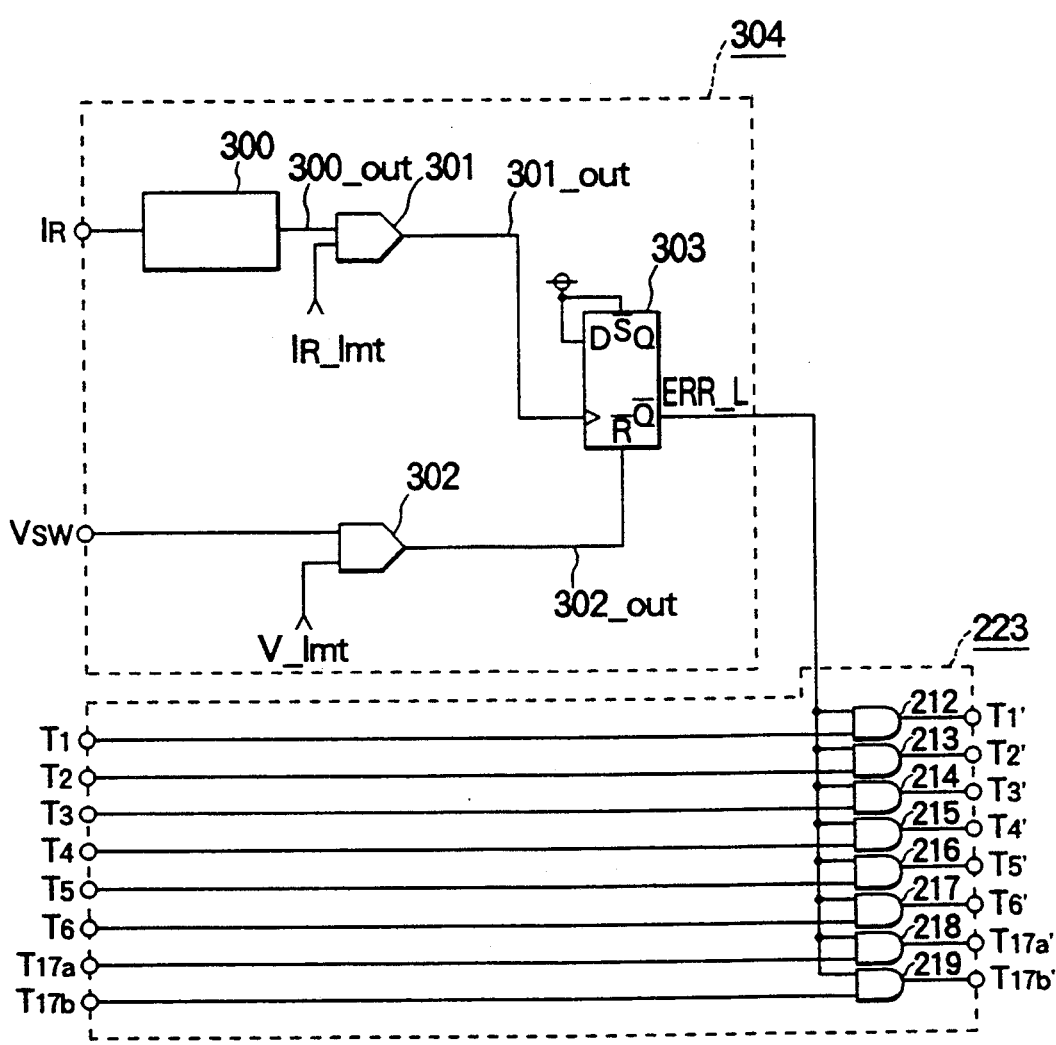
FIG. 22 shows an error detector and gate circuits in the eighth embodiment.

FIG. 22 shows an example of a configuration of the error detector 304 and gate circuit 223. In FIG. 22, 300 denotes an absolute value circuit for identifying an absolute value of the input current $I_R$. 301 denotes a comparator that when an output signal IRA of the absolute value circuit exceeds a value $I_R 1mt$ of overcurrent, outputs a high-level output signal 300out. 302 denotes a comparator that when the voltage $V_{SW}$ across the input voltage control circuit 17 exceeds a reference voltage V1mt of given level, outputs a high-level output signal 302out. 303 denotes a D flip-flop. 212 to 219 denote AND circuits for blocking gates.

Figure 23:
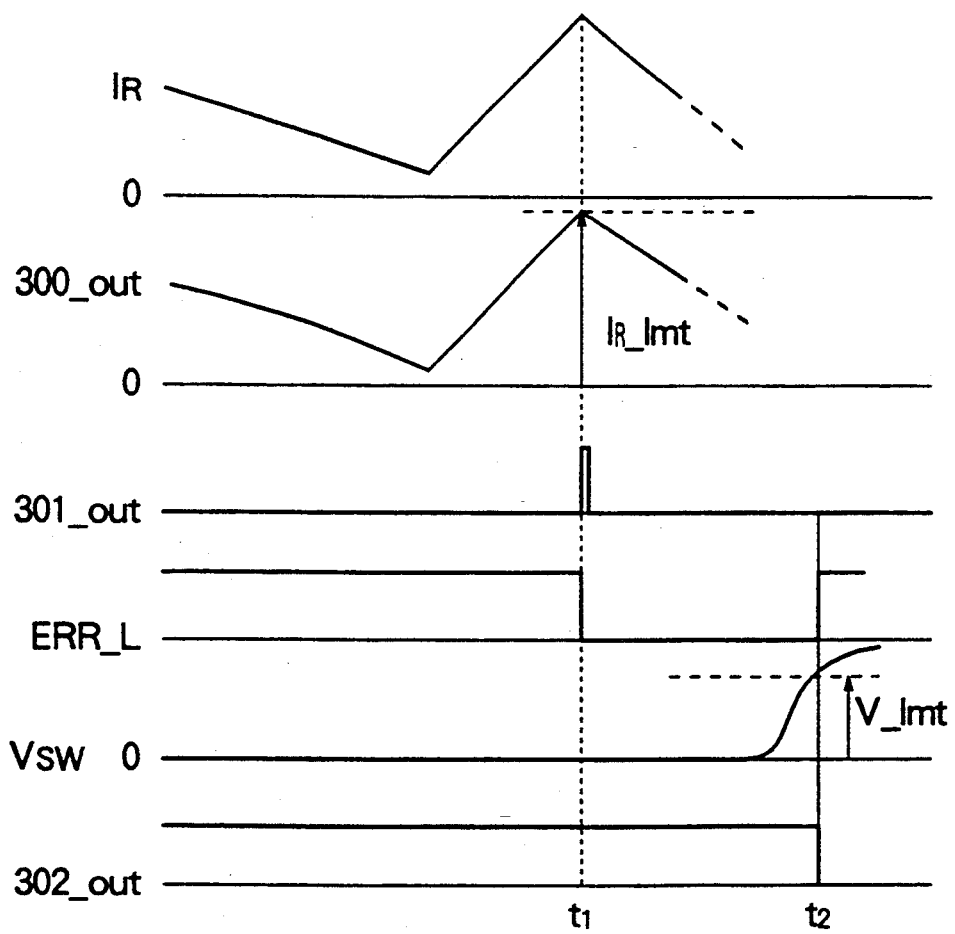
FIG. 23 shows waveforms representing the operation of the eighth embodiment.

Next, the operation will be described with reference to the waveforms representing the actions of circuit elements shown in FIG. 23.

In FIG. 21, the input current $I_R$ to be fed from the ac voltage source 7 to the converter D is detected by the current detecting means 242, fed to the error detector 304, processed to calculate an absolute value through the absolute value circuit 300 in the error detector 304, and then fed to the comparator 301. At a time instant t1 in FIG. 23, the output 300out of the absolute value circuit 300 exceeds the value $I_R 1mt$ of overcurrent. The output signal 301out of the comparator 301 then goes high. The D flip-flop 303 changes states from the state defined with a low-level signal to the one defined with a high-level signal. This causes the output signal ERRL of the D flip-flop 303 to go low. All the output signals T1' to T6', T17a', and T17b' of the AND circuits 212 to 219 are driven low. Consequently, gate blocking is effected.

Next, at a time instant t2, the voltage $V_{SW}$ across the input voltage control circuit 17 detected by the voltage detecting means 240 exceeds the reference voltage V1mt set for the comparator 302. The output signal 302 out of the comparator 302 then goes low. The output signal ERRL of the D flip-flop 303 is driven high forcibly. The gate blocking is then released. When the gate blocking is released, the input voltage control circuit 17 restarts switching. The voltage across the input voltage control circuit 17 becomes zero. The output signal 302 out of the comparator 302 goes high. A normal control mode is re-set.

According to the eighth embodiment, when it is detected that the input current $I_R$ to be fed from the ac voltage source 7 to the converter D has grown to be overcurrent, all switching commands can be specified to turn off the switching elements in the inverter C and converter D as well as the switching elements in the input voltage control circuit 17. The input current $I_R$ therefore charges the smoothing capacitor 12 to be zero, which prevents occurrence of a drawback resulting from excessive input current. After the abnormal state that excessive input current flows is avoided, the converter and inverter are restarted. This results in stable power inversion.

Ninth Embodiment

Next, the ninth embodiment will be described in conjunction with the drawings.

Figure 24:
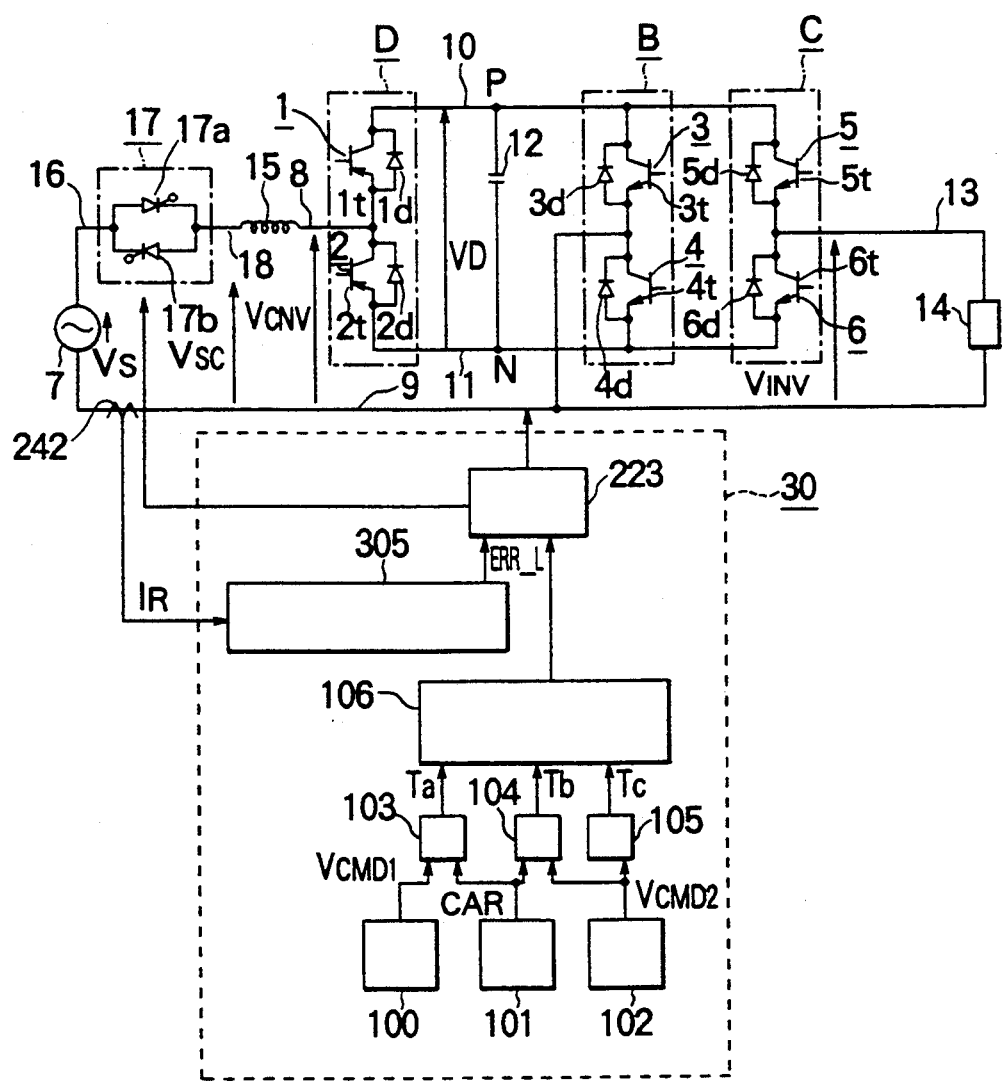
FIG. 24 shows a configuration of a power inverting apparatus of the ninth embodiment.

FIG. 24 is a block diagram showing a configuration of a power inverting apparatus of the ninth embodiment.

In FIG. 24, a circuit element different from the one in the eighth embodiment shown in FIG. 21 is the error detector 305 in the control circuit 30. The error detector 305 detects that the input current detected by the current detecting means 252 has grown to be overcurrent. After the inverter and converter are suspended, the error detector 305 analyzes the input current $I_R$ detected by the current detecting means 252 and then determines conditions under which the inverter and converter can be restarted. The other circuit elements are identical to those in the seventh embodiment, of which description will be omitted.

Figure 25:
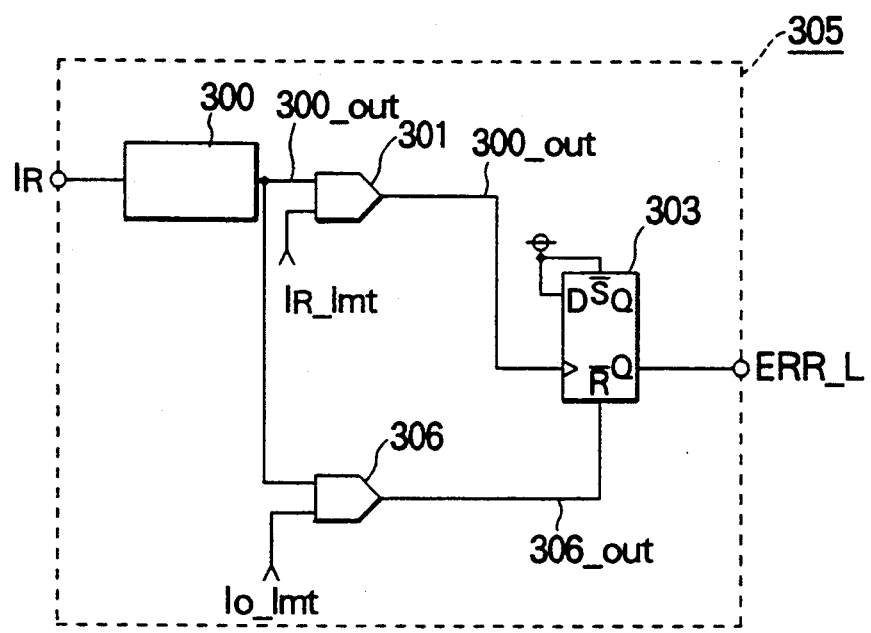
FIG. 25 shows an error detector in the ninth embodiment.

FIG. 25 shows a circuitry of the error detector 305.

In FIG. 25, 306 denotes a comparator that when the output signal 300out of the absolute value circuit 300 for detecting an absolute value of the input current $I_R$ becomes zero, provides a low-level output signal 306out. The other circuit elements of the error detector 305 are identical to those in the seventh embodiment shown in FIG. 22, of which description will therefore be omitted.

Figure 26:
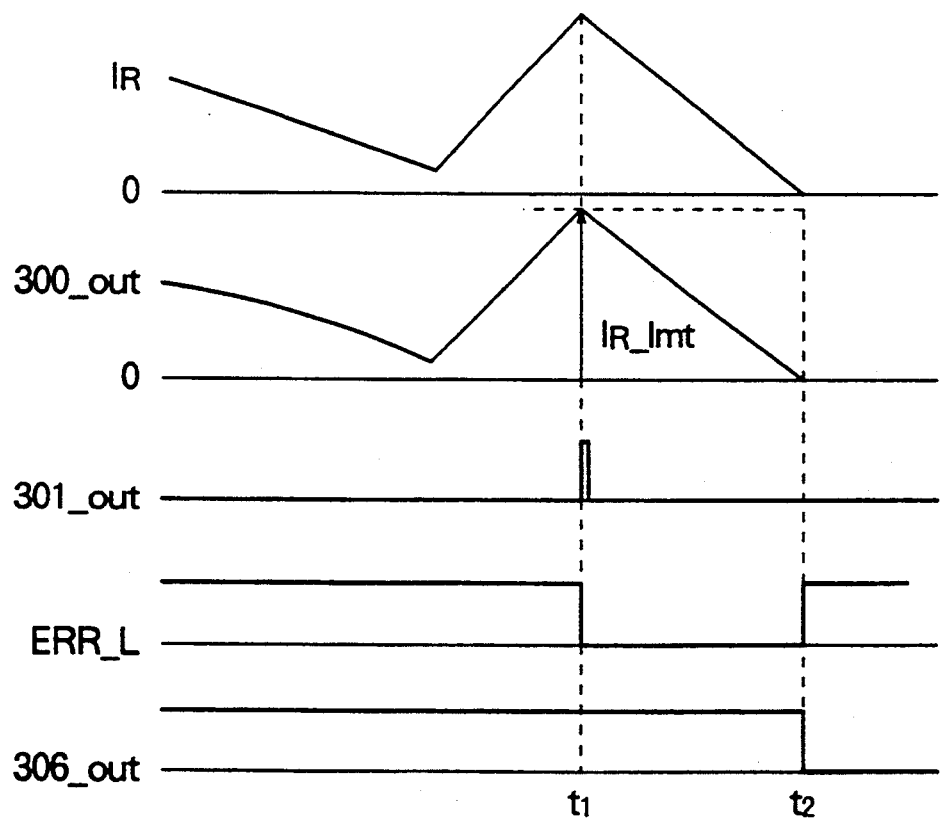
FIG. 26 shows waveforms representing the operation of the ninth embodiment.

Next, the operation will be described with reference to the waveforms representing the actions of circuit elements in FIG. 26.

In FIG. 24, the input current $I_R$ to be fed from the ac voltage source 7 to the converter D is detected by the current detecting means 242, fed to the error detector 305, processed to calculate an absolute value by means of the absolute value circuit 300 in the error detector 305, and then fed to the comparator 301. At the time instant t1 in FIG. 26, the output signal 300out of the absolute value circuit 300 exceeds the value $I_R 1mt$ of overcurrent. The output signal 301out of the comparator 301 then goes high. The D flip-Flop 303 changes states from the state defined with a low level to the one defined with a high level. This causes the output signal ERRL of the D flip-flop 303 to go low. Similarly to the seventh embodiment, the output signal ERRL causes all the output signals of the gate circuit 223 to go low. Thus, gate blocking is effected.

Next, at the time instant t2, the input current $I_R$ reaches zero. The output signal 306out of the comparator 306 then goes low. The output signal ERRL of the D flip-flop 303 is driven high forcibly. The gate blocking is then released. When the gate blocking is released, the input voltage control circuit 17 restarts switching. The output signal 306out of the comparator 306 is then driven high. A normal control mode is then re-set.

According to the ninth embodiment, when it is detected that the input current $I_R$ to be fed from the ac voltage source 7 to the converter D has grown to be overcurrent, switching commands are specified to turn off all the switching elements in the inverter C and converter D as well as those in the input voltage control circuit 17. The input current $I_R$ charges the smoothing capacitor 12 to be zero, which prevents occurrence of a drawback resulting from excessive input current. Once the abnormal state that excessive input current flows is avoided, the converter and inverter are restarted. This results in stable power inversion. Furthermore, since the switching elements in the input voltage control circuit 17 are turned off according to the input current $I_R$, even if the switching elements are, for example, thyristors incapable of suppressing arcing by themselves, the switching elements can be turned off reliably. Unlike the seventh embodiment, the voltage detecting means for detecting the voltage across the input voltage control unit 17 is unnecessary. This results in a low-cost power inverting apparatus.

Tenth Embodiment

Next, the tenth embodiment will be described in conjunction with the drawings.

In the aforesaid eighth or ninth embodiment, when the error detector 304 or 405 detects that the input current $I_R$ flowing from the ac voltage source 7 into the converter D has grown to be overcurrent, the gate circuit 223 is controlled to provide commands specifying that all switching elements should be turned off.

Figure 27:
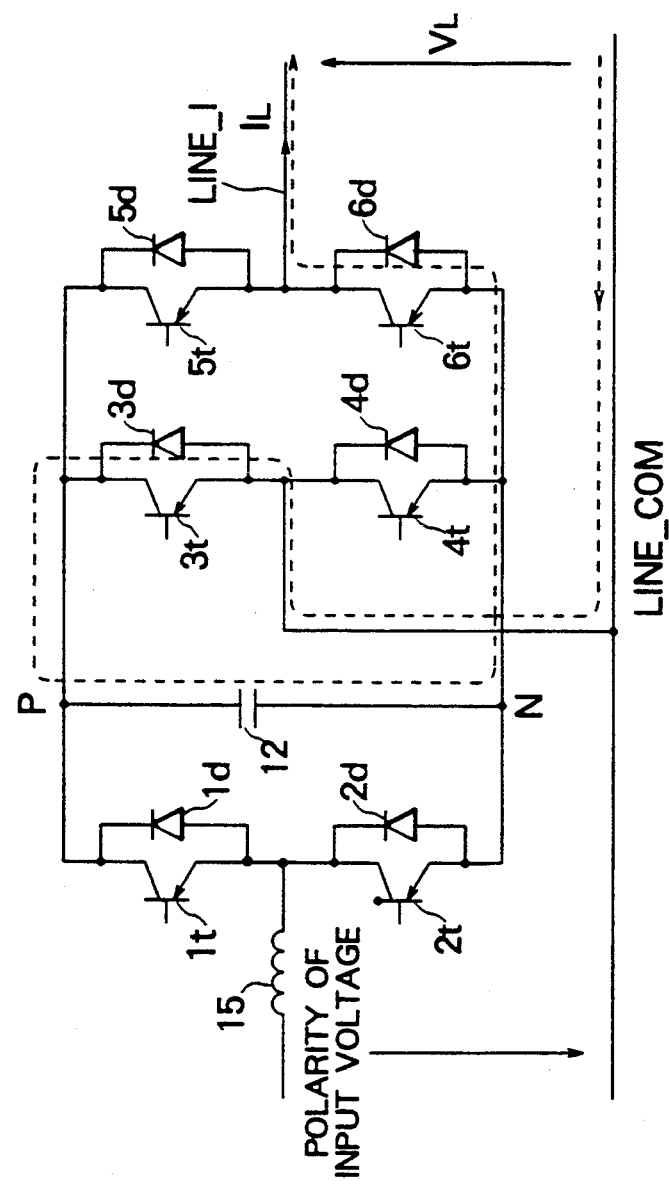
FIG. 27 shows a current flow occurring with the gates in the eighth or ninth embodiment blocked.

In FIG. 27, assume that the input voltage supplied by the ac voltage source 7 is of negative polarity and the output voltage command of the inverter C is of positive polarity. Also assume that an output current $I_L$ of the inverter C is flowing in the arrow direction in FIG. 27. In this situation, when the error detector operates to detect an abnormal state, gate blocking is effected. The output current $I_L$ flows along the route indicated with a dashed line in FIG. 27. Specifically, the output current $I_L$ flows along a line LINECOM, through a diode 3d, a point P, the smoothing capacitor 12, a point N, and a diode 6d, and then along a line LINEI. The input current $I_R$ flow along the line LINECOM, and through the diode 3d, point P, smoothing capacitor 12, point N, diode 2d, and reactor 15. In the meantime, the input current $I_R$ charges the smoothing capacitor to decay.

The voltage at the point P is induced in the line LINECOM and the voltage at the point N is induced in the line LINEI. The voltage $V_L$ induced in an output terminal of the inverter C is de voltage of negative polarity. However, since the output voltage command destined for the inverter C is of positive polarity. The output voltage $V_L$ is therefore opposite in polarity to the output voltage command. Eventually, the voltage to be applied to a load may become negative. Thus, the influence of the output voltage $V_L$ upon the load is not negligible.

Figure 28:
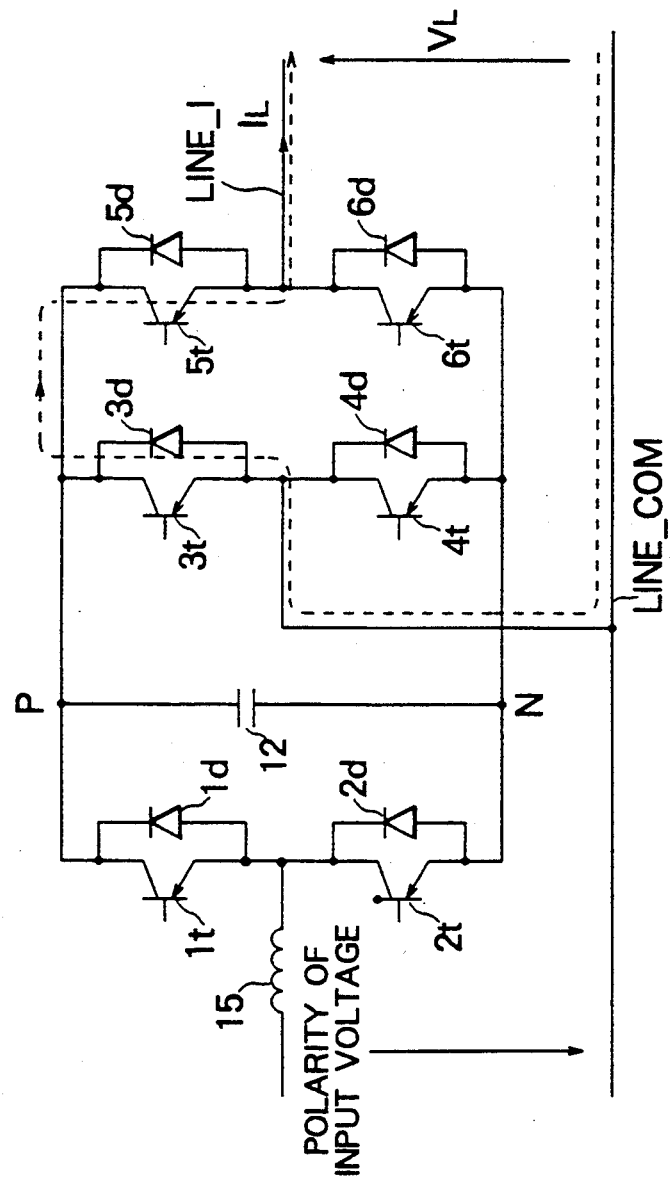
FIGS. 28 and 29 show current flows occurring with the gates in the tenth embodiment blocked.

To alleviate the above influence, as shown in FIG. 28, switching elements 3t and 5t are turned on so that the inverter C provides a zero output. The output current $I_L$ is circulated as shown in FIG. 28. Specifically, the output current $I_L$ flows along the line LINECOM, through the diode 3d, switching element 5t, and then along the line LINE I. The input current $I_R$ flows along the line LINECOM, through the diode 3d, point P, smoothing capacitor 12, point N, and diode 2d, into the reactor 15. In the meantime, the input current $I_R$ charges the smoothing capacitor to decay.

Figure 29:
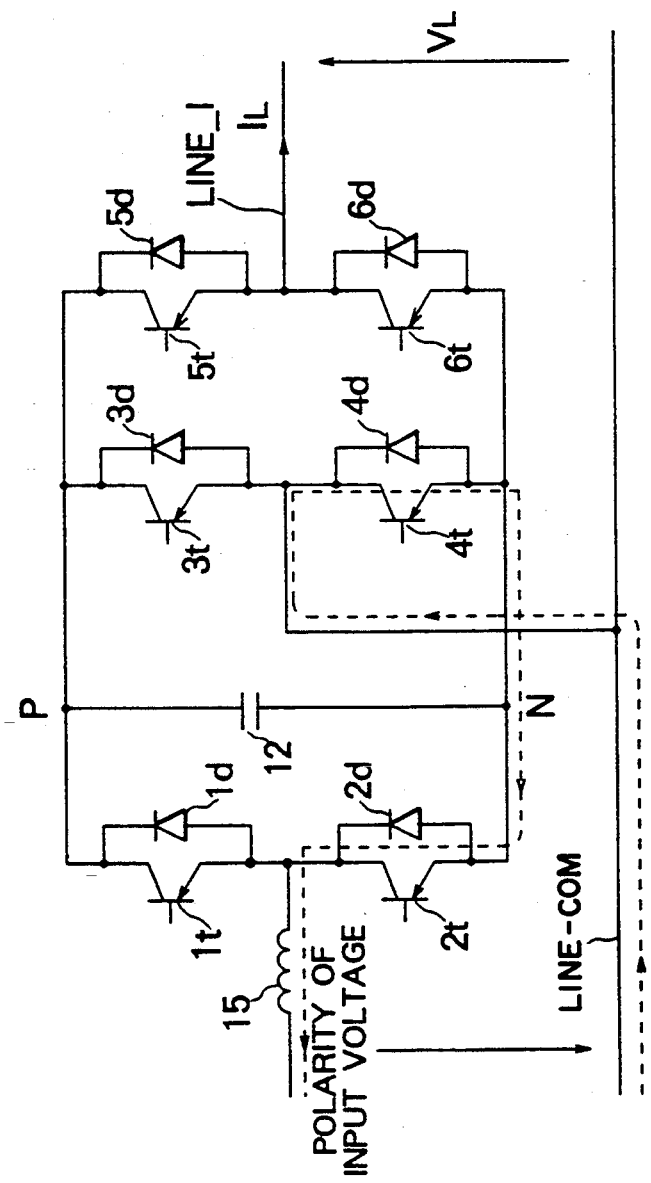

For allowing the inverter C to provide a zero output, as shown in FIG. 29, switching elements 4t and 6t may be turned on. In this case, the input current $I_R$ follows a dashed line in FIG. 29; that is, flows along the line LINECOM, through the switching element 4t, point N, and diode 2d, into the reactor 15. The input current $I_R$ glows further. Consequently, the inverter C is not allowed to provide a zero output.

When the input current $I_R$ is reversed in polarity, the switching elements 4t and 6t are turned on so that the output voltage of the inverter C will be zero. The subsequent actions of circuit elements are the same as those described above, of which description will be omitted.

Figure 30:
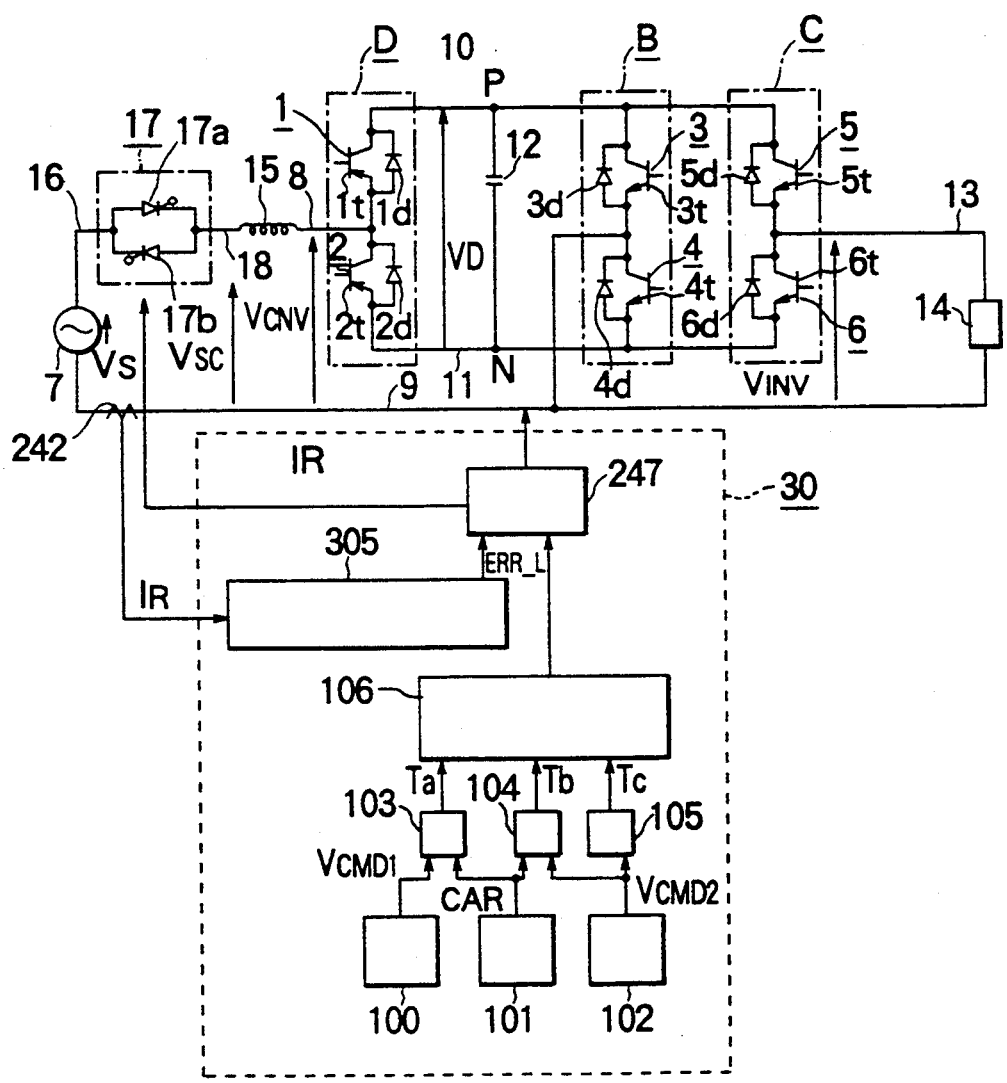
FIG. 30 shows a configuration of a power inverting apparatus of the tenth embodiment.

FIG. 30 is a block diagram showing a configuration of a power inverting apparatus of the tenth embodiment.

In FIG. 30, the reference numerals identical to those in FIG. 24 denote the same circuit elements as those in the ninth embodiment. 247 denotes a gate circuit with a built-in polarity detector residing in the control circuit 30. 1 to 17, 100 to 106, 242, 305, and B to D denote the same circuit elements as those in the ninth embodiment, of which description will therefore be omitted.

Figure 31:
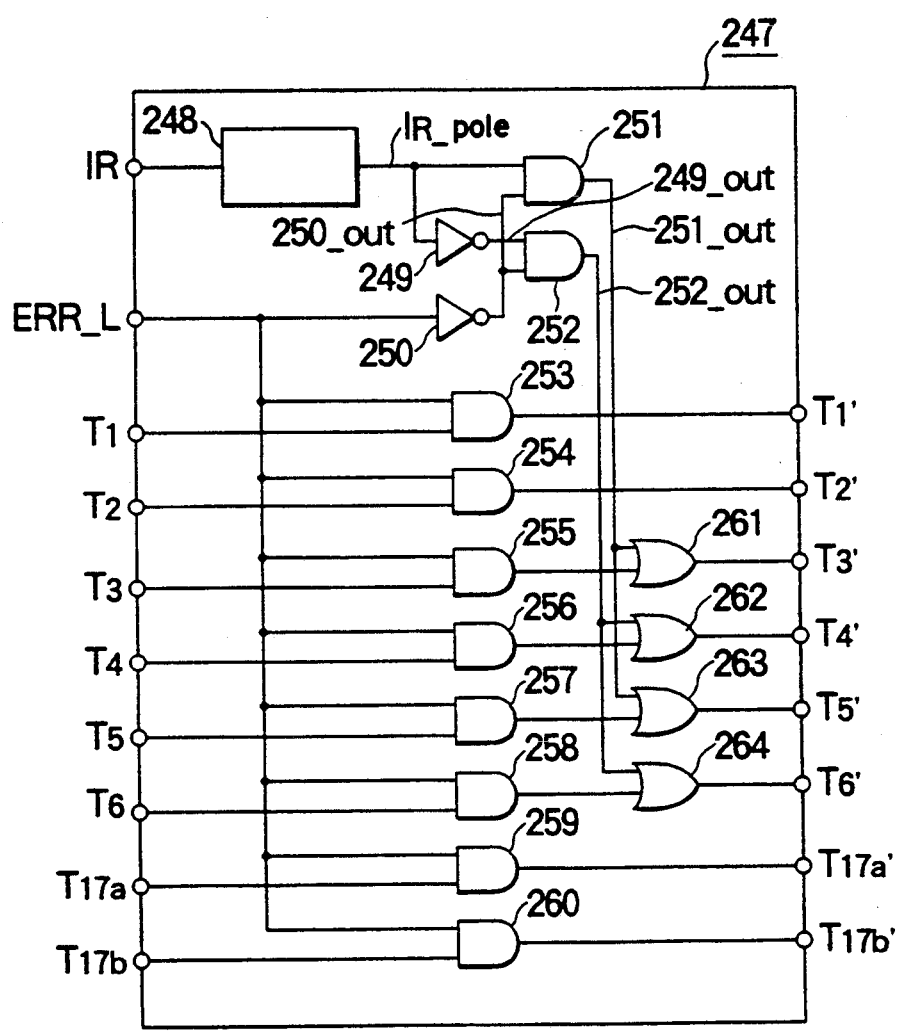
FIG. 31 shows gate circuits and a polarity detector in the tenth embodiment.

FIG. 31 shows a circuitry of the gate circuit 247. 248 denotes a polarity detector for detecting the polarity of the input current $I_R$. 249 and 250 denote NOT circuits. 251 and 252 denote AND circuits serving as selectors. 253 to 260 denote AND circuits serving as gate blocking circuits. 261 to 264 denote OR circuits.

Figure 32:
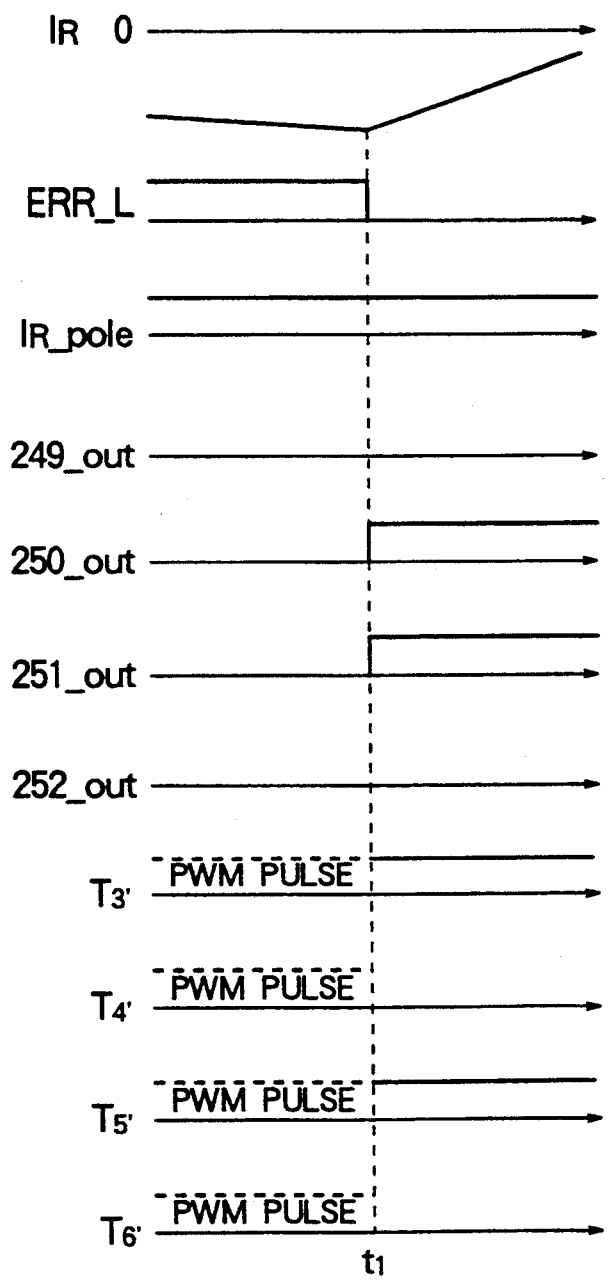
FIG. 32 shows waveforms representing the operation of the tenth embodiment.

FIG. 32 shows the waveforms of, from above to below, the input current $I_R$, Error Detected signal ERRL, output signal IRpole of the polarity detector 248, output signal 249out of the NOT circuit 249, output signal 250out of the NOT circuit 250, output signal 251out of the AND circuit 251, output signal 252out of the AND circuit 252, and gate signals T3' to T6'.

Next, the operation will be described.

When it is detected that the input current has grown to be overcurrent, the Error Detected signal ERRL goes low at the time instant t1. This causes the AND circuits 253 to 260 to provide low-level gate signals. The output signal 250out of the NOT circuit 250 goes from low to high. Since the polarity signal IRpole for the input current $I_R$ is high, the output signal 251out of the AND circuit 251 goes high. Since the output signal 249out of the NOT circuit 249 is low, the output signal 252out of the AND circuit 252 goes low.

Since the output signal 251out is high, the output signal T3' of the OR circuit 261 and the output signal T5' of the OR circuit 263 are driven high forcibly. The output signal T4' of the OR circuit 262 and the output signal T6' of the OR circuit 264 are fixed to zero.

According to the tenth embodiment, the input current does not grow but charges the smoothing capacitor 12 to decay. Since the output voltage of the inverter C is zero, no negative voltage is applied to the output voltage of the inverter C. Thus, the influence of the output voltage upon a load is alleviated.

Eleventh Embodiment

Next, the eleventh embodiment will be described in conjunction with the drawings.

Figure 33:
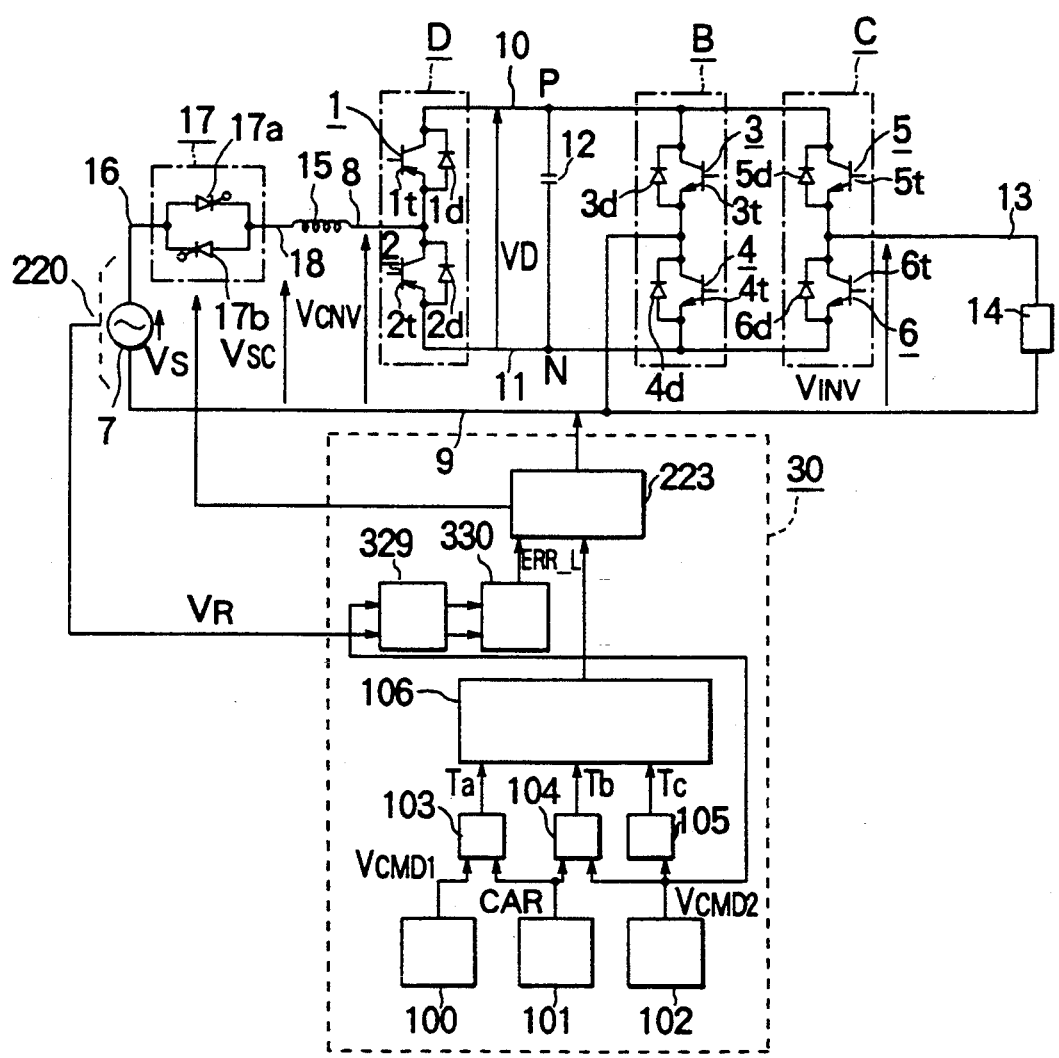
FIG. 33 shows a configuration of a power inverting apparatus of the eleventh embodiment.

In FIG. 33, 329 denotes a polarity detector for detecting the polarities of an output voltage of the ac voltage source 7 and of an inverter output voltage command. 330 denotes an error detector for detecting an error by analyzing two polarity signals provided by the polarity detector 329. 1 to 17, 30, 100 to 106, 223, and B to D denote the same circuit elements as those in the eighth embodiment. 220 denotes exactly the same circuitry as that in the ninth embodiment, of which description will be omitted.

Figure 34:
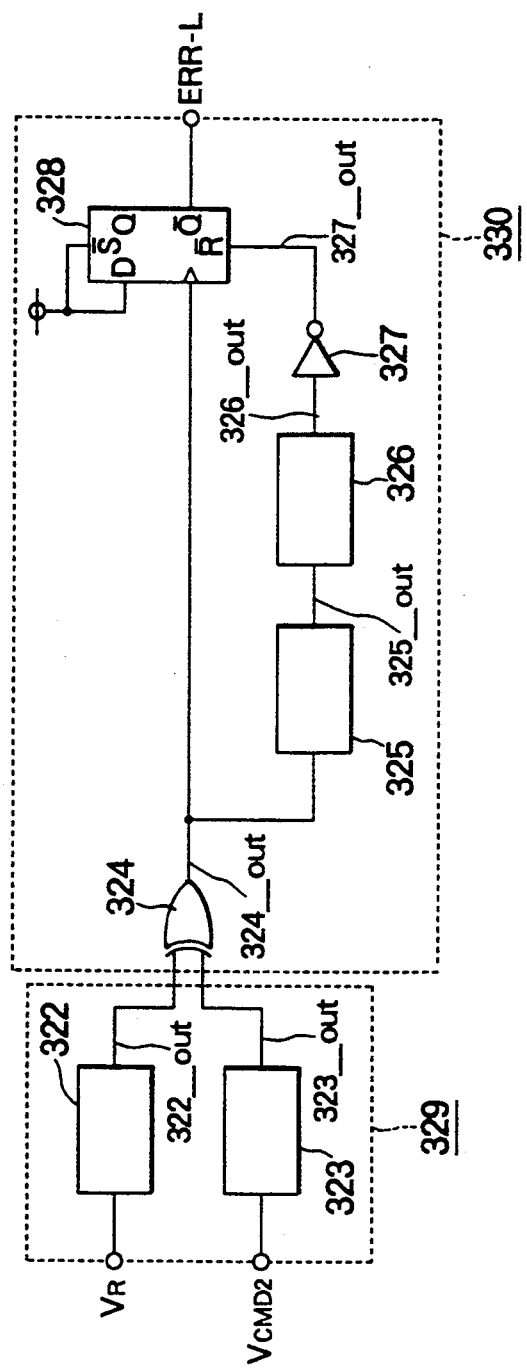
FIG. 34 shows a polarity detector and an error detector in the eleventh embodiment.

FIG. 34 shows an example of circuitries of the polarity detector 329 and error detector 330.

In FIG. 34, 322 denotes a polarity detector for detecting the polarity of the input voltage $V_R$. 323 denotes a polarity detector for detecting the polarity of the output voltage command $V_{CMD2}$ destined for the inverter C. 324 denotes an exclusive-OR circuit for checking if the output signals 322out and 323out of the two polarity detectors are mutually consistent in polarity. 325 denotes a leading edge detector for detecting a leading edge of the output signal 324out of the OR circuit 324. 326 denotes a trailing edge detector for detecting a trailing edge of the output signal 325out of the trailing edge detector 325. 327 denotes a NOT circuit. 328 denotes a D flip-flop.

Figure 35:
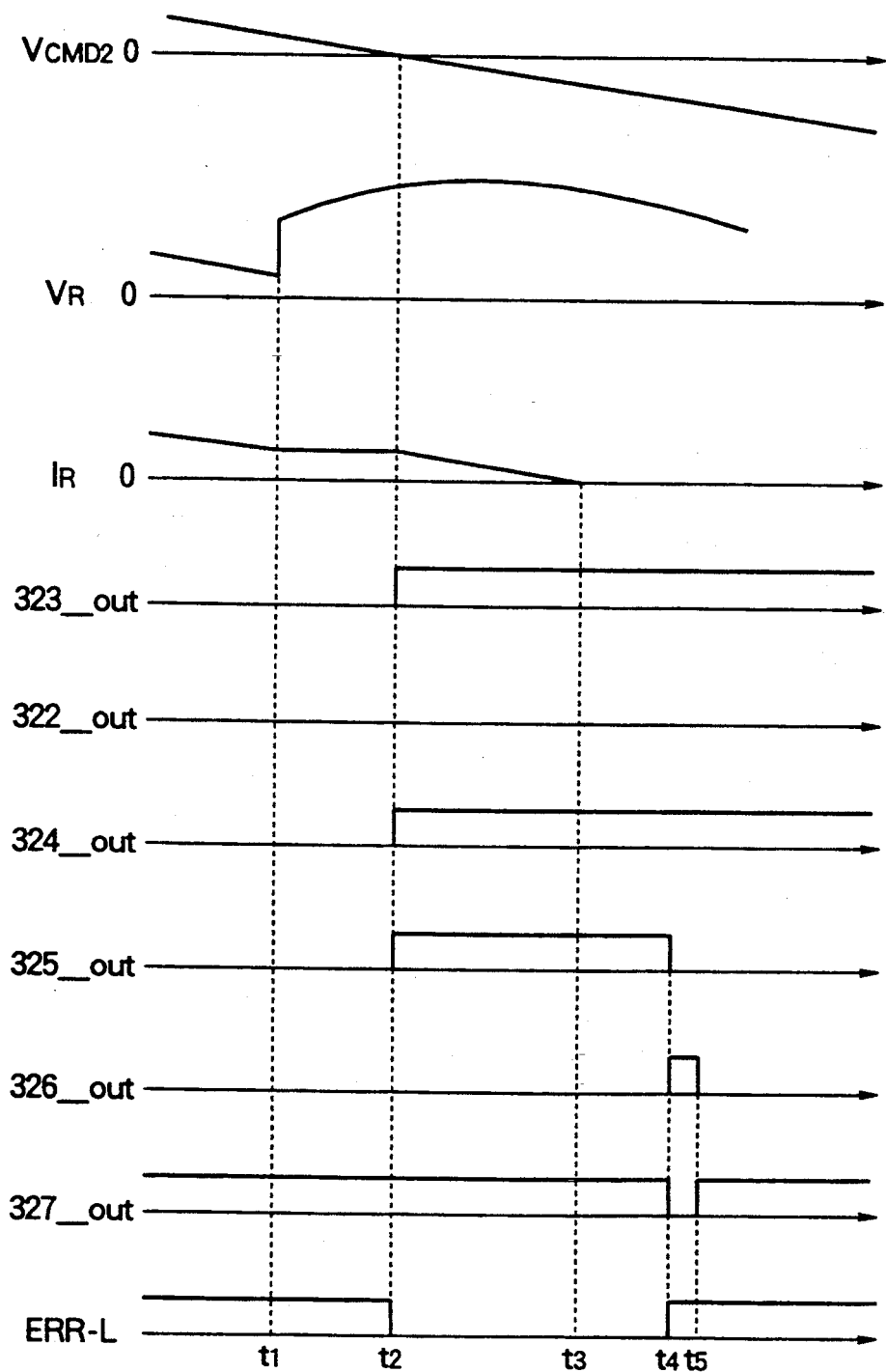
FIG. 35 shows waveforms representing the operation of the eleventh embodiment.

FIG. 35 shows the waveforms of, from above to below, the output voltage command $V_{CMD2}$ destined for the inverter C, voltage $V_R$ supplied by the ac voltage source, input current $I_R$ flowing from the ac voltage source into the converter, output signal 323out of the polarity detector 323, output signal 322out of the polarity detector 322, output signal 324out of the exclusive-OR circuit 324, output signal 325out, output signal 326out of the trailing edge detector 326, output signal 327out of the NOT circuit 327, and output signal ERRL of the D flip-flop 328.

Next, the operation will be described.

At the time instant t1, an error occurs in the voltage $V_R$ of the ac voltage source 7. At the time instant t2, the exclusive-OR circuit 324 analyzes the signal 323 out representing the polarity of the output voltage command $V_{CMD2}$ destined for the inverter C and the signal 322 out representing the polarity of the voltage supplied by the ac voltage source 7, and thus detects that the polarities are mutually inconsistent. The output signal 324out goes high.

At this time, the D flip-flop 328 changes states from the state defined with a low level to the one defined with a high level. This causes the output signal ERRL of the D flip-flop 328 to go low. The signal ERR L is then fed to the gate circuit 223, whereby gate blocking is effected. The signal 324out is fed to the leading edge detector 325. The signal 325out remains high from a time instant t3 until a given time instant t4 for a period of time required for the input current $I_R$ to be zero.

At the time instant t4, the signal 325out goes low. The trailing edge detector 326 detects the trailing edge of the signal 325out. The signal 326out remains high until a time instant t5.

The output signal 327out of the NOT circuit 327 is then driven low, and the D flip-flop is reset forcibly. The output signal ERRL is driven high again, whereby gate blocking is released. The inverter and converter are restarted.

According to the foregoing operation, gate blocking is effected to suspend the inverter and converter for at least a period of time during which the input current flowing from the ac voltage source 7 reaches zero. Therefore, when the polarities of the voltage supplied by the ac voltage source 7 and output voltage command destined for the inverter C are mutually inconsistent, even if the input current is present, the input voltage control circuit 17 can be turned off. The input current therefore charges the capacitor 12 to be zero but does not grow to be overcurrent, which prevents occurrence of a drawback resulting from excessive input current. Furthermore, since the inverter and converter are restarred, stable power inversion is realized.

Twelfth Embodiment

Next, the twelfth embodiment will be described in conjunction with the drawings.

Figure 36:
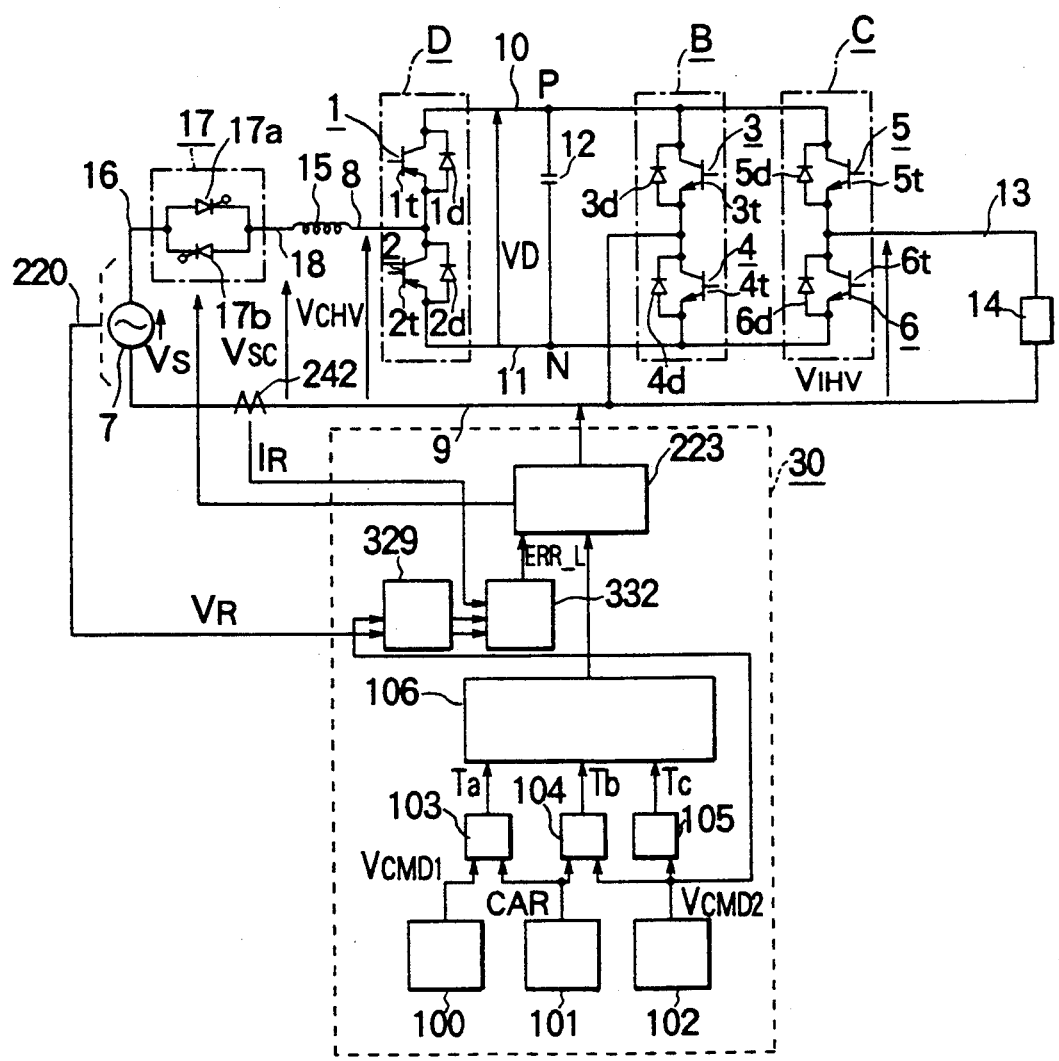
FIG. 36 shows a configuration of a power inverting apparatus of the twelfth embodiment.

In FIG. 36, 332 denotes an error detector for detecting an error by analyzing two polarity signals or outputs of the polarity detector 329. 1 to 17, 30, 100 to 106, 223, 242, 329, and B to D denote the same circuit elements as those in the eleventh embodiment, of which description will therefore be omitted.

Figure 37:
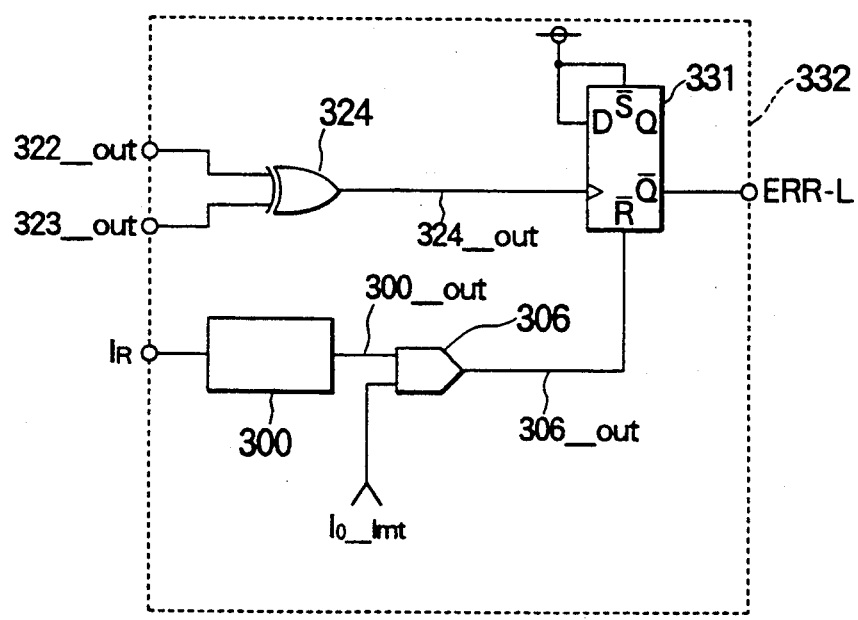
FIG. 37 shows an error detector in the twelfth embodiment.

FIG. 37 shows an example of a circuitry of the error detector 332.

Reference numeral 324 denotes an exclusive-OR circuit for determining whether the polarities of the output signals 322out and 323out of the polarity detector 329 are mutually consistent. 300 denotes an absolute value circuit for detecting an absolute value of the input current $I_R$. 306 denotes a comparator for comparing the output of the absolute value circuit 300 with a zero level I01mt. 331 denotes a D flip-flop.

Figure 38:
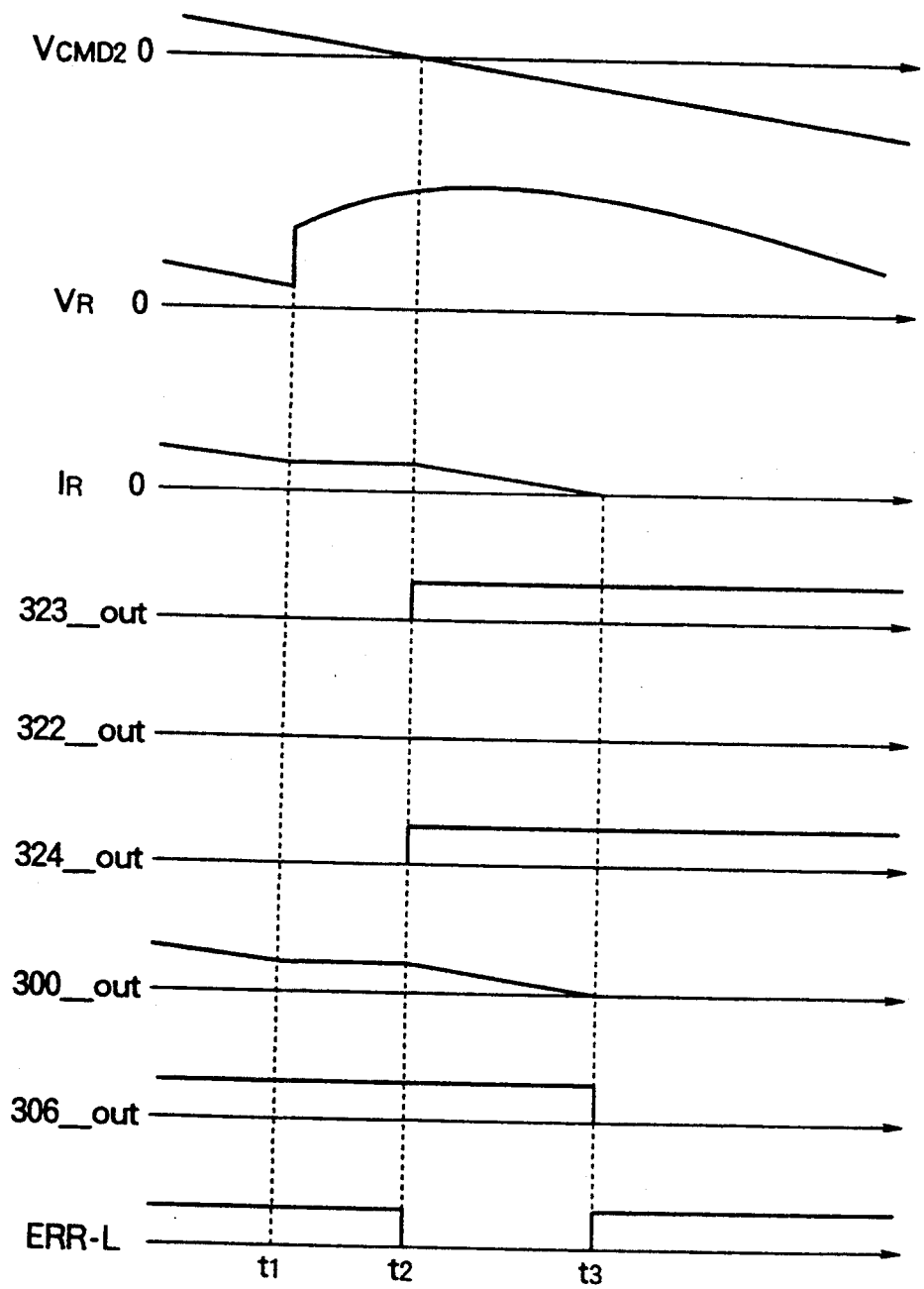
FIG. 38 shows waveforms representing the twelfth embodiment.

FIG. 38 shows the waveforms of, from above to below, the output voltage command $V_{CMD2}$ destined for the inverter C, voltage $V_R$ supplied by the ac voltage source 7, input current $I_R$, output signal 323out of the polarity detector 323, output signal 322out of the polarity detector 322, output signal 324out of the exclusive-OR circuit 324, output 300out of the absolute value circuit 300, output signal 306out of the comparator 306, and output signal ERRL of the D flip-flop 331.

Next, the operation will be described.

At the time instant t1, an error occurs in the voltage $V_R$ supplied by the ac voltage source 7 as shown in FIG. 38. At the time instant t2, the exclusive-OR circuit 324 analyzes the signal 323out representing the polarity of the output voltage command $V_{CMD2}$ destined for the inverter C and the signal 322out representing the polarity of the voltage supplied by the ac voltage source, and thus detects that the polarities are mutually inconsistent. the output signal 324out is then driven high.

At this time, the D flip-flop 331 changes states from the state defined with a low level to the one defined with a high level. This causes the output signal ERR L of the D flip-flop 331 to go low. The output signal ERRL is then fed to the gate circuit 223, whereby gate blocking is effected.

At the time instant t3, the input current $I_R$ becomes zero. This causes the output signal 306out of the comparator 306 to go low. The output signal ERRL of the D flip-flop 331 is driven high forcibly. The gate blocking is released. The inverter and converter are restarted.

According to the foregoing operation, gate blocking is performed to suspend the inverter and converter, so that even when the polarities of the voltage supplied by the ac voltage source 7 and inverter output voltage command signal are mutually inconsistent, even if the input current flowing from the ac voltage source is present, the input voltage control circuit 17 can be turned off. The input current therefore charges the capacitor to be zero but does not grow to be overcurrent, which prevents occurrence of a drawback resulting from excessive input current. Furthermore, the inverter and converter are restarred as soon as it has actually been confirmed that the input current is zero. Therefore, even if excessive input current flows, the stop time of the inverter and converter can be minimized. This results in stable power inversion.

Thirteenth Embodiment

Next, the thirteenth embodiment will be described in conjunction with the drawings.

Figure 39:
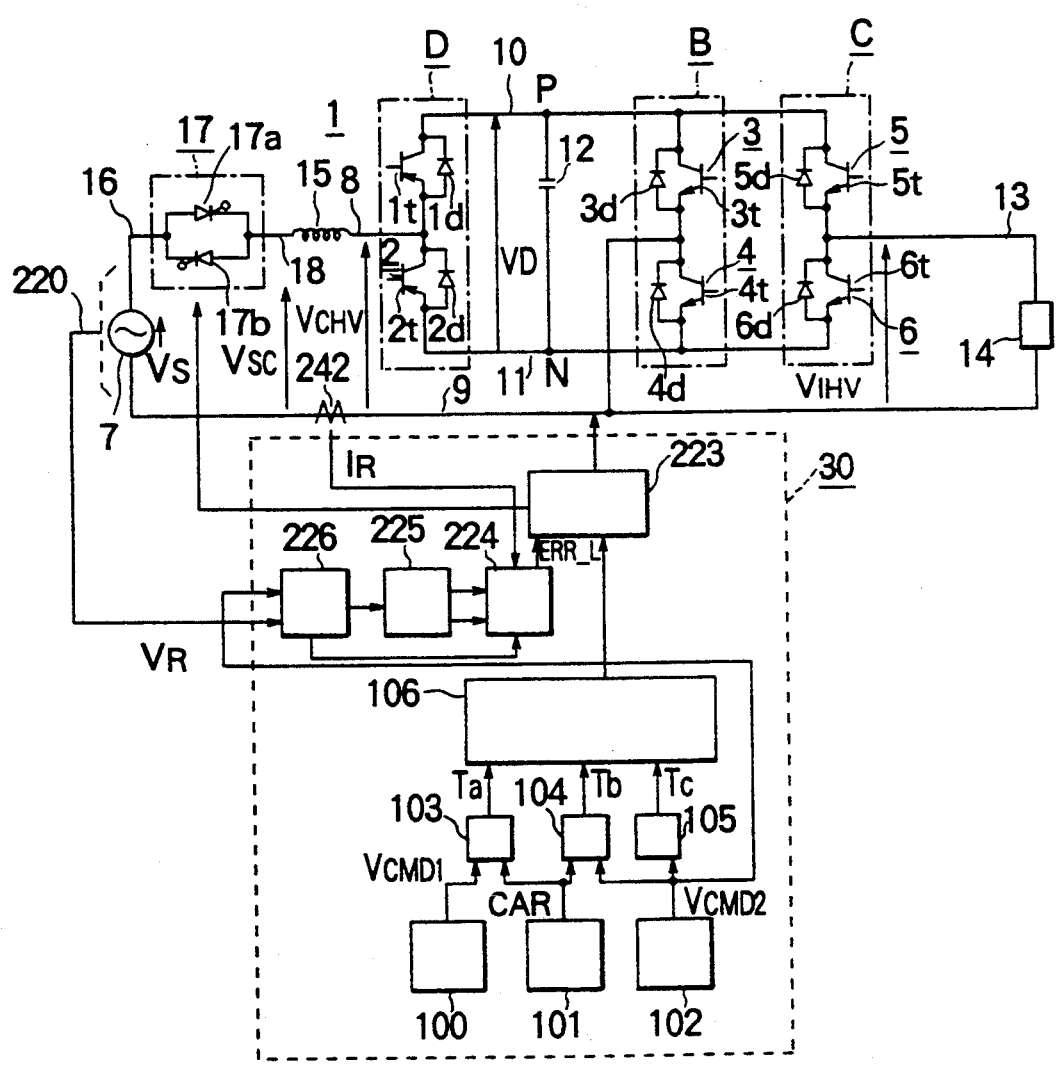
FIG. 39 shows a configuration of a power inverting apparatus of the thirteenth embodiment.

In FIG. 39, 226 denotes a polarity detector for detecting the polarity of the voltage $V_R$ supplied by the ac voltage source 7 and the polarity of the output voltage command $V_{CMD2}$ destined for the inverter C. 225 denotes a polarity reverse detector for determining whether the polarity of the output voltage command $V_{CMD2}$ destined for the inverter C is reversed. 224 denotes an error detector that analyzes the output signal of the polarity reverse detector 225 and thus determines that the polarity of the voltage $V_R$ is abnormal according to the timing that the polarity of the the output voltage command $V_{CMD2}$ destined for the inverter C is reversed. 1 to 17, 30, 100 to 106, 223, 242, and B to D denote the same circuit elements as those in the eleventh embodiment, of which description will therefore be omitted.

Figure 40:
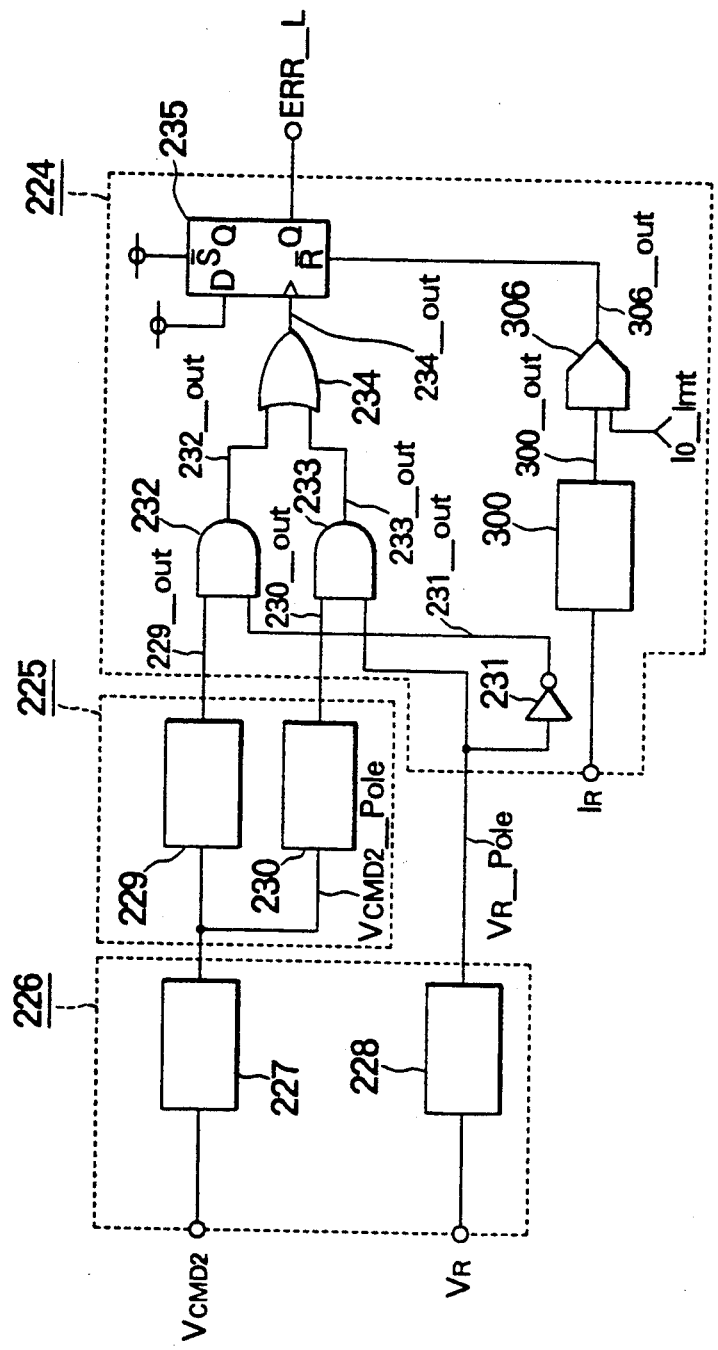
FIG. 40 shows a polarity detector, polarity reverse detector, and an error detector in the thirteenth embodiment.

FIG. 40 shows an example of circuitries of the error detector 224, polarity reverse detector 225, and polarity detector 226.

In FIG. 40, 227 denotes a polarity detector for detecting the polarity of the output voltage command $V_{CMD2}$ destined for the inverter C. 228 denotes a polarity detector for detecting the polarity of the voltage $V_R$ supplied by the ac voltage source 7. 229 denotes a leading edge detector. 230 denotes a trailing edge detector. 231 denotes a NOT circuit. 232 and 233 denote AND circuits serving as selectors. 234 denotes an OR circuit. 235 denotes a D flip-flop for outputting an Input Error Detected signal ERRL. 300 and 306 denote the same circuit elements as those in the twelfth embodiment, of which description will therefore be omitted.

Figure 41:
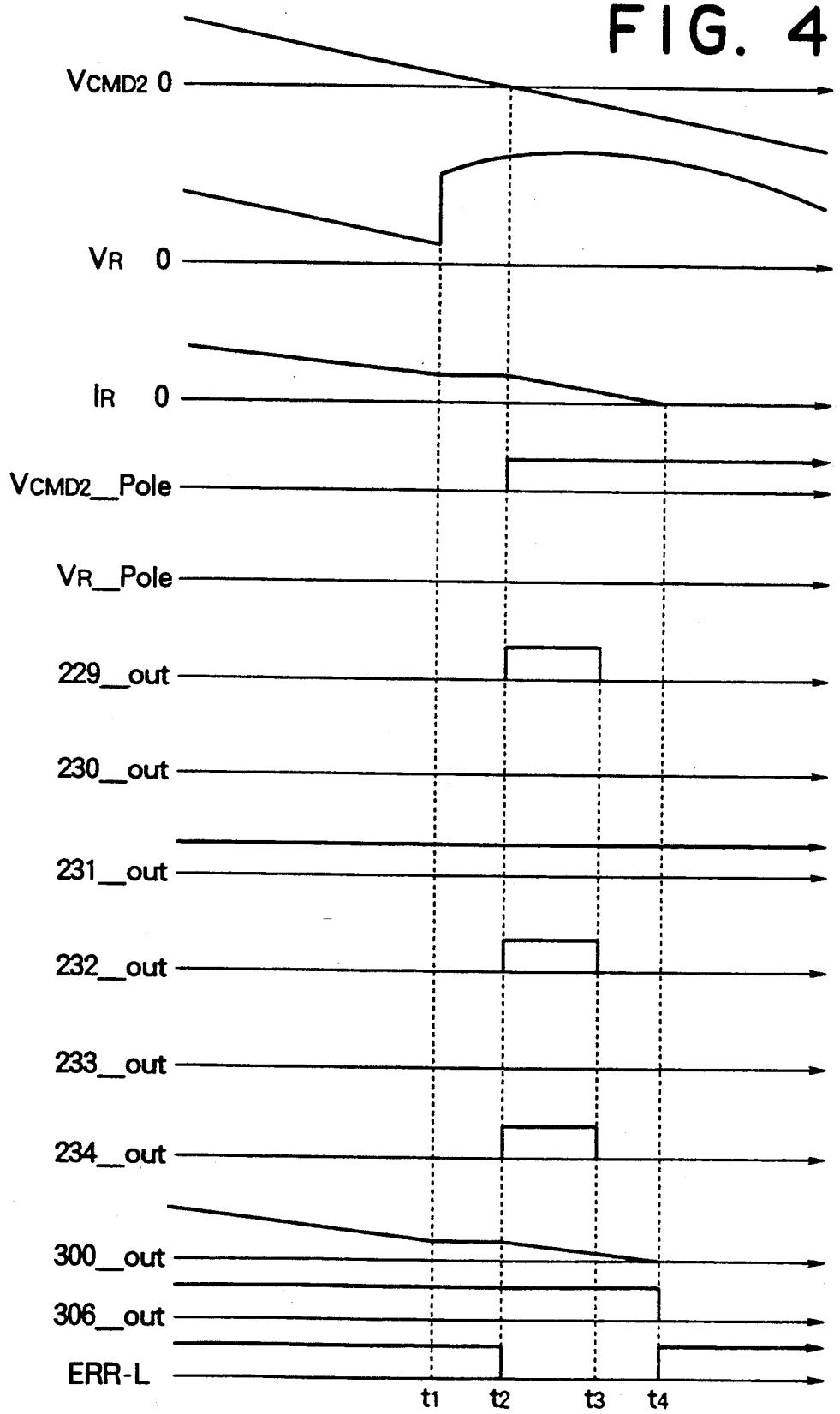
FIG. 41 shows waveforms representing the operation of the thirteenth embodiment.

FIG. 41 shows the waveforms of, from above to below, the output voltage command $V_{CMD2}$ destined for the inverter C, voltage $V_R$ supplied by the ac voltage source 7, input current $I_R$, output signal $V_{CMD2}$pole of the polarity detector 227, output signal $V_R$pole of the polarity detector 228, output signal 229out of the leading edge detector 229, output signal 230out of the trailing edge detector 230, output signal 231out of the NOT circuit 231, output signal 232out of the AND circuit 232, output signal 233out of the AND circuit 233, output signal 234out of the OR circuit, output signal 300out of the absolute value circuit 300, output signal 306out of the comparator 306, and output signal ERRL of the D flip-flop 235.

Next, the operation will be described.

At the time instant t1, the voltage $V_R$ supplied by the ac voltage source 7 fluctuates as shown in FIG. 41. At the time instant t2, the output voltage command $V_{CMD2}$ destined for the inverter C is reversed from positive polarity to negative polarity. This causes the output signal $V_{CMD2}$pole to go from low to high. The output signal 229out of the leading edge detector 229 is driven high for a given period of time from the time instant t2 to t3.

Since the signal $V_R$pole is low, the output signal 231 out of the NOT circuit 231 is high. The output signal 232 out of the AND circuit 232 is driven high at the time instant t2. The output signal 233out remains low.

When the output signal 232out is driven high, the output signal 234out of the OR circuit 234 goes from low to high. A rise signal is then fed to the D flip-flop 235. With the rise signal, the output signal ERRL of the D flip-flop 235 goes from high to low.

When the output signal ERRL goes low, occurrence of an error is detected. The output signal ERRL of low level is fed to the gate circuit 232, whereby gate blocking is effected.

At the time instant t4, the input current $I_R$ becomes zero. The output signal 306out of the comparator 306 goes low. The output signal ERRL of the D flip-flop 235 is driven high forcibly. The gate blocking is released. The inverter and converter are restarted.

According to the foregoing operation, gate blocking is effected to suspend the inverter and converter, so that every time the output voltage command destined for the inverter C is reversed in polarity, error detection can be performed and the input voltage control circuit 17 can be turned off. Herein, when the output voltage command destined for the inverter C is reversed in polarity, the polarities of the voltage supplied by the ac voltage source and output voltage command destined For the inverter C are mutually inconsistent and the switching elements in the input voltage control circuit 17 are disabled from cutting off the input voltage $V_R$ of opposite polarity, The input current therefore charges the smoothing capacitor 12 to be zero but does not grow to be overcurrent. A drawback resulting from excessive input current can therefore be avoided. Furthermore, the inverter and converter are restarred as soon as it has actually been confirmed that the input current is zero. Therefore, even if excessive input current flows, the stop time of the inverter and converter can be minimized. This results in stable power inversion.

Fourteenth Embodiment

Next, the fourteenth embodiment will be described in conjunction with the drawings.

Figure 42:
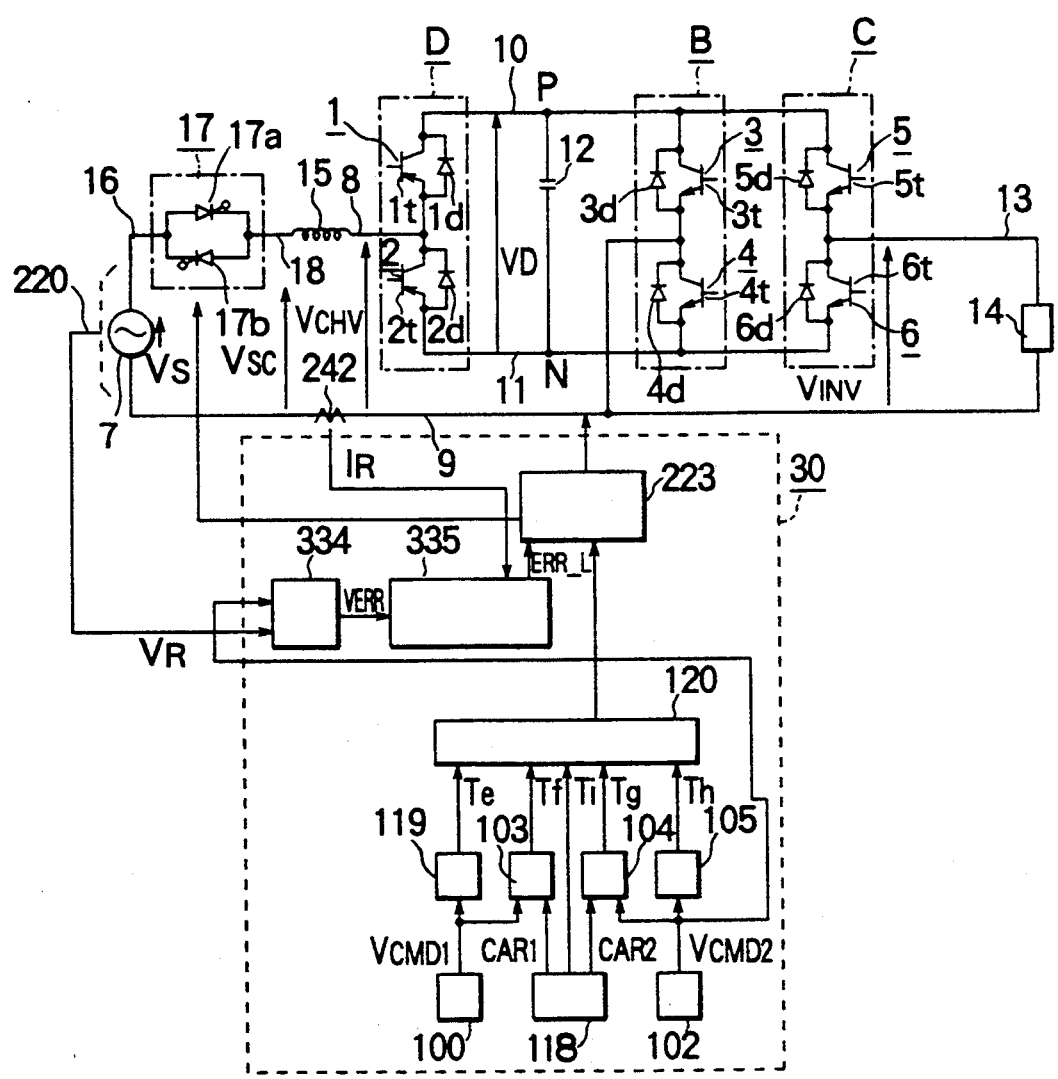
FIG. 42 shows a configuration of a power converting apparatus of the fourteenth embodiment.

In FIG. 42, 334 denotes a voltage difference detector. The voltage difference detector 334 detects a difference between the voltage $V_R$ supplied by the ac voltage source 7 and the output voltage command $V_{CMD2}$ destined for the inverter C. When the detected difference exceeds a dc voltage command $V_{CE*}$ destined For the smoothing capacitor 12; that is, when the inequality below is satisfied:

$$|V_R - V_{CMD2}| > V_{CE*} \quad (12)$$

the voltage difference detector 334 outputs a high-level signal. 335 denotes an error detector For detecting an error by analyzing an output signal of the voltage difference detector 334. 1 to 17, 30, 100 to 105, 223, 242, and B to D denote the same circuit elements as those in the eleventh embodiment. 118 to 120 denotes the same circuit elements as those in the fourth embodiment. No mention will therefore be made of these circuit elements.

Figure 43:
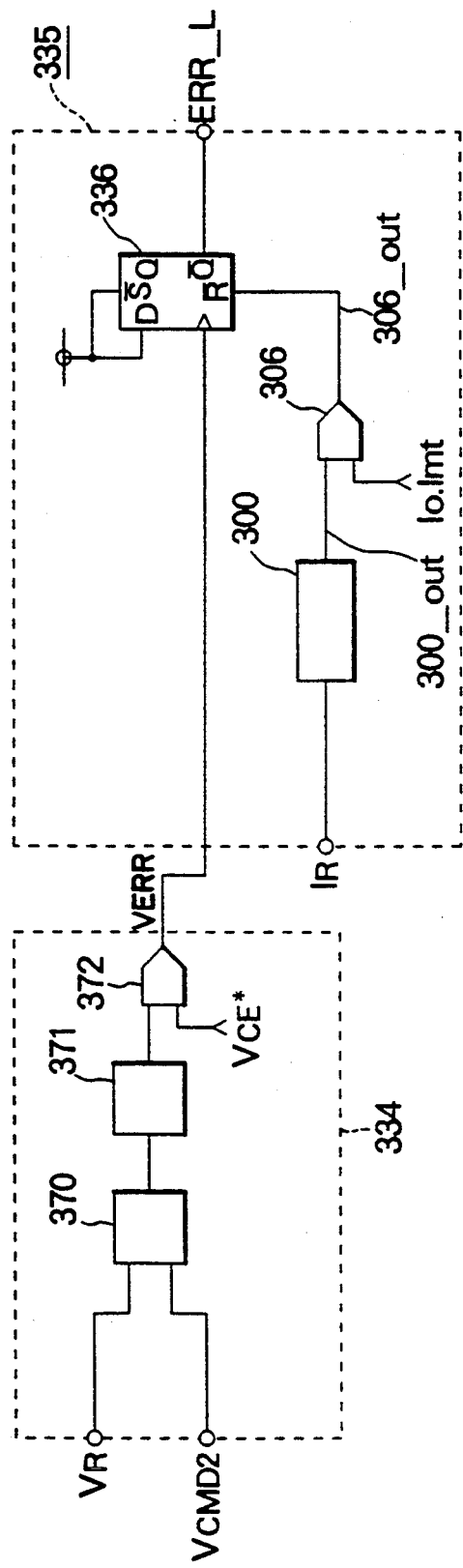
FIG. 43 shows an error detector and a voltage difference detector.

FIG. 43 shows an example of a circuitry of the voltage difference detector 334 and an example of a circuitry of the error detector 335.

In FIG. 43, 370 denotes a subtracting circuit for detecting a difference between the voltage $V_R$ of the ac voltage source 7 and the output voltage command $V_{CMD2}$ destined for the inverter C. 371 denotes an absolute value circuit. 372 denotes a comparator for comparing the output signal of the absolute value circuit 371 with the output voltage command $V_{CE^*}$ destined for the converter D. When the output signal of the absolute value circuit 371 exceeds the command $V_{CE^*}$, the comparator 371 activates a signal VERR. 336 denotes a D flip-flop for outputting an Input Error Detected signal ERRL. 300 and 306 denote the same circuit elements as those in the fifth embodiment, of which description will be omitted.

Figure 44:
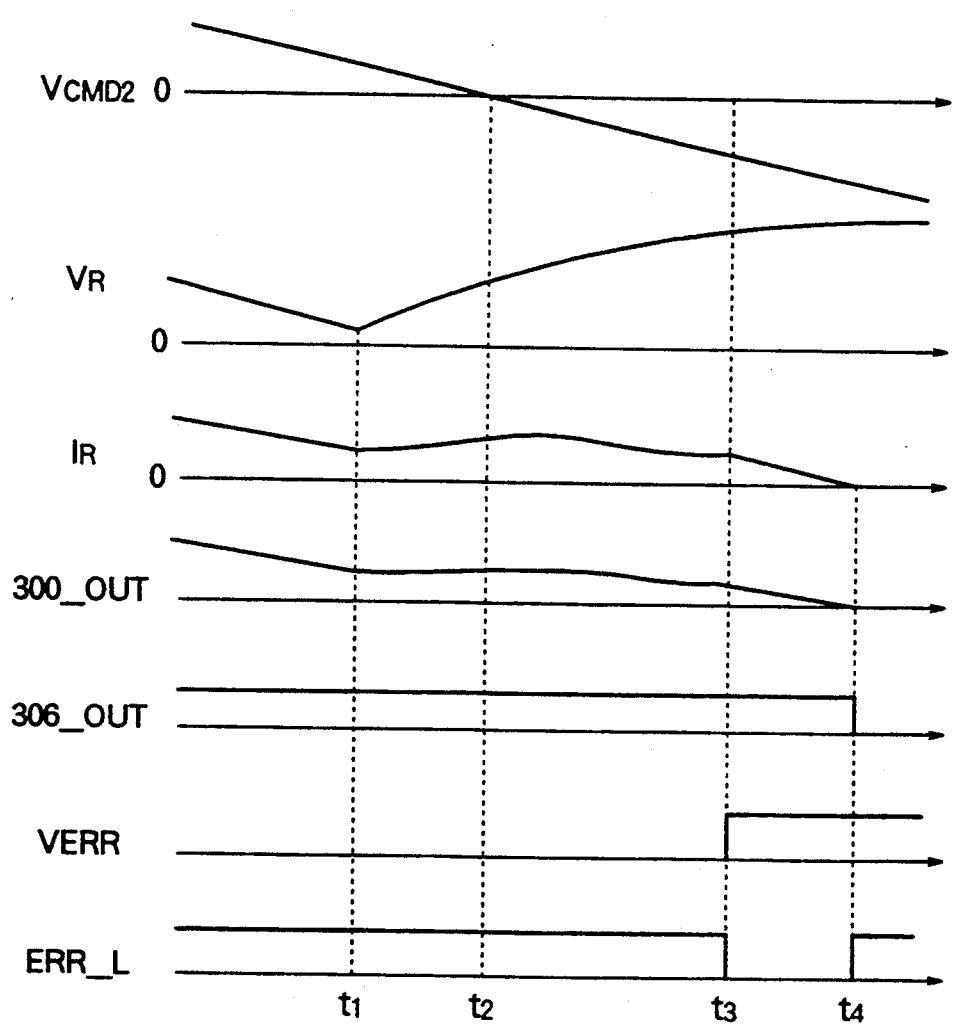
FIG. 44 shows waveforms representing the operation of the fourteenth embodiment.

FIG. 44 shows the waveforms of, from above to below, the the inverter output voltage command $V_{CMD2}$, voltage $V_R$ of the ac voltage source 7, input current $I_R$, output signal 300 out of the absolute value circuit 300, output signal 306 out of the comparator 306, output signal VERR of the voltage difference detector 334, and output signal ERRL of the D flip-flop 336.

Next, the operation will be described.

At the time instant t1, the voltage $V_R$ supplied by the ac voltage source fluctuates as shown in FIG. 44. At the time instant t2, the inverter output voltage command $V_{CMD2}$ is reversed from positive polarity to negative polarity.

As long as the carriers for the inverter and converter are 180° out of phase, unless the inequality (12) is satisfied, even when the polarities of input and output signals are mutually inconsistent, the input current $I_R$ will not grow to be overcurrent. However, when the inequality (12) is satisfied at the time instant t3, if the voltage control circuit 17 cannot cut off the input voltage $V_R$, the input current $I_R$ grows to be overcurrent through the reactor 15.

When the inequality (12) is satisfied, the voltage difference detector 334 causes the signal VERR to go from low to high and the output signal ERRL of the D flip-flop 336 to go from high to low. The gate circuit 223 then effects gate blocking.

At the time instant t4, the input current $I_R$ reaches zero. The output signal 306out of the comparator 306 then goes low. The output signal ERRL of the D flip-flop 336 is driven high forcibly. The gate blocking is then released. The inverter and converter are restarted.

According to the foregoing operation, gate blocking is performed to suspend the inverter and converter. Therefore, when an absolute value of a difference between the voltage supplied by the ac voltage source 7 and the inverter output voltage command exceeds the voltage command $V_{CE^*}$ destined for the smoothing capacitor 12, error detection can be effected. Even when input current flowing from the ac voltage source 7 is present, the input voltage control circuit 17 can be turned off. The input current therefore charges the smoothing capacitor 12 to be zero but does not grow to be overcurrent. A drawback resulting from excessive input current can therefore be avoided. Furthermore, the inverter and converter are restarred as soon as it has actually been confirmed that the input current is zero. Therefore, when the carriers are 180° out of phase, if the conditions for error detection are set as mentioned above, the operating domains of the converter and inverter can be expanded, the stop time thereof arising when excessive input current flows can be minimized, and thus stable power inversion can be realized.

Fifteenth Embodiment

Next, the fifteenth embodiment will be described in conjunction with the drawings.

Figure 45:
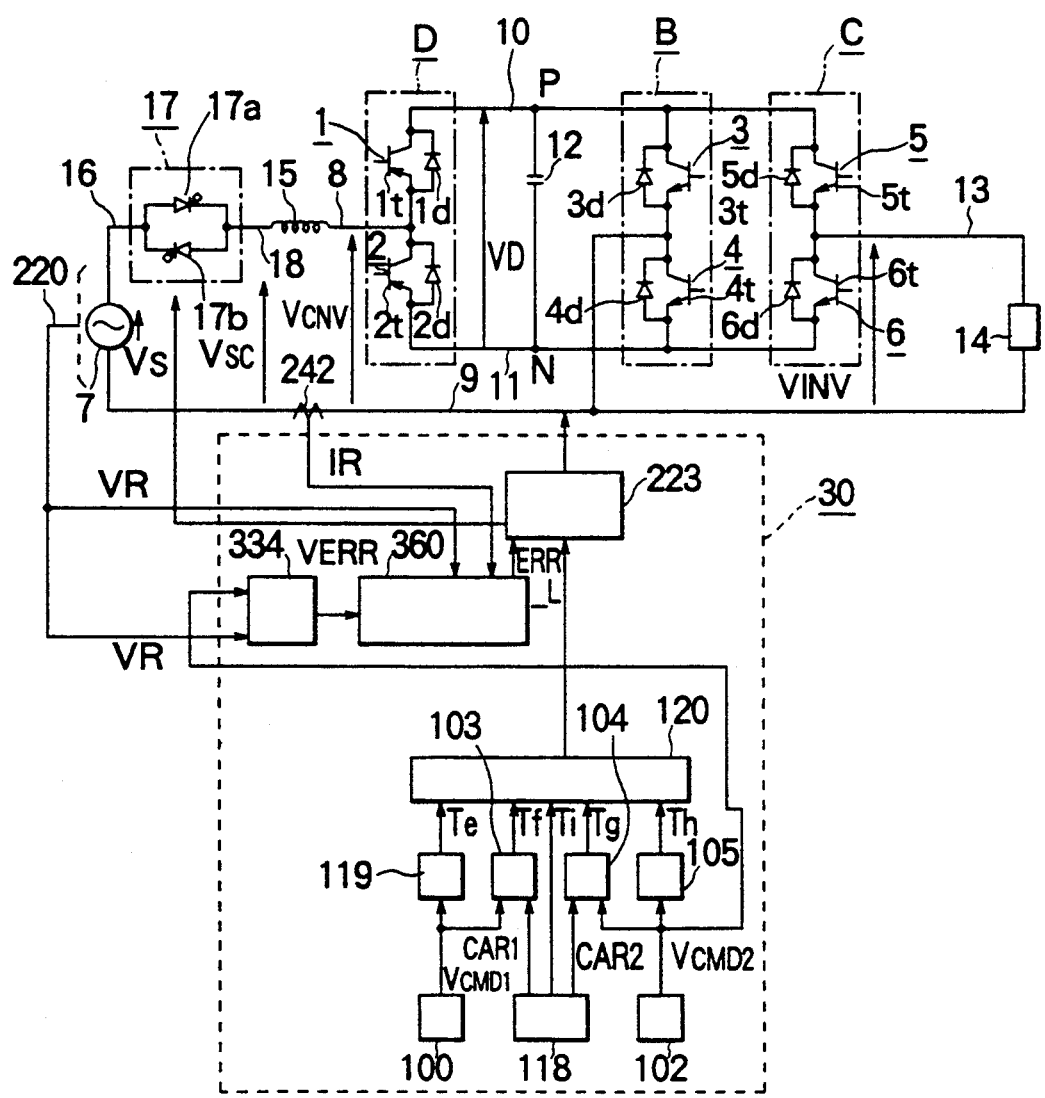
FIG. 45 shows a configuration of a power inverting apparatus of the fifteenth embodiment.

In FIG. 45, 360 denotes an error detector for determining conditions for error detection by analyzing the signal VERR, voltage $V_R$ supplied by the ac voltage source 7, and input current $I_R$. 1 to 17, 30, 100 to 105, 223, 242, and B to D denotes the same circuit elements as those in the eleventh embodiment. 118 to 120 denote the same circuit elements as those in the fourth embodiment shown in FIG. 8. 334 denotes the same circuit element as that in the fourteenth embodiment. No mention will be made of these circuit elements.

Figure 46:
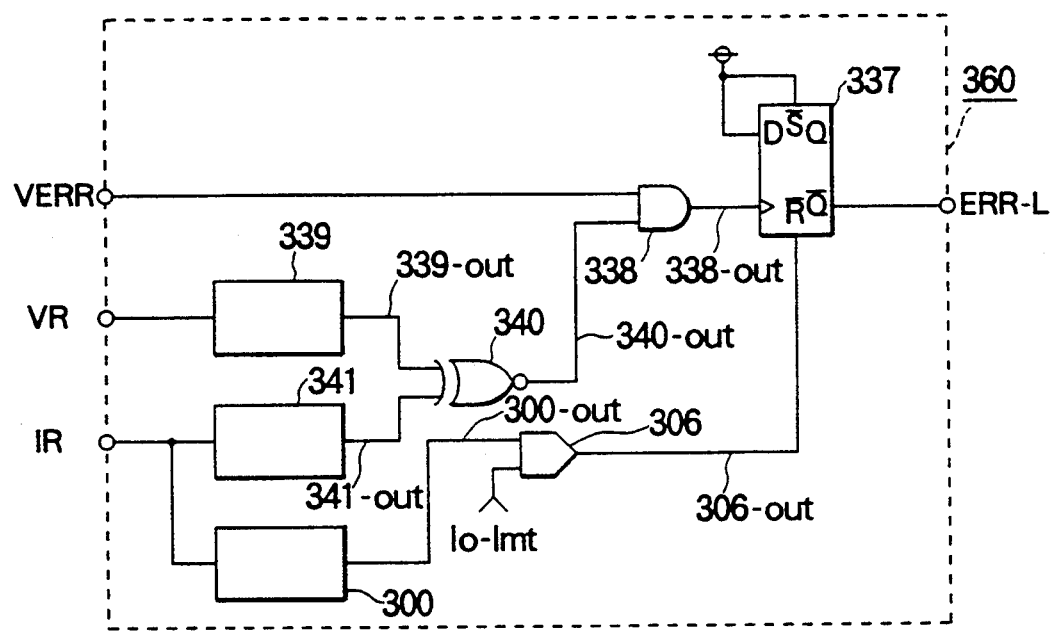
FIG. 46 shows an error detector in the fifteenth embodiment.

FIG. 46 shows an example of a circuitry of the error detector 360.

In FIG. 46, 337 denotes a D flip-flop for outputting an Error Detected signal ERRL. 338 denotes an AND circuit. 339 denotes a polarity detector for detecting the polarity of the voltage $V_R$ supplied by the ac voltage source 7. 340 denotes an exclusive-NOR circuit for determining whether the polarities of the voltage $V_R$ and input current $I_R$ are mutually consistent. 341 denotes a polarity detector for detecting the polarity of the input current $I_R$ to be fed from the ac voltage source 7 to the converter. 300 and 306 denote the same circuit elements as those in the twelfth embodiment, of which description will be omitted.

Figure 47:
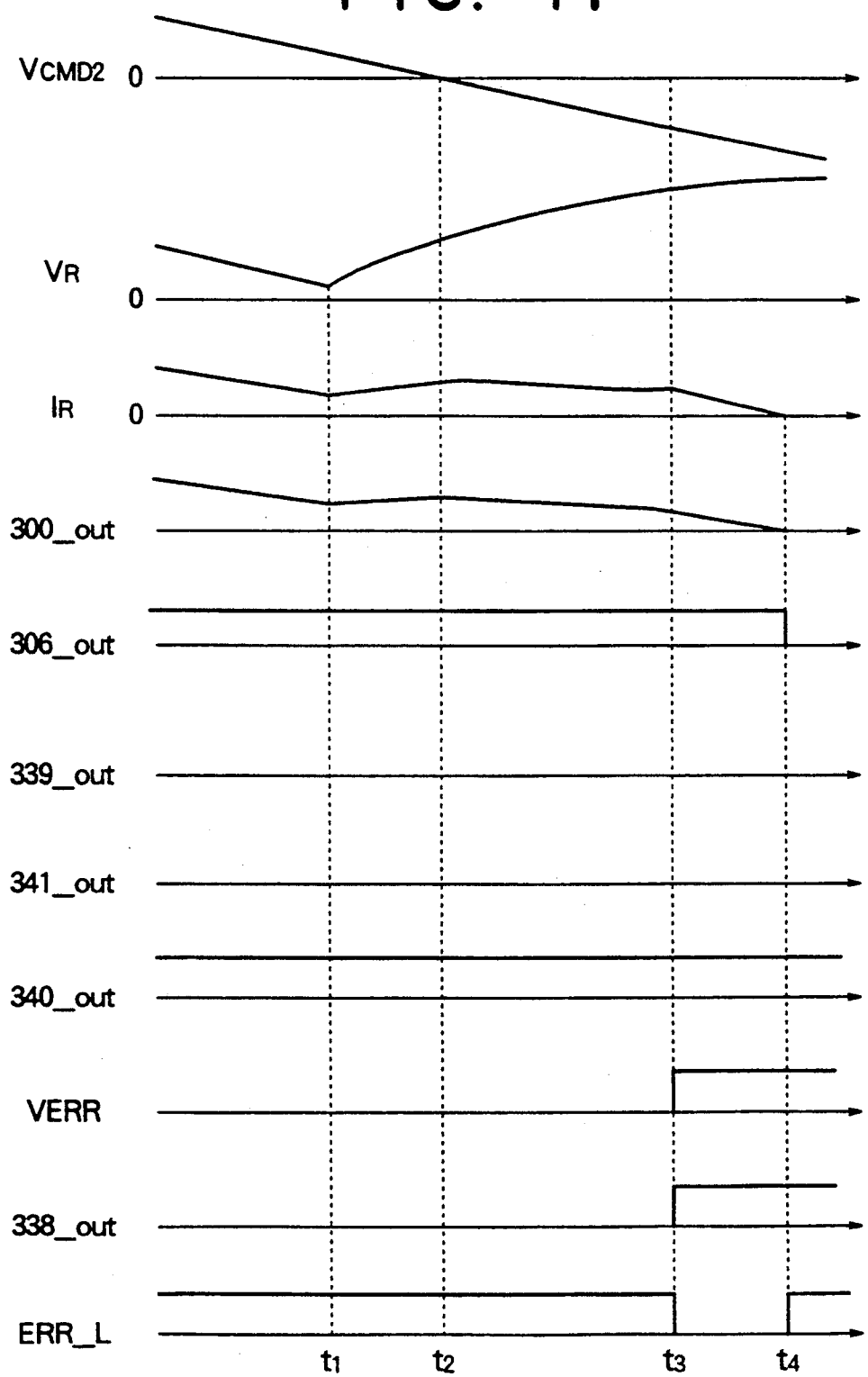
FIG. 47 shows waveforms representing the operation of the fifteenth embodiment.

FIG. 47 shows the waveforms of, from above to below, the inverter output voltage command $V_{CMD2}$, voltage $V_R$ supplied by the ac voltage source 7, input current $I_R$, output signal 300out of the absolute value circuit 300, output signal 306out of the comparator 306, output signal 339out of the polarity detector 339, output signal 341out of the polarity detector 341, output signal 340 out of the exclusive-NOR circuit 340, output signal VERR of the voltage difference detector 334, output signal 338out of the AND circuit 338, and output signal ERRL of the D flip-flop 337.

Next, the operation will be described.

At the time instant t1, the voltage $V_R$ supplied by the ac voltage source fluctuates as shown in FIG. 47. At the time instant t2, the inverter output voltage command signal $V_{CMD2}$ is reversed from positive polarity to negative polarity.

As long as the carriers for the inverter and converter are 180° out of phase, unless the inequality (12) is satisfied, even when the polarities of input and output signals are mutually inconsistent, the input current $I_R$ will not grow to be overcurrent. However, when the inequality (12) is satisfied at the time instant t3, if the voltage control circuit 17 fails to cut off the input voltage $V_R$, the input current grows to be overcurrent through the reactor 15.

When the inequality (12) is satisfied, the voltage difference detector 334 causes the signal VERR to go from low to high.

Conditions under which the voltage control circuit 17 cannot cut off the input voltage $V_R$; that is, conditions under which the voltage control circuit 17 cannot be turned off are that the polarity of the input current $I_R$ is consistent with that of the input voltage $V_R$ and that the voltage $V_R$ supplied by the ac voltage source is of the polarity allowing the input current $I_R$ to grow. When the input current $I_R$ is consistent in polarity with the input voltage $V_R$, the exclusive-NOR circuit 340 outputs a high-level signal.

In FIG. 47, since the two polarities are mutually consistent, the output signal 340out is high. The output signal 338out of the AND circuit 338 goes from low to high at the time instant t3.

A rise signal or a signal that goes from low to high is fed to the D flip-flop. This causes the output signal ERRL to go from high to low. The gate circuit 223 then effects gate blocking.

At the time instant t4, the input current $I_R$ reaches zero. The output signal 306out of the comparator 306 then goes low. The output signal ERRL of the D flip-flop 235 is driven high forcibly. The gate blocking is released. The inverter and converter are restarted.

According to the foregoing operation, gate blocking is effected to suspend the inverter and converter. Therefore, when a difference between the voltage supplied by the ac voltage source 7 and inverter output voltage command exceeds the voltage command $V_{CE*}$ destined for the smoothing capacitor 12, the error detector can effect error detection to determine whether the voltage $V_R$ supplied by the ac voltage source is of the polarity allowing the input current originating from the ac voltage source 7 to trigger short-circuit current. Moreover, even when the input current is present, the input voltage control circuit 17 can be turned off. The input current therefore charges the smoothing capacitor to be zero but does not grow to be overcurrent, which prevents occurrent of a drawback resulting from excessive input current. Furthermore, the inverter and converter are restarred as soon as it has actually been confirmed that the input current is zero. Therefore, when the carriers for the inverter and converter are 180° out of phase, if the conditions for error detection are set as described above, the operating domains of the converter and inverter can be expanded, the stop time thereof arising when excessive input current flows can be minimized, and thus stable power inversion can be realized.

Sixteenth Embodiment

Next, the sixteenth embodiment will be described in conjunction with the drawings.

Figure 48:
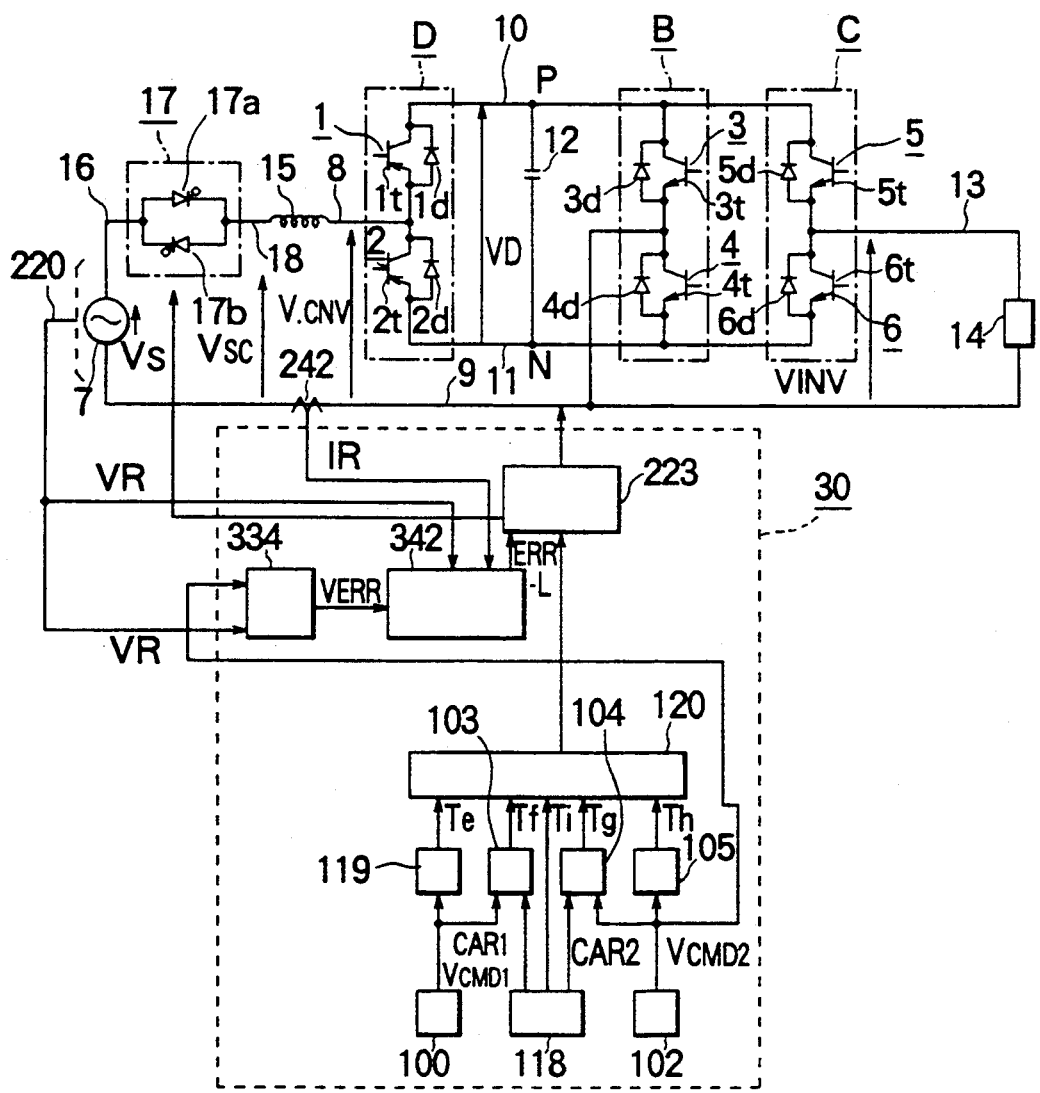
FIG. 48 shows a configuration of a power inverting apparatus of the sixteenth embodiment.

In FIG. 48, 342 denotes an error detector for determining the conditions for error detection by analyzing the signal VERR, voltage $V_R$ supplied by the ac voltage source 7, and input current $I_R$. 1 to 17, 30, 100 to 105, 223, 242, and B to D denote the same circuit elements as those in the eleventh embodiment. 118 to 120 denotes the same circuit elements as those in the fourth embodiment shown in FIG. 8. 334 denotes the same circuit element as that in the fourteenth embodiment. No mention will be made of these circuit elements.

Figure 49:
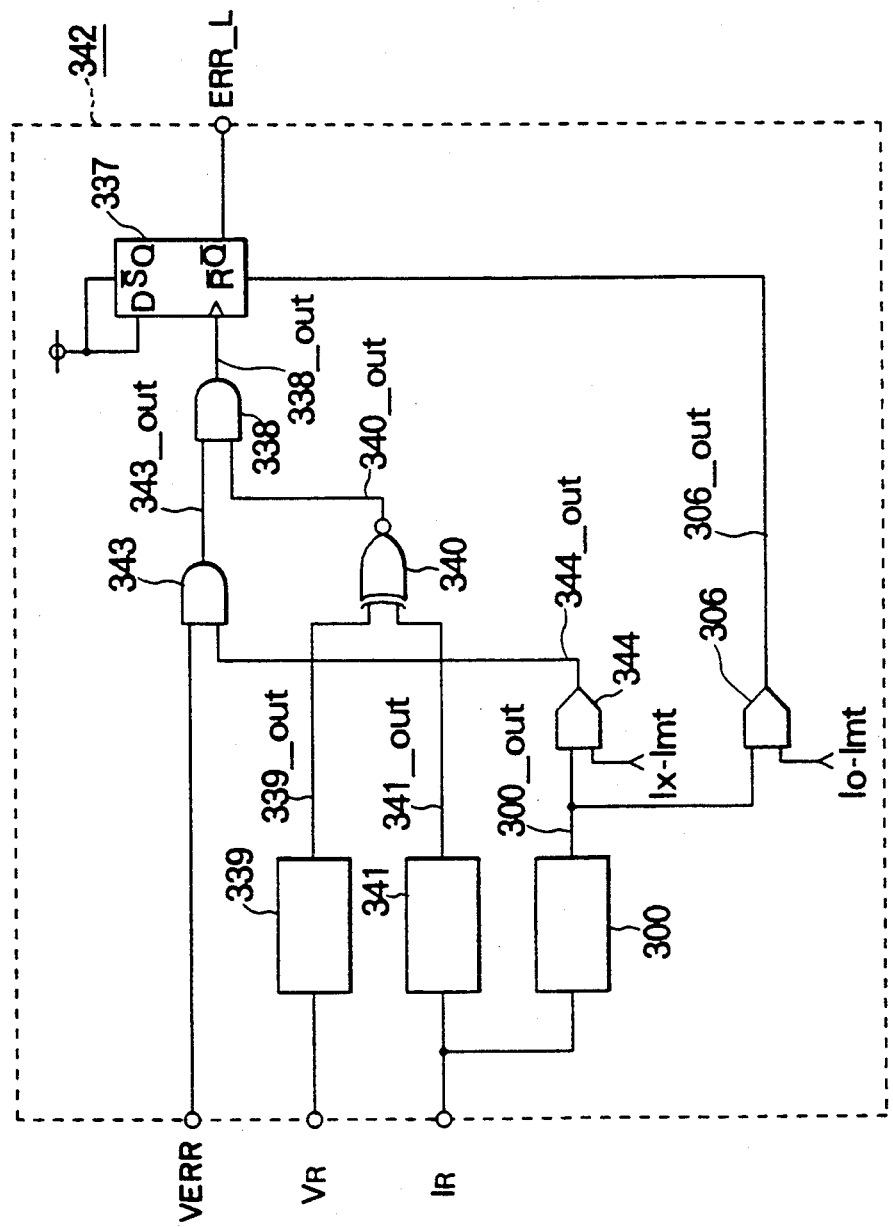
FIG. 49 shows an error detector in the sixteenth embodiment.

FIG. 49 shows an example of a circuitry of the error detector 342.

In FIG. 49, 344 denotes a comparator for comparing an absolute value of input current flowing from the ac voltage source 7 to the converter with a given value Ix1mt. 343 denotes an AND circuit. 306 and 337 to 341 denote the same circuit elements as those in the fifteenth embodiment, of which description will be omitted.

Figure 50:
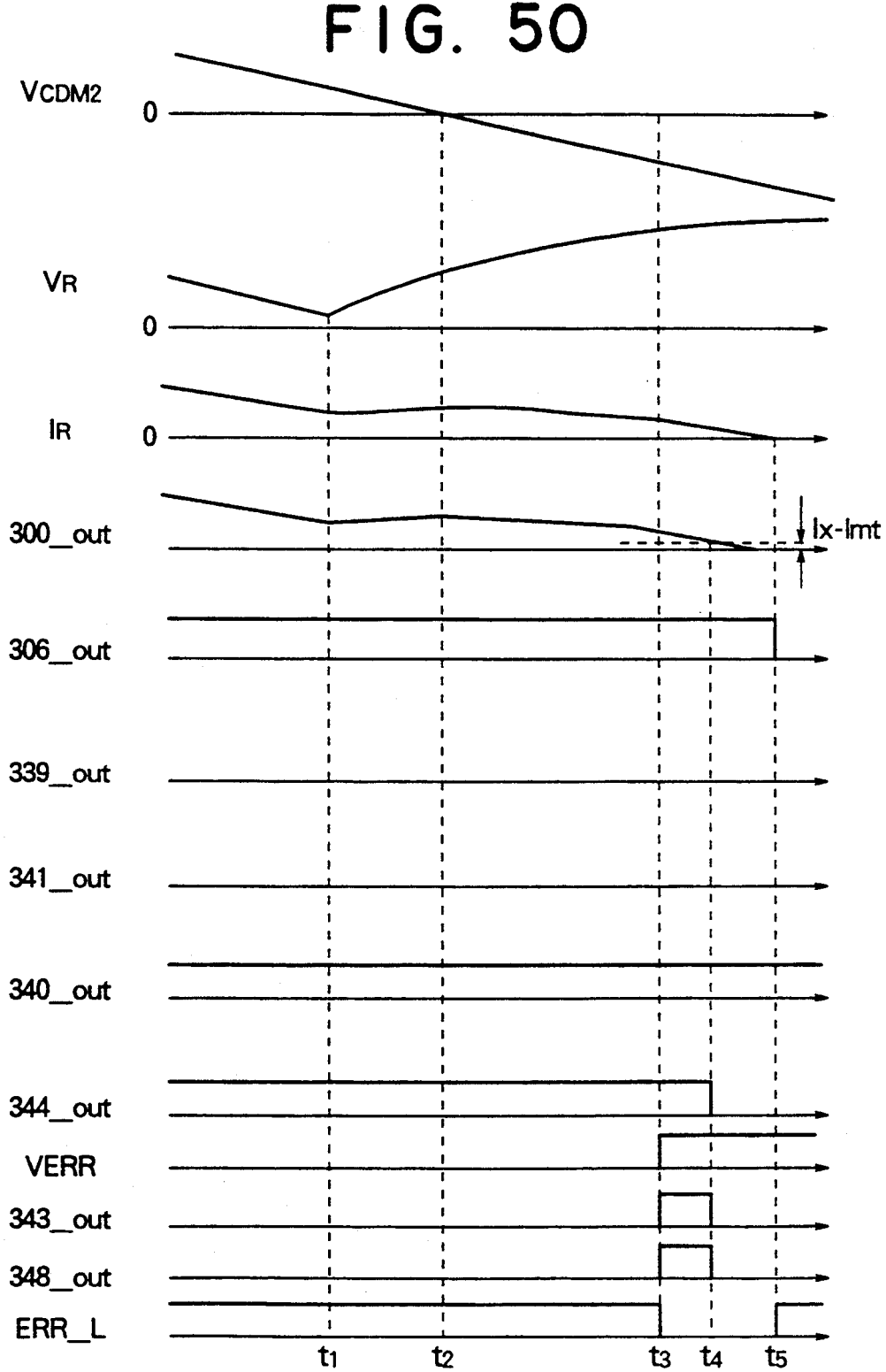
FIG. 50 shows waveforms representing the operation of the sixteenth embodiment.

FIG. 50 shows the waveforms of, from above to below, the inverter output voltage command $V_{CMD2}$, voltage $V_R$ supplied by the ac voltage source 7, output signal 300 out of the absolute value circuit 300, output signal 306out of the comparator 306, output signal 339out of the polarity detector 339, output signal 341out of the polarity detector 341, output signal 340out of the exclusive-NOR circuit 340, output signal 344out of the comparator 344, output signal VERR of the voltage difference detector, output signal 343out of the AND circuit 343, output signal 338out of the AND circuit 338, and output signal ERRL of the D flip-flop 337.

Next, the operation will be described.

At the time instant t1, the voltage $V_R$ supplied by the ac voltage source fluctuates as shown in FIG. 50. At the time instant t2, the inverter output voltage command $V_{CMD2}$ is reversed from positive polarity to negative polarity.

As long as the carriers for the inverter and converter are 180° out of phase, unless the inequality (12) in the fourteenth embodiment is satisfied, even when the polarities of input and output signals are mutually inconsistent, the input current originating from the ac voltage source will not grow to be overcurrent. However, when the inequality (12) is satisfied at the time instant t3, if the voltage control circuit 17 fails to cut off the voltage $V_R$, the input current grows to be overcurrent through the reactor 15.

When the inequality (12) is satisfied, the voltage difference detector 334 causes the signal VERR to go from low to high.

The comparator 344 determines that the absolute value of the input current exceeds the given value Ix1mt. At the time instant t3 in FIG. 50, the output signal 344out is high. The output signal 343out goes from low to high at the time instant t3.

The conditions under which the voltage control circuit 17 fails to cut off the input voltage $V_R$; that is, the conditions in which the voltage control circuit 17 cannot be turned off are that the polarity of the input current $I_R$ is consistent with the one of the voltage $V_R$ and that the voltage $V_R$ supplied by the ac voltage source is of the polarity allowing the input current $I_R$ to grow. When the polarity of the input current $I_R$ is consistent with the one of the voltage $V_R$, the exclusive-NOR circuit 340 outputs a high-level signal.

In FIG. 50, the two polarities are mutually consistent. The output signal 340out is therefore high. The output signal 338out of the AND circuit 338 goes from low to high at the time instant t3.

A rise signal or a signal that goes from low to high is fed to the D flip-flop. This causes the output signal ERRL to go from high to low. The gate circuit 223 effects gate blocking.

At the time instant t4, the output signal 300out becomes smaller than the value Ix1mt. This causes the output signal 344out of the comparator 344 to go low. The output signal 343out also goes low. The output signal 338out is therefore driven low.

At a time instant t5, the input current $I_R$ becomes zero. This causes the output signal 306out of the comparator 306 to go low. The output signal ERR L of the D flip-flop is driven high forcibly. The gate blocking is released. The inverter and converter are restarted.

According to the foregoing operation, gate blocking is effected to suspend the inverter and converter. Therefore, when an absolute value of a difference between the voltage $V_R$ supplied by the ac voltage source 7 and the command inverter output voltage $V_{CMD2}$ exceeds the value of the voltage command $V_{CE*}$ destined for the capacitor 12, the the error detector can effect error detection, and determine whether the input current $I_R$ is of the polarity triggering short-circuit current with respect to the voltage $V_R$, and whether the input current $I_R$ exceeds the given value Ix1mt. Moreover, the input voltage control circuit 17 can be turned off. The input current $I_R$ therefore charges the capacitor 12 to be zero but does not grow to be overcurrent, which prevents occurrence of a drawback resulting from excessive input current. Furthermore, the inverter and converter are restarred as soon as it has actually been confirmed that the input current is zero. Therefore, when the carriers are 180° out of phase, if the conditions for error detection are set as mentioned above, the operating domains of the converter and inverter can be expanded, the stop time thereof arising when excessive input current flows can be minimized, and thus stable power inversion can be realized.

Seventeenth Embodiment

Next, the seventeenth embodiment will be described.

Figure 51:
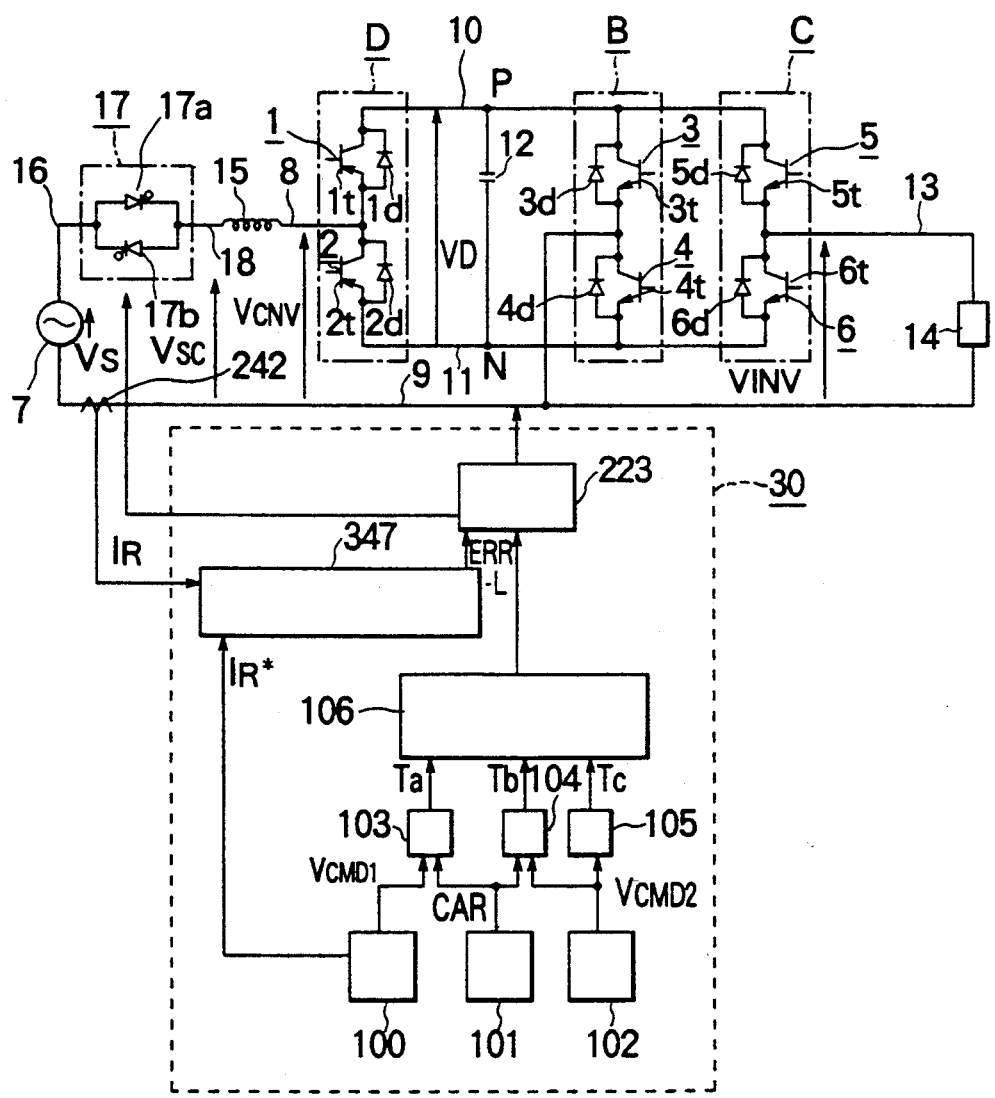
FIG. 51 shows a configuration of a power inverting apparatus of the seventeenth embodiment.

In FIG. 51, 347 denotes an error detector For detecting an error by analyzing input current flowing from the ac voltage source 7 to the converter and an input current command $I_{R*}$. 1 to 17, 100 to 106, 223, and B to D denote the same circuit elements as those in the eighth embodiment, of which description will be omitted.

Figure 52:
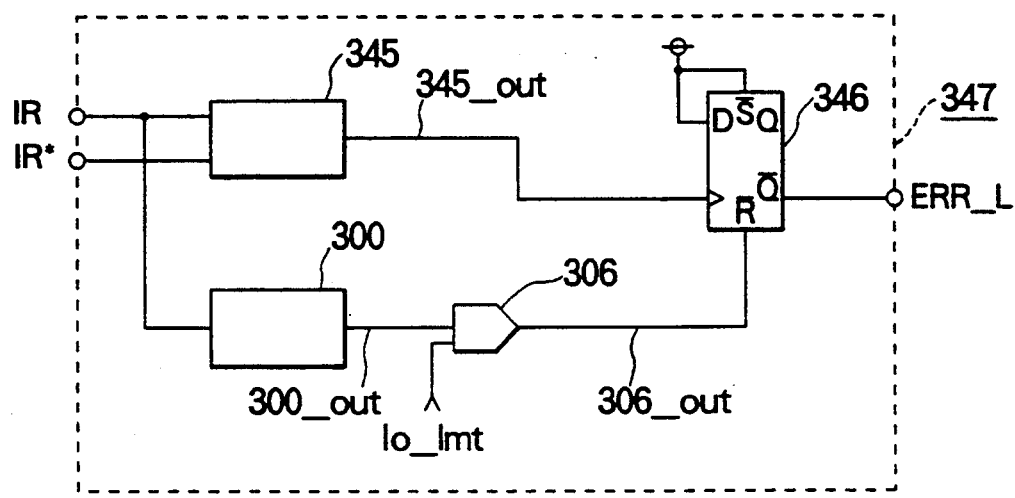
FIG. 52 shows an error detector in the seventeenth embodiment.

FIG. 52 shows an example of a circuitry of the error detector 347.

In FIG. 52, 345 denotes a current difference detector for detecting a difference between the input current $I_R$ and input current command $I_{R*}$. 346 denotes a D flip-Flop for outputting an Error Detected signal ERRL. 300 and 306 denote the same circuit elements as those in the twelfth embodiment shown in FIG. 37, of which description will be omitted.

Figure 53:
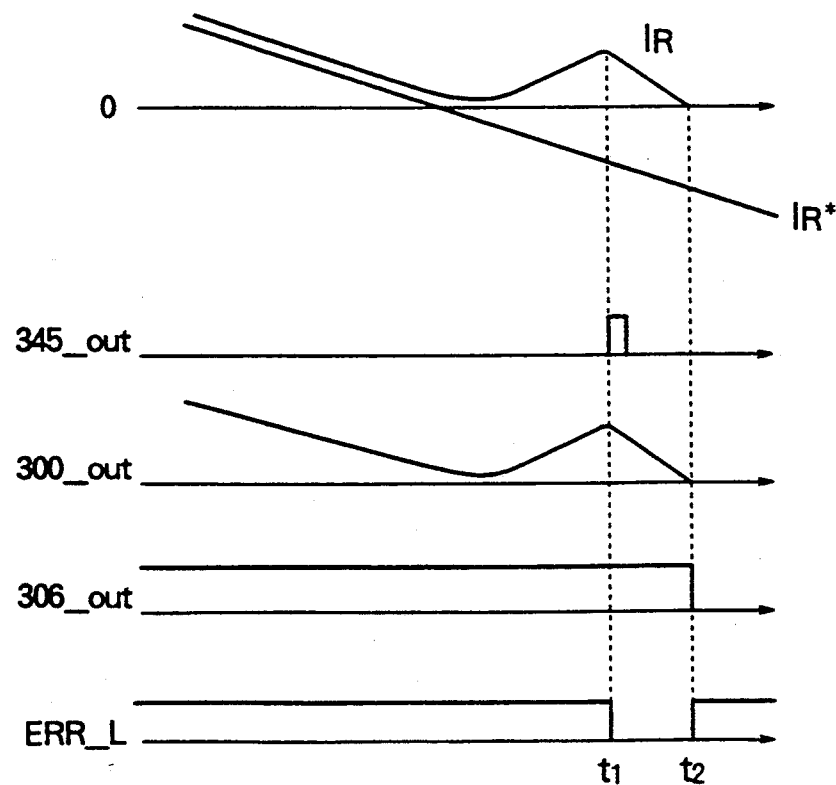
FIG. 53 shows waveforms representing the operation of the seventeenth embodiment.

FIG. 53 shows the waveforms of, from above to below, the input current IR and input current command $I_{R*}$, output signal 345out of the current difference detector 345, output signal 300out of the absolute value circuit 300, output signal 306out of the comparator 306, and output signal ERRL of the D flip-flop 346.

Next, the operation will be described.

When the difference between the input current $I_R$ and input current command $I_{R*}$ exceeds a given value, the output signal 345out of the current difference detector 345 goes from low to high.

A rise signal or a signal that goes from low to high is red to the D flip-flop 346. This causes the output signal ERRL to go from high to low. The gate circuit 223 effects gate blocking.

At the time instant t2, the input current $I_R$ becomes zero. The output signal 306out of the comparator 306 then goes low. The output signal ERRL of the D flip-flop 346 is driven high forcibly. The gate blocking is then released. The inverter and converter are restarted.

According to the foregoing operation, gate blocking is effected to suspend the inverter and converter, so that when the difference between the input current $I_R$ and the input current command IR. exceeds the given value, the current difference detector 345 can detect occurrence of an error, and the input voltage control circuit 17 can be turned off. The input current $I_R$ therefore charges the smoothing capacitor to be zero but does not grow to be overcurrent, which prevents occurrence of a drawback resulting from excessive input current. Furthermore, the inverter and converter are restarred as soon as it has actually been confirmed that the input current is zero. Therefore, even if excessive input current flows, the stop time of the inverter and converter can be minimized. Moreover, since a voltage detector is unnecessary, stable power inversion can be realized at low cost.

Eighteenth Embodiment

Next, the eighteenth embodiment will be described in conjunction with the drawings.

Figure 54:
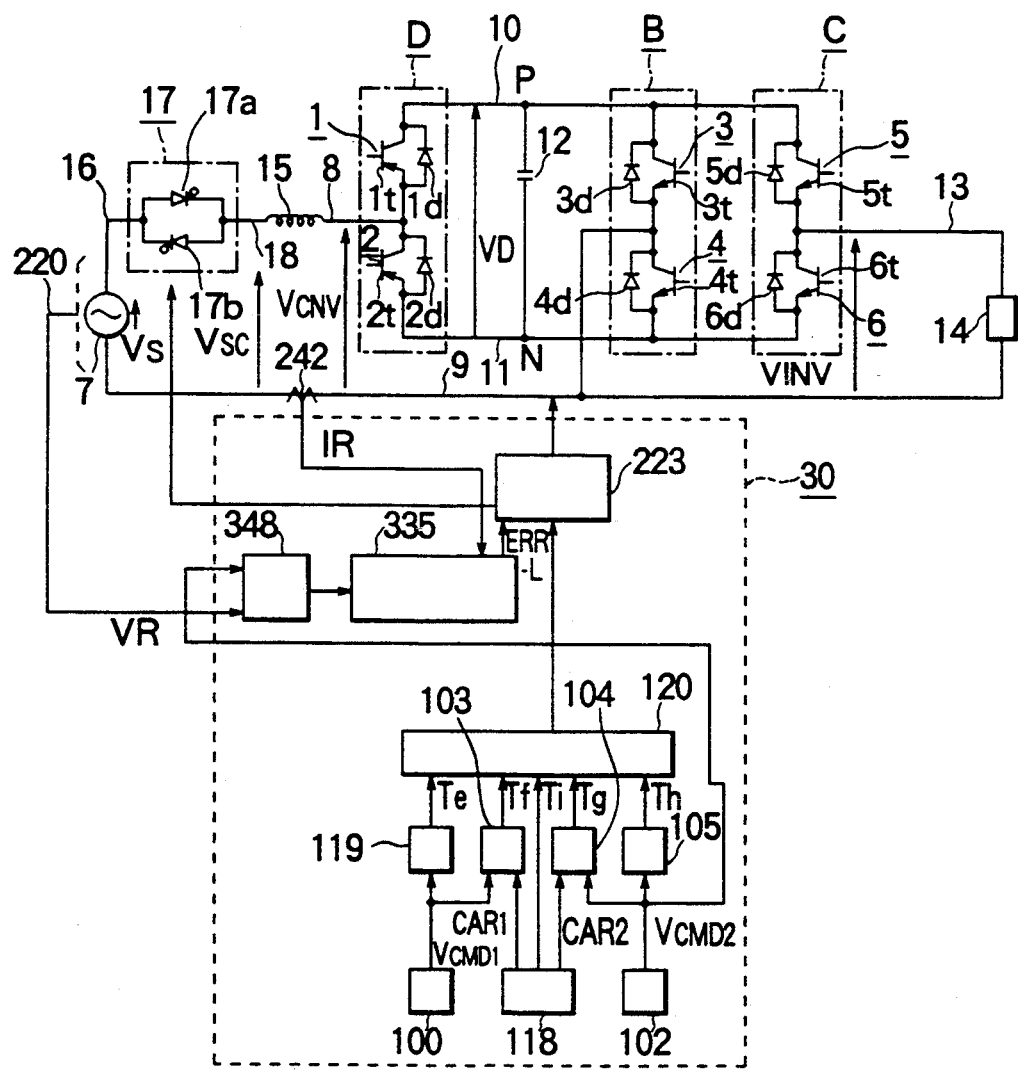
FIG. 54 shows a configuration of a power inverting apparatus of the eighteenth embodiment.

In FIG. 54, 348 denotes a phase difference detector for detecting a phase difference between the voltage supplied by the ac voltage source 7 and inverter output voltage command $V_{CMD2}$. 1 to 17, 100 to 105, 118 to 120, 223, 335, and B to D denote the same circuit elements as those in the fourteenth embodiment, of which description will be omitted.

$V_{CE*}$ denotes a voltage command destined for the smoothing capacitor 12. When the carriers for the converter and inverter are 180° out of phase mutually, a phase difference α in threshold voltage between the input voltage $V_R$ and inverter output voltage command $V_{CMD2}$ is provided as an equation (13):

$$\alpha = 2 \times \arcsin\{(V_{CE*})/(V_R + V_{CMD2})\} \quad (13)$$

The phase difference detector 348 computes the equation (13). When the phase difference exceeds the α value, the error detector 335 detects occurrence of an error. The gate circuit 223 effects gate blocking. The succeeding operation is identical to that claimed in claim 12, of which description will be omitted.

According to the foregoing operation, a phase difference between the input voltage $V_R$ and inverter output voltage command $V_{CMD2}$ is detected. When the phase difference exceeds the α value, error detection is effected. Therefore, error detection can be completed for a short period of time. The input current originating from the ac voltage source therefore charges the smoothing capacitor 12 to be zero but does not grow to be overcurrent, which prevents occurrence of a drawback resulting from excessive input current. Furthermore, the inverter and converter are restarred as soon as it has actually been confirmed that the input current is zero. Therefore, even if excessive input current flows, the stop time of the inverter and converter can be minimized. This results in stable power inversion.

Nineteenth Embodiment

Next, the nineteenth embodiment will be described in conjunction with the drawings.

Figure 55:
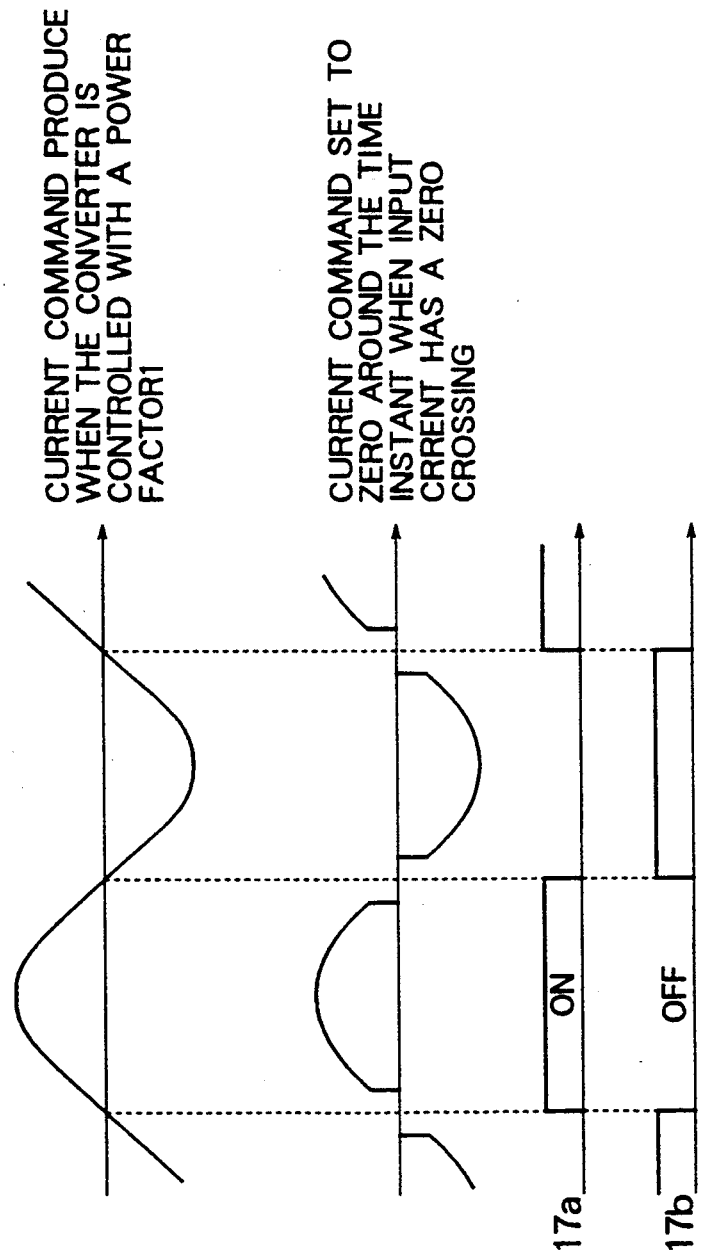
FIG. 55 shows input current commands in the nineteenth embodiment.

In the configuration of the first or fourth embodiment shown in FIG. 1 or 8, on the assumption that the converter is controlled with a high power factor, a current command issued by the converter voltage command generator 100 shall be, as shown in FIG. 55, a signal having a sine wave phased with the voltage supplied by the ac voltage source 7.

In part of controlling the input current $I_R$, the current command signal is set to zero around the time instant when the input current originating from the ac voltage source have a zero crossing. Around the time instant when the switching elements 17a and 17b in the input voltage control circuit 17 are turned on or off, the currents flowing through the switching elements 17a and 17b reach zero without fail. The switching elements 17a and 17b can therefore be turned on or off as specified in a command. Even if an error occurs in the input voltage $V_R$ supplied by the ac voltage source 7, the input voltage $V_R$ can be cut off reliably. Stable power supply can be realized all the time.

When thyristors that cannot suppress arcing by themselves are employed for the input voltage control circuit 17, the input voltage supplied by the ac voltage source 7 may fluctuate abruptly. In this case, the input voltage is opposite in polarity to the inverter output voltage command. If a thyristor cannot be turned off as specified in the command but remains on, the input current originating from the ac voltage source grows abruptly. This results in a broken circuit element. However, once the current command is set to zero around the time instant when the input current has a zero crossing, the currents flowing through the switching elements 17a and 17b in the input voltage control circuit 17 reach zero without fail around the time instant when the switching elements 17a and 17b are turned on or off. Thus, the above drawback can be overcome.

Twentieth Embodiment

Next, the twentieth embodiment will be described in conjunction with the drawings.

Figure 56:
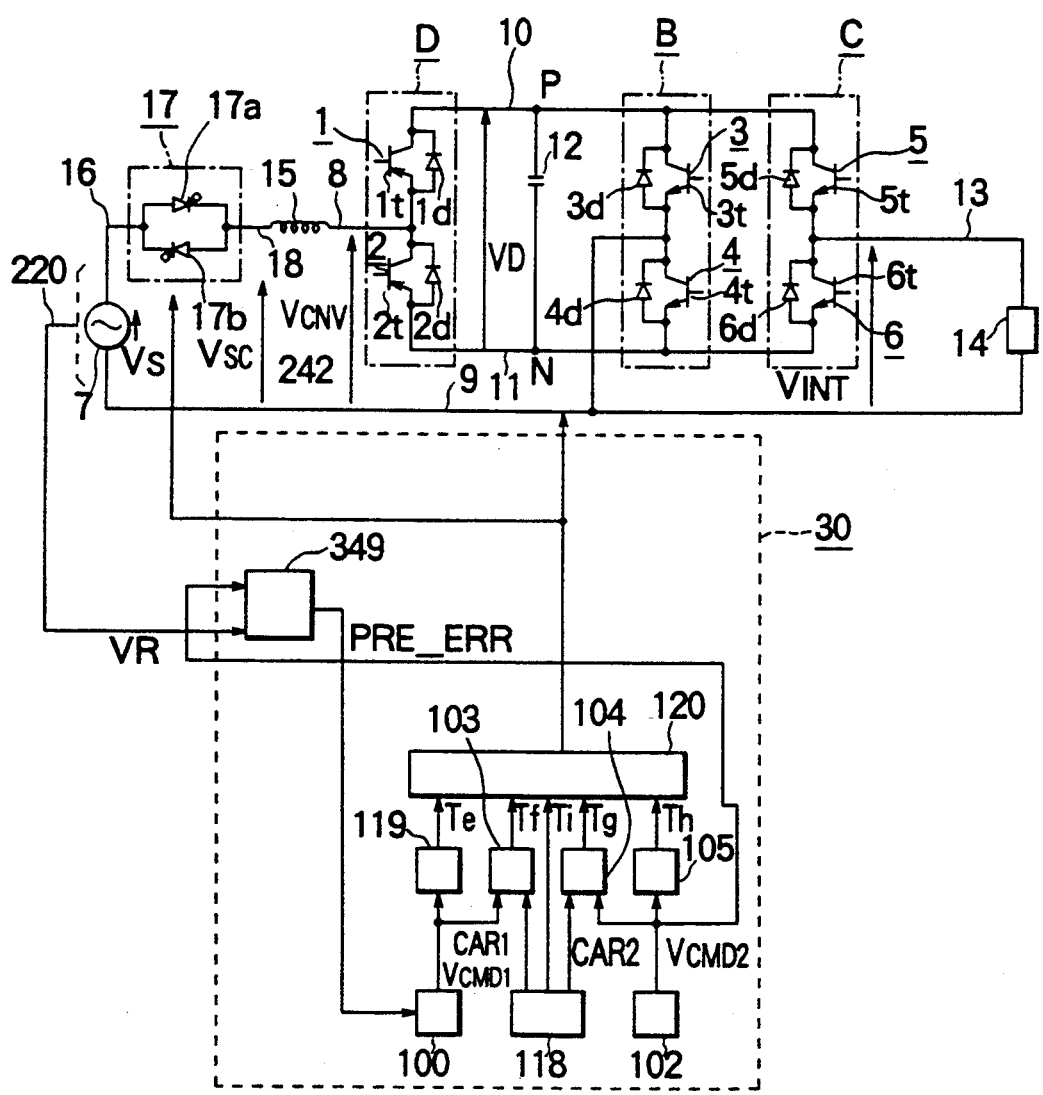
FIG. 56 shows a configuration of a power inverting apparatus of the twentieth and twenty-second embodiments.

In FIG. 56, 349 denotes a voltage difference error predictor detector. The voltage difference error predictor detector 349 detects a difference between the voltage $V_R$ supplied by the ac voltage source 7 and inverter output voltage command $V_{CMD2}$. When an inequality (14) is satisfied, the voltage difference error predictor detector 349 outputs a signal PREERR.

$$|V_R - V_{CMD2}| > (V_{CD^*}) - \delta \tag{14}$$

where, $V_{CE^*}$ denotes a output voltage command destined for the smoothing capacitor 12, and $\delta$ denotes a voltage providing a condition for detection with a tolerance.

1 to 17, 100 to 105, 118 to 120, and B to D denote the same circuit elements as those in the thirteenth embodiment, of which description will be omitted.

Figure 57:
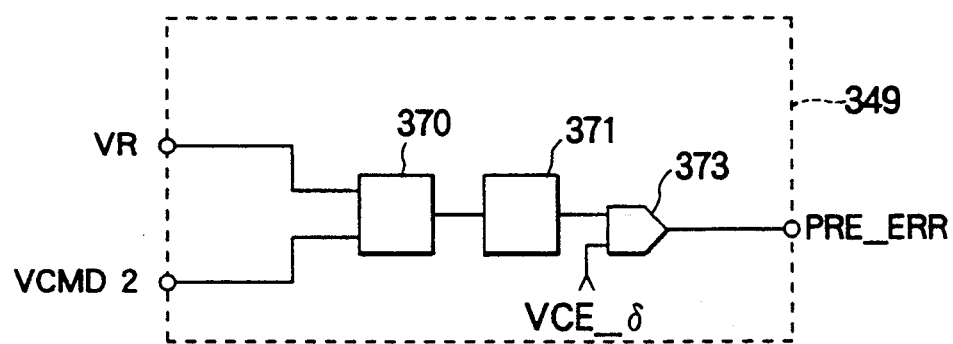
FIG. 57 shows a voltage difference error predictor detector in the twentieth embodiment.

FIG. 57 shows an example of a circuitry of the voltage difference error predictor detector 349.

m FIG. 57, 373 denotes a circuit element that compares an output signal of the absolute value circuit 371 with a value resulting from $(V_{CE^*}) - \delta$, and that when the output signal of the absolute value circuit 371 exceeds the value resulting from $(V_{CE^*}) - \delta$, activates the output signal PRE ERR. 370 and 371 denote the same circuit elements as those in the fourteenth embodiment, of which description will be omitted.

Figure 58:
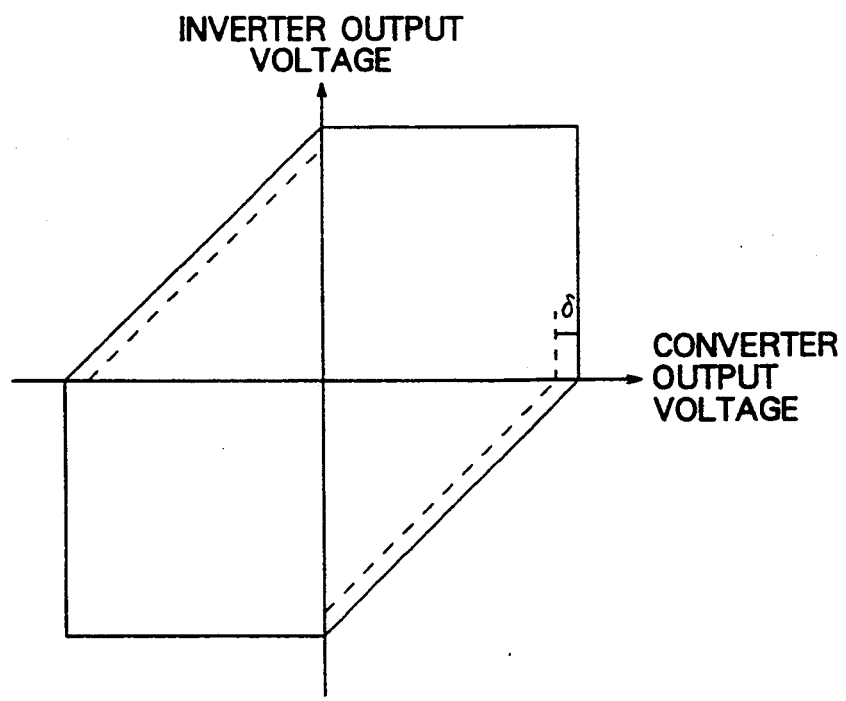
FIG. 58 shows a voltage difference error predictable and detectable range in the twentieth embodiment.

When the carriers for the inverter and converter are, for example, 180° out of phase, if the input voltage control circuit 17 is turned on in all domains in FIG. 58, the operable range of the power inverting apparatus is defined with a solid line in FIG. 58.

When an operating domain exists outside a dashed line defined with the voltage $\delta$ in FIG. 8, if the converter voltage command generator 100 sets the converter input current command to zero, before the operating domain comes off the operable range, a switching element in a bidirectional switching circuit can be turned off. Input voltage that is opposite in polarity to the inverter output voltage command can therefore be cut off.

A state in which input current is likely to grow is detected in advance. When such a state is detected, the current flowing through the bidirectional switching circuit is set to zero. Input voltage that is opposite in polarity to the inverter output voltage command can therefore be cut off. The inverter output voltage will therefore not stop, which enables the power inverting apparatus to operate continuously. Thus, stable power supply can always be realized in a wide range.

Twenty-first Embodiment

Next, the twenty-first embodiment will be described in conjunction with the drawings.

Figure 59:
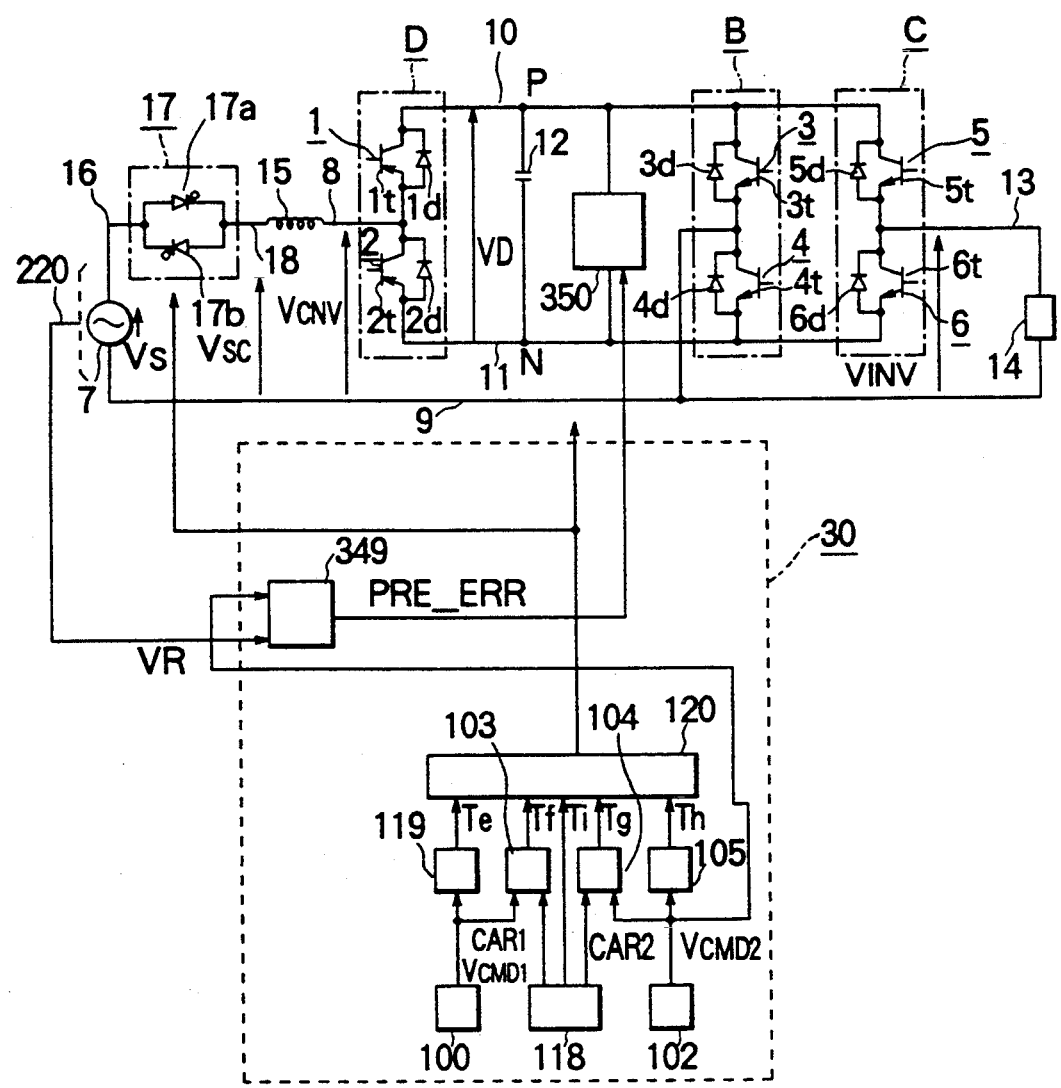
FIG. 59 shows a configuration of a power inverting apparatus of the twenty-first embodiment.

In FIG. 59, 350 denotes a chopper. 1 to 17, 100 to 105, 118 to 120, 349, and B to D denote the same circuit elements as those in the twentieth embodiment, of which description will be omitted.

Figure 60:
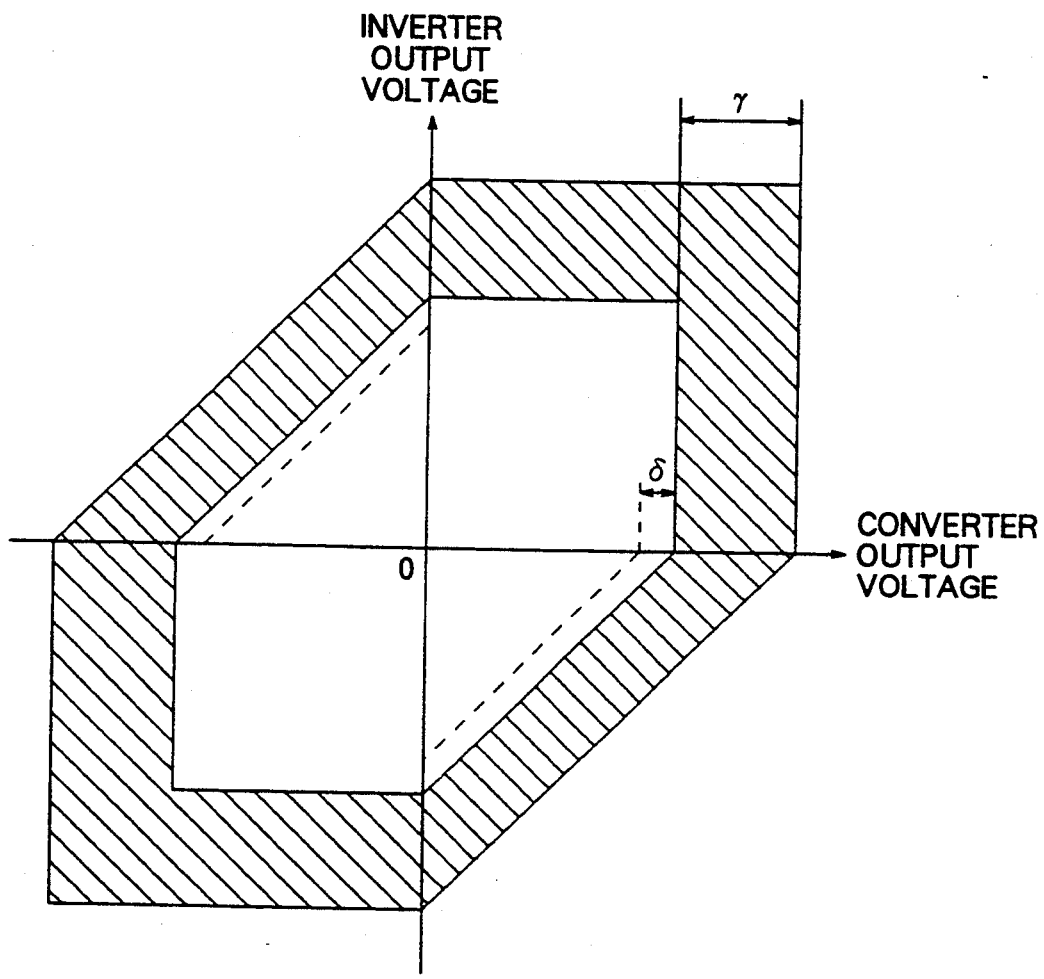
FIG. 60 shows a voltage difference error predictable and detectable range and the operating domains of an inverter and a converter in the twenty-first embodiment.

When the carriers for the inverter and converter are, for example, 180° out of phase, if the input voltage control circuit 17 is turned on in all operating domains in FIG. 60, the operable range of the power inverting apparatus is defined as an area inside a hatched area in FIG. 60. Similarly to the nineteenth embodiment, when an operating domain is outside a dashed line defined with the tolerance voltage $\delta$ in FIG. 60, the output signal PREERR of the voltage difference error predictor detector 349 becomes active. The signal PREERR is then fed to the chopper 350.

In response to the signal PREERR, the chopper 350 performs boosting to boost the voltage at the smoothing capacitor 12 by a given value Y.

At this time, the hatched area expands as shown in FIG. 60. The operable range of the power inverting apparatus becomes larger accordingly. Only when an error occurs in the voltage supplied by the ac voltage source 7, the voltage at the smoothing capacitor 12 can be boosted without causing the converter and inverter to stop. An increase in power dissipation caused by switching in the inverter and converter can be restricted to an event that an error occurs in input voltage. This results in stable power supply all the time.

Twenty-second Embodiment

Next, the twenty-second embodiment will be described.

A power inverting apparatus of the twenty-second embodiment has the same configuration as that shown in FIG. 36. When the voltage difference error predictor detector 349 detects an error in the voltage supplied by the ac voltage source, the output signal PREERR of the voltage difference error predictor detector 349 becomes active, and then enters the converter voltage command generator 100.

When the signal PREERR is fed to the converter voltage command generator 100, the converter voltage command generator steps up the de voltage command destined for the capacitor 12 to boost the dc voltage at the capacitor 12 by the given value Y.

At this time, the operating domains of the inverter and converter expand by a hatched area in FIG. 60. The operable range of the power inverting apparatus becomes larger accordingly. Only when an error occurs in input voltage, the voltage at the smoothing capacitor 12 can be boosted without causing the inverter and converter to stop. An increase in power dissipation caused by switching in the inverter and converter can therefore be restricted to an event of an input voltage error. Furthermore, since a simple circuitry will do, stable power supply can be realized at low cost.

Twenty-third Embodiment

Next, the twenty-third embodiment will be described in conjunction with the drawings.

Figure 61:
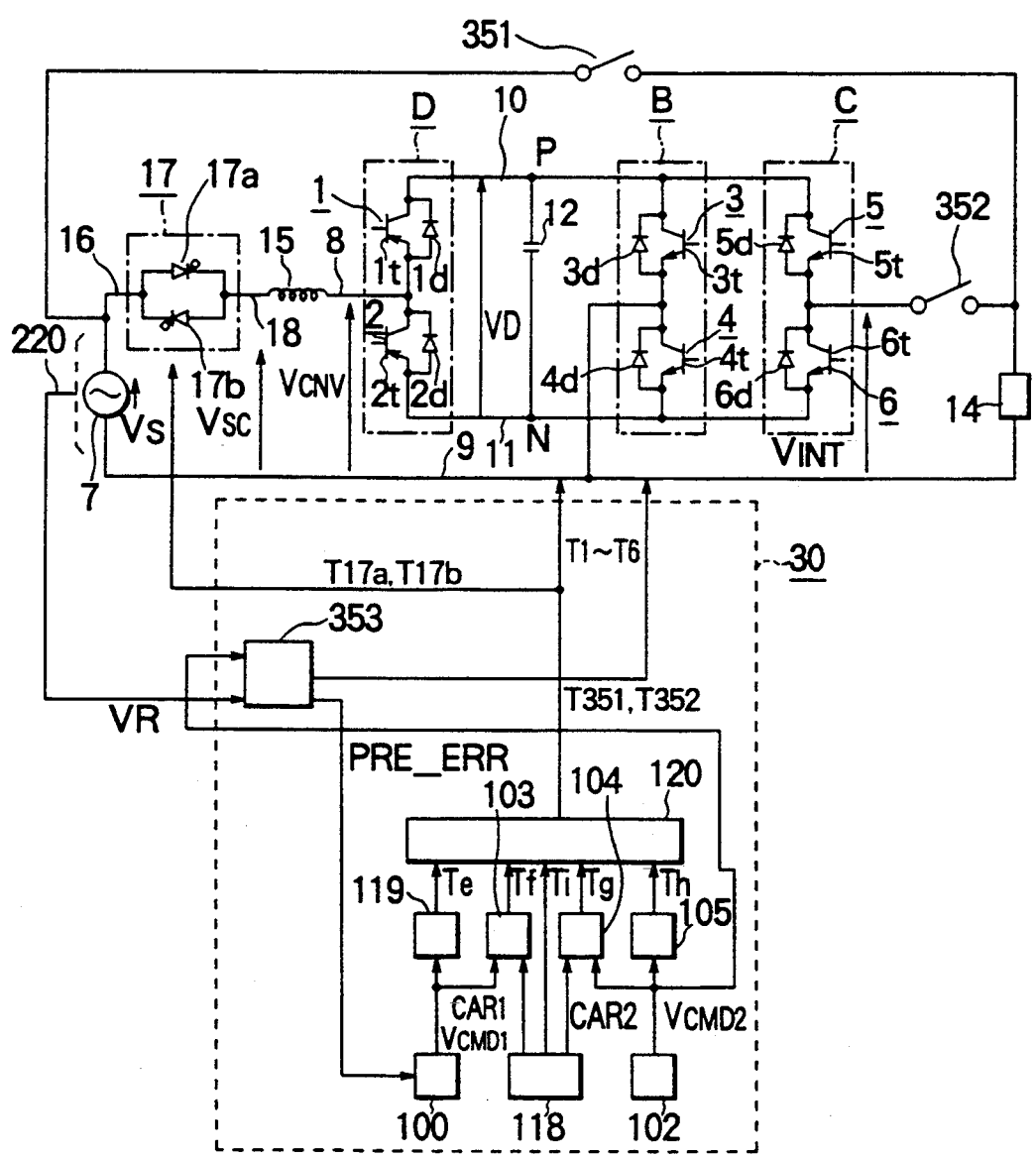
FIG. 61 shows a configuration of a power inverting apparatus of tile twenty-third embodiment.

In FIG. 61, 352 denotes a switch serving as a first switch means. 351 denotes a switch serving as a second switch means. 353 denotes a voltage difference error predictor detector for detecting an error under the same conditions as those described in claim 22, supplying a switching signal to each of the switching means 351 and 352, and outputting an Error Detected signal PREERR to the converter voltage command generator 100. 1 to 17, 100 to 105, 118 to 120, and B to D denote the same circuit elements as those in the twentieth embodiment, of which description will be omitted.

Figure 62:
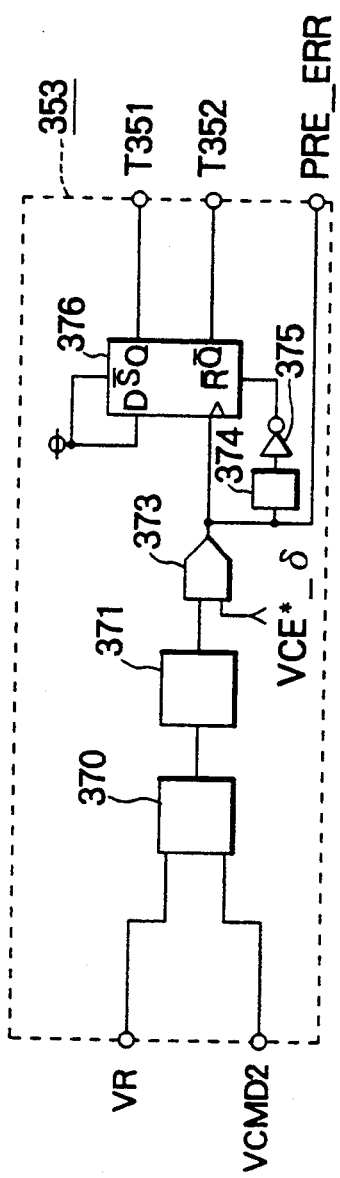
FIG. 62 shows a voltage difference error predictor detector in the twenty-third embodiment.
Figure 63:
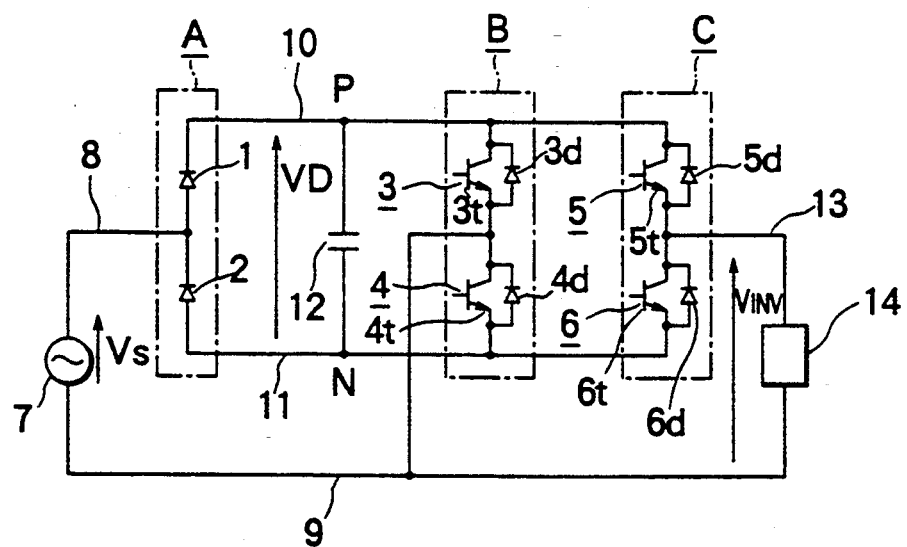
FIG. 63 is a block diagram showing a power inverting circuit of the first prior art.
Figure 65:
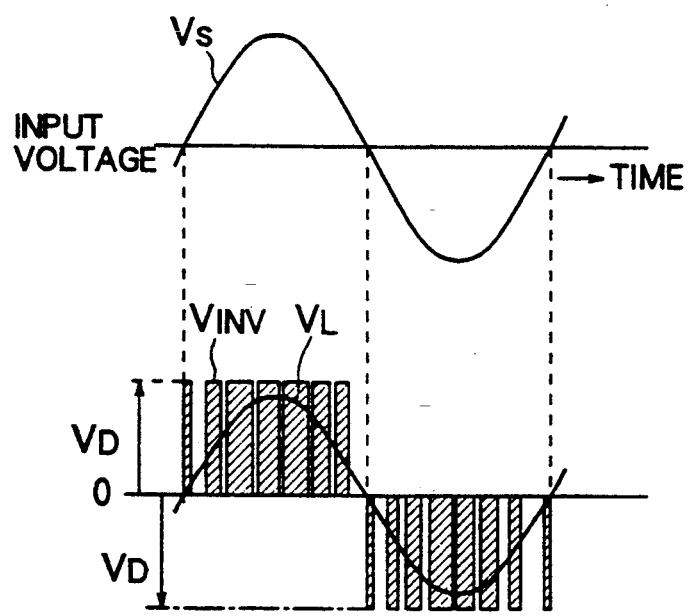
FIG. 65 shows waveforms of input/output voltages in the first prior art.
Figure 66:
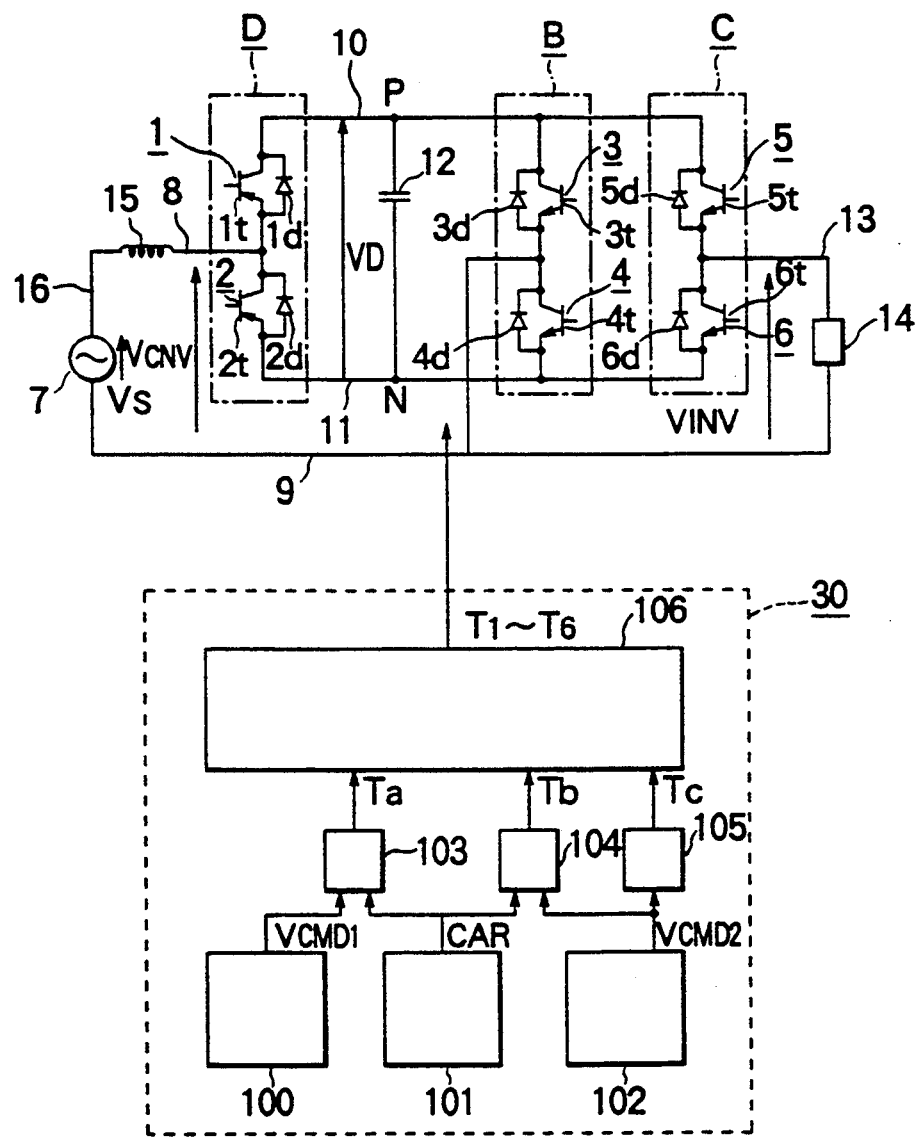
FIG. 66 is a block diagram of a power inverting apparatus of the second prior art.
Figure 67:
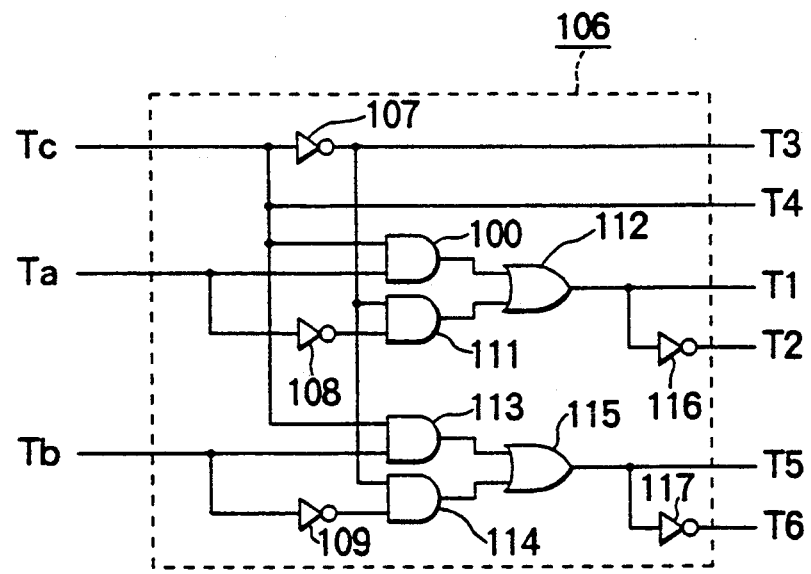
FIG. 67 is a circuit diagram showing a switching pattern generator in the second prior art.
Figure 68:
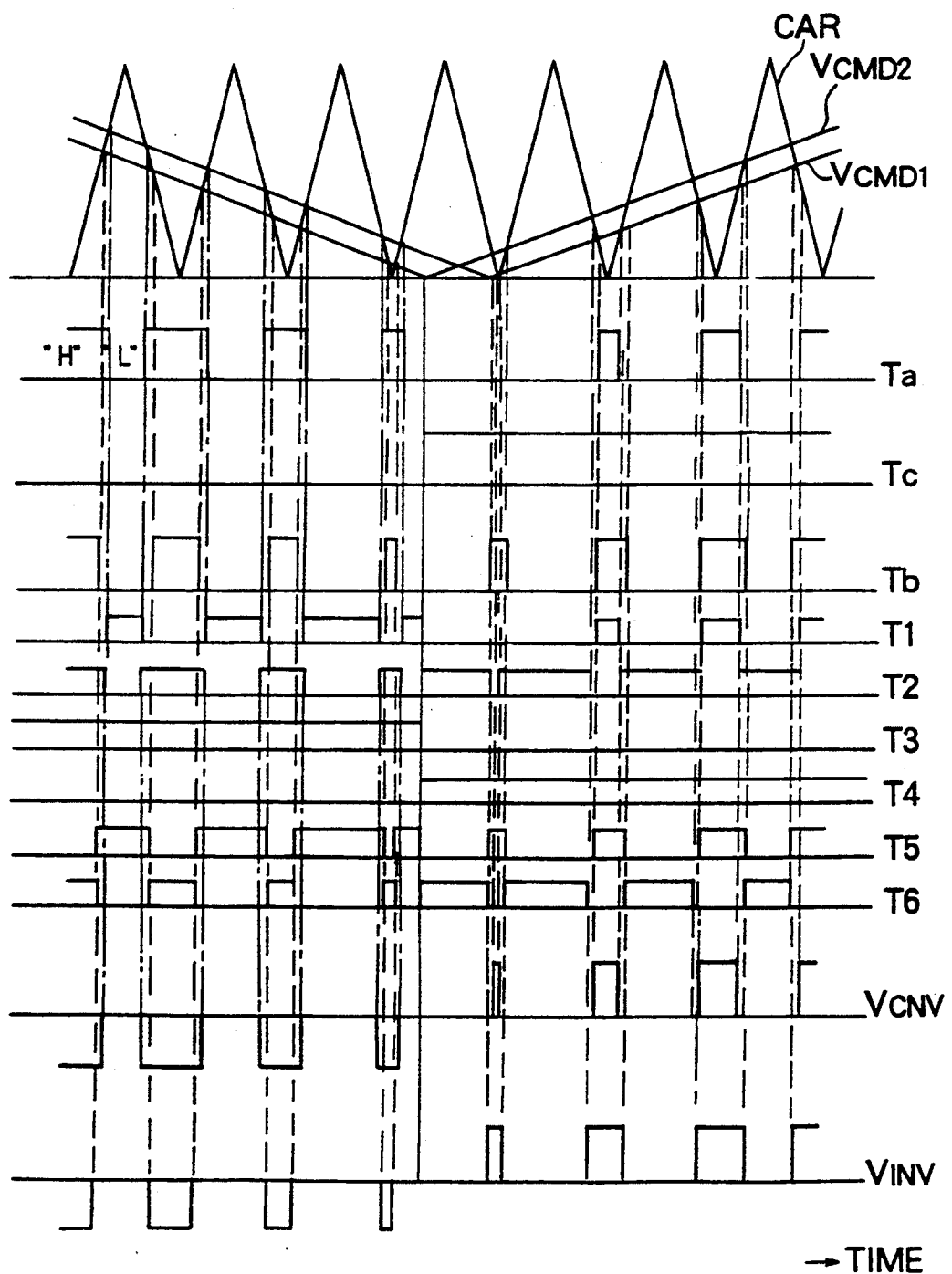
FIG. 68 shows waveforms representing the second prior art.

FIG. 62 shows a circuitry of the voltage difference error predictor detector 353.

In FIG. 62, 374 denotes a delay circuit. 379 denotes a NOT circuit. 376 denotes a D flip-flop for outputting commands T391 and T352 destined for the switch means 351 and 392. 370, 371, and 373 denote the same circuit elements as those in the twentieth embodiment, of which description will be omitted.

When the voltage difference error predictor detector 353 detects an error in ac voltage, the output signal PRE ERR of the voltage difference error predictor detector 353 becomes active and then enters the converter voltage command generator 100. At this time, the commands T351 and T352 destined for the switch means 351 and 352 are turned on and off respectively by means of the D flip-flop 376. Thus, bypasses are switched over.

In response to the signal PREERR, the converter voltage command generator 100 steps up the dc voltage command destined for the capacitor 12 to boost the dc voltage at the capacitor 12 by the given value Y.

At this Lime, the operating domains of the inverter and converter expand by the hatched area in FIG. 60. The commands T351 and T352 destined for the switch means 351 and 352 are turned off and on respectively by means of the D flip-flop 376. Thus, the output of the inverter is fed to a load.

When an error is likely to occur in the voltage supplied by the ac voltage source, the bypasses in the output port of the inverter are switched over to disconnect the inverter. The converter is thus allowed to operate without any restriction derived from the presence of the inverter, whereby the voltage at the smoothing capacitor 12 is boosted. The voltage at the smoothing capacitor 12 can therefore be boosted quickly. After the voltage at the smoothing capacitor 12 has been boosted, the inverter is restarted. This results in stable power supply.

In the aforesaid first to twenty-third embodiments, each switching element is formed with a single thyristor. Depending on the current and voltage ratings for a power inverting apparatus, a plurality of thyristors may be connected in parallel or series with one another. The number of switching circuits constituting each switch and being connected in series with one another may be set to any value.

An expression described in claims in this specification, for example, "a second switch having the same circuit elements as a first switch" does not necessarily stipulate that the number of switching elements or switching circuits connected in series with one another is the same between the first and second switches.

What is claimed is:

1. A power inverting apparatus, comprising:
   a converter means for changing a first ac voltage into dc voltage;
   an inverter means for changing dc voltage provided by said converter means into a second ac voltage; and
   an input voltage control means for receiving a third ac voltage from an ac voltage source and for generating the first ac voltage, the first ac voltage being clamped at zero volts when the polarity of the third ac voltage supplied by said ac voltage source is inconsistent with the polarity of the second ac voltage provided by said inverter means.

2. A power inverting apparatus for use with an ac voltage source, said power inverting apparatus comprising:
   a converter having first and second switching circuits connected in series with each other and having a junction between the first and second switching circuits, and an output voltage;
   an input voltage switching circuit having an output connected to said converter at the junction between the first and second switching circuits and having an input adapted to be connected to the ac voltage source;
   a selector connected in parallel with said converter, said selector having third and fourth switching circuits connected in series with each other and having a junction between the third and fourth switching circuits, the junction being adapted to be connected to the ac voltage source;
   an inverter connected in parallel with said converter, said inverter having fifth and sixth switching circuits connected in series with each other and said inverter having an output voltage; and
   a switching control circuit for turning on or off said input voltage switching circuit and said first to sixth switching circuits on the basis of an ac voltage supplied by the ac voltage source and the inverter output voltage according to a given timing.

3. A power inverting apparatus according to claim 2, wherein said input voltage switching circuit includes a pair of unidirectional switching elements connected in parallel with each other and in opposite directions.

4. A power inverting apparatus according to claim 2, wherein each of said first to sixth switching circuits includes a unidirectional switching element and a diode connected in parallel with each other and in opposite directions.

5. A power inverting apparatus according to claim 1, further comprising a reactor connected between said input voltage control means and said converter means.

6. A power inverting apparatus according to claim 2, further comprising:
   a current detecting means for detecting an input current flowing from the ac voltage source into said converter:
   an error recognizing means for recognizing occurrence of an error when an input current detected by said current detecting means exceeds a given value; and
   an error control means for stopping said switching control circuit to turn off said input voltage switching circuit and said first to sixth switching circuits when said error recognizing means recognizes occurrence of an error.

7. A power inverting apparatus according to claim 6, wherein after said switching control circuit is stopped, when an input current detected by said current detecting means becomes zero, said error control means re-actuates said switching control circuit.

8. A power inverting apparatus according to claim 6, further comprising a voltage detecting means for detecting a voltage across said input voltage switching circuit, wherein:
   after said switching control circuit is stopped, when said voltage detecting means detects that voltage has been developed across said input voltage circuit, said error control means re-actuates said switching control circuit.

9. A power inverting apparatus according to claim 2, further comprising:
  a current detecting means for detecting an input current flowing from the ac voltage source into said converter:
  an error recognizing means for recognizing occurrence of an error when an input current detected by said current detecting means exceeds a given value; and
  an error control means for 1) turning off said bidirectional switching circuit, 2) allowing the fifth and sixth switching circuits to perform switching according to a switching pattern to prevent an input current detected by said current detecting means from growing so that an output voltage of said inverter will be zero, and 3) turning off said first and second switching circuits to suspend said converter, when said error recognizing means recognizes occurrence of an error and for actuating said switching control circuit normally when said current detecting means detects a zero input current.

10. A power inverting apparatus according to claim 2, further comprising:
  a voltage detecting means for detecting the ac voltage supplied by said ac voltage source:
  a polarity detecting means for detecting the polarities of the ac voltage supplied by the ac voltage source and of the output voltage of said inverter; and
  an error control means for controlling said switching control circuit so that said converter and said inverter will be suspended when the polarities detected by said polarity detecting means are mutually inconsistent.

11. A power inverting apparatus according to claim 10, wherein said error control means controls said switching control circuit so that after said converter and said inverter are suspended, when a given period of time elapses, said converter and said inverter will be restarted.

12. A power inverting apparatus according to claim 10, further comprising a current detecting means for detecting an input current flowing from said ac voltage source into said converter, wherein said error control means controls said switching control circuit so that after said converter and said inverter are suspended, when a zero input current is detected by said current detecting means, said converter and said inverter will be restarted.

13. A power inverting apparatus according to claim 2, further comprising:
  a voltage detecting means for detecting the ac voltage supplied by said ac voltage source;
  a current detecting means for detecting an input current flowing from said ac voltage source into said converter;
  a polarity detecting means for detecting the polarities of the ac voltage supplied by the ac voltage source and of the output voltage of said inverter; and
  an error control means for controlling said switching control circuit so that when the polarities detected by said polarity detecting means are mutually inconsistent around the time instant when the polarity of the output voltage of said inverter detected by said polarity detecting means is reversed, said converter and said inverter will be suspended, and so that when it is detected that an output current detected by said current detecting means is zero, said converter and said inverter will be restarted.

14. A power inverting apparatus according to claim 2 further comprising:
  a voltage detecting means for detecting the ac voltage supplied by said ac voltage source;
  a current detecting means for detecting an input current flowing from the ac voltage source into said converter;
  a voltage difference detecting means for detecting a difference between the voltage detected by said voltage detecting means and the inverter output voltage; and
  an error control means for controlling said switching control circuit so that when a voltage difference detected by said voltage difference detecting means is larger than the output voltage of said converter, said converter and said inverter will be suspended, and when it is detected that an input current detected by said current detecting means is zero, said converter and said inverter will be restarted.

15. A power inverting apparatus according to claim 2 further comprising:
  a voltage detecting means for detecting the ac voltage supplied at the ac voltage source;
  a current detecting means for detecting an input current flowing from the ac voltage source into said converter;
  a voltage difference detecting means for detecting a difference between the voltage detected by said voltage detecting means and the inverter output voltage;
  a polarity detecting means for detecting the polarities of the voltage supplied by the ac voltage source and of input current flowing from said ac voltage source into said converter; and
  an error control means for controlling said switching control circuit so that when a voltage difference detected by said voltage difference detecting means is larger than the output voltage of said converter, if the polarity of the voltage supplied by said ac voltage source is consistent with the one of input current flowing from the ac voltage source to said converter, said converter and said inverter will be suspended, and so that when it is detected that an input current detected by said current detecting means is zero, said converter and said inverter will be restarted.

16. A power inverting apparatus according to claim 2, further comprising:
  a voltage detecting means for detecting the ac voltage supplied by the ac voltage source;
  a current detecting means for detecting an input current flowing from the ac voltage source into said converter;
  a voltage difference detecting means for detecting a difference between a voltage detected by said voltage detecting means and the inverter output voltage;
  a polarity detecting means for detecting the polarities of voltage supplied by said ac voltage source and of input current flowing from said ac voltage source into said converter; and
  an error control means for controlling said switching control circuit so that when a voltage difference detected by said voltage difference detecting means is larger than a converter voltage command generated by said converter voltage command generator, if the polarity of voltage supplied by said ac voltage source, which is detected by said polarity detecting means, is consistent with the one of input current flowing from said ac voltage source into said converter, and if an input current flowing into said converter exceeds a given value, said converter and said inverter will be suspended, and so that when it is detected that an input current detected by said current detecting means is zero, said converter and said inverter will be restarted.

17. A power inverting apparatus according to claim 2, further comprising:
an input current command generator for outputting a command representing an input current flowing from the ac voltage source into said converter;
a current detecting means for detecting an input current flowing from the ac voltage source into said converter;
a current difference detecting means for detecting a difference between an input current detected by said current detecting means and an input current command generated by said input current command generator; and
an error control means for controlling said switching control circuit so that when a current difference detected by said current difference detecting means exceeds a given value, said converter and said inverter will be suspended, and so that when it is detected that an input current detected by said current detecting means is zero, said converter and said inverter will be restarted.

18. A power inverting apparatus according to claim 2, further comprising:
a voltage detecting means for detecting a voltage supplied by the ac voltage source;
a current detecting means for detecting an input current flowing from the ac voltage source into said converter;
an inverter voltage command generator for generating an inverter voltage command;
a phase difference detecting means for detecting a phase difference between a voltage detected by said voltage detecting means and the inverter voltage command generated by said inverter voltage command generator; and
an error control means for controlling said switching control circuit so that when a phase difference detected by said phase difference detecting means exceeds a given value, said converter and said inverter will be suspended, and so that when it is detected that an input current detected by said current detecting means is zero, said converter and said inverter will be restarted.

19. A power inverting apparatus according to claim 2, further comprising:
an input current command generator for outputting a command representing an input current flowing from the ac voltage source into said converter; and
a control means for setting an input current command provided by said input current command generator to zero when the logical states of said input voltage switching circuit are changed.

20. A power inverting apparatus according to claim 2 further comprising:
a voltage detecting means for detecting the voltage supplied by the ac voltage source;
an input current command generator for outputting a command representing an input current flowing from the ac voltage source into said converter;
an inverter voltage command generator for generating an inverter voltage command;
a converter voltage command generator for generating a converter voltage command;
a voltage difference detecting means for detecting a difference between the voltage detected by said voltage detecting means and the inverter voltage command generated by said inverter voltage command generator; and
an error control means for setting the input current command to zero when an absolute value of a voltage difference detected by said voltage difference detecting means is smaller by a given value than the converter voltage command generated by said converter voltage command generator.

21. A power inverting apparatus according to claim 2 further comprising:
a chopper connected in parallel with said smoothing capacitor;
a voltage detecting means for detecting a voltage supplied by the ac voltage source;
an input current command generator for outputting a command representing an input current flowing from the ac voltage source into said converter;
means for generating an inverter voltage command;
means for generating a converter voltage command;
a smoothing capacitor connected in series with said converter;
a voltage difference detecting means for detecting a difference between a voltage detected by said voltage detecting means and the inverter voltage command; and
an error control means for boosting voltage across said smoothing capacitor when an absolute value of a voltage difference detected by said voltage difference detecting means is smaller by a given value than a converter voltage command generated by said converter voltage command generator.

22. A power inverting apparatus according to claim 2, further comprising;
a voltage detecting means for detecting a voltage supplied by the ac voltage source;
means for generating an inverter voltage command;
means for generating a converter voltage command;
a voltage difference detecting means for detecting a difference between the voltage detected by said voltage detecting means and the inverter voltage command; and
an error control means for boosting the converter voltage command when an absolute value of the voltage difference detected by said voltage difference detecting means is smaller by a given value than a converter voltage command.

23. A power inverting apparatus according to claim 22, further comprising an output terminal of said power inverting apparatus connected to said inverter, a first switch means connected between said inverter and said output terminal, and a second switch means connected between a junction between the ac voltage source and said input voltage switching circuit, and said output terminal, wherein when an absolute value of the voltage difference detected by said voltage difference detecting means is smaller by a given value than the converter voltage command generated by said converter voltage command generator, said error control means stops said inverter, turns off and on said first and second switch means, respectively, in order to bypass said output terminal to the ac voltage source, allows said converter to boost a dc voltage at said smoothing capacitor, then actuates said inverter, and turns on and off said first and second switch means, respectively, in order to release the bypassing.

24. A power inverting apparatus according to claim 1, wherein said input voltage control means, said converter means, and said inverter means include:
- a converter consisting of seventh and eighth switching circuits connected in series with each other and having a junction between said seventh and eighth switching circuits connected to one terminal of said ac voltage source;
- a smoothing capacitor connected in parallel with said converter;
- a selector being connected in parallel with said converter, consisting of third and fourth switching circuits connected in series with each other, and having a junction between said third and fourth switching circuits connected to the other terminal of said ac voltage source;
- an inverter being connected in parallel with said converter, and consisting of fifth and sixth switching circuits connected in series with each other; and
- a switching control circuit For turning on or off said third to eighth switching circuits according to given timing.

25. A power inverting apparatus according to claim 24, wherein each of said seventh and eighth switching circuits includes unidirectional switching elements.

26. A power inverting apparatus according to claim 24, wherein each of said seventh and eighth switching circuits is formed with a bidirectional switching circuit.

27. A power inverting apparatus according to claim 24, wherein each of said seventh and eighth switching circuits includes a unidirectional switching element and a diode connected in parallel with each other but in the opposite directions.

28. A power inverting apparatus, comprising:
- a converter means for changing ac voltage supplied by an ac voltage source into dc voltage;
- an inverter means for changing dc voltage provided by said converter means into ac voltage;
- a converter voltage command generator for generating a converter voltage command;
- an inverter voltage command generator for generating an inverter voltage command;
- a carrier generator for generating first and second carriers that are 180° out of phase mutually; and
- a control means for controlling said converter means and said inverter means so as to control pulse-width modulation of said converter according to the converter voltage command and the first carrier and to control pulse-width modulation of said inverter according to the inverter voltage command and a second carrier.

29. A power inverting apparatus according to claim 28, wherein said converter means and said inverter means include:
- a converter consisting of first and second switching circuits connected in series with each other, and having a junction between said first and second switching circuits connected to one terminal of said ac voltage source;
- a smoothing capacitor connected in parallel with said converter;
- a selector being connected in parallel with said converter, consisting of third and fourth switching circuits connected in series with each other, and having a junction between said third and fourth switching circuits connected to the other terminal of said ac voltage source; and
- an inverter being connected in parallel with said converter, and consisting of fifth and sixth switching circuits connected in series with each other.

30. A power inverting apparatus according to claim 29, wherein:
- said carrier generator generates a carrier state signal that is reversed in polarity at a time instant when said first and second carriers have a crossing;
- said control means includes:
- a first comparator for comparing the converter voltage command with the first carrier and then outputting a Converter Compared signal;
- a second comparator for comparing the inverter voltage command with the second carrier and the outputting an Inverter Compared signal;
- a first zero crossing detector for outputting a converter polarity signal that is reversed n polarity at a time instant when the converter voltage command has a zero crossing;
- a second zero crossing detector for outputting an inverter polarity signal that is reversed in polarity at a time instant when the inverter voltage command has a zero crossing;
- a first exclusive-OR circuit for outputting a converter PWM signal according to the Converter Compared signal and the converter polarity signal;
- a second exclusive-OR circuit for outputting an inverter PWM signal according to the inverter Compared signal and the inverter polarity signal;
- an AND circuit for calculating the AND of the converter PWM signal and the carrier state signal and then outputting a Converter Operable signal indicating that said converter is operable;
- a third exclusive-OR circuit for outputting a Polarity Consistent/Inconsistent signal indicating that the polarities or the converter polarity signal and of the inverter polarity signal are mutually consistent or inconsistent by analyzing the converter polarity signal and inverter polarity signal;
- an OR circuit for calculating the OR of the inverter PWM signal and the carrier state signal, and then outputting an Inverter Operable signal indicating that said inverter is operable;
- a first selector for outputting switching signals to said first and second switching circuits by allocating the converter PWM signal and the carrier state signal according to the polarity of the Polarity Consistent/Inconsistent signal;
- a second selector for outputting switching signals to said third and fourth switching circuits by allocating the carrier state signal and the inverter polarity signal according to the Polarity Consistent/Inconsistent signal; and
- a third selector for outputting switching signals to said fifth and sixth switching circuits by allocating the inverter PWM signal and the inverter Operable signal according to the polarity of the Polarity consistent/Inconsistent signal.

31. A power inverting apparatus according to claim 29, wherein said control means includes:
- a first comparator for comparing the converter voltage command with the first carrier and then outputting a Converter Compared signal;

a second comparator for comparing the inverter voltage command with the second carrier and then outputting an Inverter Compared signal;

a first zero crossing detector for outputting a converter polarity signal that is reversed in polarity at a time instant when the converter voltage command has a zero crossing;

a second zero crossing, detector for outputting an inverter polarity signal that is reversed in polarity at a time instant when the inverter voltage command has a zero crossing;

a first exclusive -OR circuit for outputting a converter PWM signal according to the Converter Compared signal and the converter polarity signal;

a second exclusive-OR circuit for outputting an inverter PWM signal according to the Inverter Compared signal and the inverter polarity signal;

a reversing circuit for reversing the inverter PWM signal to output an inverter PWM reverse signal;

an AND circuit for calculating the AND of the converter PWM signal and the inverter PWM reverse signal, and then outputting a Converter Operable signal indicating that said converter is operable;

a third exclusive-OR circuit for outputting a Polarity Consistent/Inconsistent signal indicating that the polarities of the converter polarity signal and the inverter polarity signal are mutually consistent or inconsistent by analyzing the converter polarity signal and inverter polarity signal;

a first selector for outputting switching signals to said first and second switching circuits by allocating the converter PWM signal and the carrier state signal according to the polarity of the Polarity Consistent/Inconsistent signal;

a second selector for outputting switching signals to said third and fourth switching circuits by allocating the carrier state signal and the inverter polarity signal according to the polarity of the Polarity Consistent/Inconsistent signal; and a third selector for outputting switching signals to said fifth and sixth switching circuits by allocating the inverter PWM signal and the Inverter Operable signal according to the polarity of the Polarity consistent/Inconsistent signal.

32. A power inverting apparatus, comprising:

a converter including a first switch made by connecting a pair of switching circuits in series with each other and having a middle point of said first switch connected to one terminal of an ac voltage source;

a smoothing capacitor connected in parallel with said converter;

a selector connected in parallel with said converter, including a second switch made by connecting a pair of switching circuits in series with each other, and having a middle point of said second switch connected to the other terminal of the ac voltage source;

an inverter connected in parallel with said converter, and including a third switch made by connecting a pair of switching circuits in series with each other;

a converter voltage command generator for generating a converter voltage command;

an inverter voltage command generator for generating an inverter voltage command; and a control means for representing combinations of logical states of said first to third switches in the form of voltage vectors, for converting the converter voltage command and the inverter voltage command into voltage vector commands, for calculating a required combination of logical states and a valid time interval of the combination according to the voltage vector commands, and for generating switching signals for said switching circuits in said first to third switches.

33. A power inverting apparatus according to claim 32, wherein said switching control means includes:

a memory means for storing combinations of logical states of said first to third switches in association with voltage vectors each having orthogonal components of a quotient defined as an output voltage of said converter divided by a voltage at said smoothing capacitor and a quotient defined as an output voltage of said inverter divided by a voltage at said smoothing capacitor, storing a plurality of domains each defined by linking apices of adjoining voltage vectors, and also storing a plurality of voltage vectors in association with the domains;

a converting means for converting a converter voltage command and an inverter voltage command into voltage vector commands;

a reading means for identifying a domain designated with voltage vector commands at intervals of a unit processing time interval and then reading a plurality of voltage vectors associated with the domain;

an arithmetic logic means for calculating a valid time interval or an allocation of a unit processing time interval for logical states of said switches associated with each of the plurality of voltage vectors read by said reading means by computing voltage vector commands; and a switching signal generating means for generating switching signals for switching circuits constituting each switch according to information of a valid time interval or an allocation for logical states calculated by said arithmetic logic means.

34. A power inverting apparatus according to claim 32, wherein said switching control means includes:

an arithmetic logic means for representing logical states of said first to third switches in the form of a three-dimensional state vector having first and second elements and calculating an exclusive-OR of the elements of a state vector representing logical states associated with a voltage vector provided previously and those of a state vector representing logical states associated with a voltage vector not provided during a unit processing time interval;

an adding means for adding up the three exclusive-ORed elements for each voltage vector not provided; and a selecting means for selecting a voltage vector, which minimizes the result of the addition, as a voltage vector to be provided next.

35. A power inverting apparatus according to claim 32, wherein said switching control means includes:

an arithmetic logic means for representing logical states of said first to third switches in the form of a three-dimensional state vector having first and second elements and calculating an exclusive-OR of the elements of a state vector representing logical states associated with a voltage vector provided previously and those of a state vector representing logical states associated with a voltage vector not provided during a unit processing time interval;

an adding means for multiplying an exclusive-ORed element by a factor that is different among three elements, and then adding up three exclusive-ORed elements for each voltage vector not provided; and a selecting means for selecting a voltage vector, which maximizes the result of the addition, as a voltage vector to be provided next.

* * * * *